(12) United States Patent
Niki et al.

(10) Patent No.: US 8,098,478 B2
(45) Date of Patent: Jan. 17, 2012

(54) ELECTRIC ELEMENT

(75) Inventors: Kazuya Niki, Hirakata (JP); Osamu Moriya, Ikoma (JP); Shingo Maeda, Osaka (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 436 days.

(21) Appl. No.: 12/443,641

(22) PCT Filed: Jun. 27, 2007

(86) PCT No.: PCT/JP2007/062945
§ 371 (c)(1),
(2), (4) Date: Mar. 30, 2009

(87) PCT Pub. No.: WO2008/044376
PCT Pub. Date: Apr. 17, 2008

(65) Prior Publication Data
US 2010/0046135 A1 Feb. 25, 2010

(30) Foreign Application Priority Data
Oct. 6, 2006 (JP) ................. 2006-275041

(51) Int. Cl.
*H01G 4/005* (2006.01)
*H01G 4/228* (2006.01)
(52) U.S. Cl. ..................... 361/303; 361/309
(58) Field of Classification Search .......... 361/303, 361/306.1, 306.3, 308.3, 311, 309
See application file for complete search history.

(56) References Cited

U.S. PATENT DOCUMENTS

| 5,369,545 | A | * | 11/1994 | Bhattacharyya et al. | .. 361/306.2 |
| 6,292,351 | B1 | * | 9/2001 | Ahiko et al. | ............... 361/306.3 |
| 6,950,300 | B2 | * | 9/2005 | Sutardja | ..................... 361/306.3 |

FOREIGN PATENT DOCUMENTS

| JP | 2000-058376 A | 2/2000 |
| JP | 2002-175933 A | 6/2002 |
| JP | 2003-022932 A | 1/2003 |
| JP | 2006-100682 A | 4/2006 |

OTHER PUBLICATIONS

International Search Report of PCT/JP2007/062945 with the mailing date of Sep. 25, 2007.

* cited by examiner

*Primary Examiner* — Eric Thomas
(74) *Attorney, Agent, or Firm* — Westerman, Hattori, Daniels & Adrian, LLP

(57) ABSTRACT

An electric element includes a dielectric layers, conductive plates, anode electrodes, and cathode electrodes. The conductive plates and the conductive plates are alternately laminated in the width direction of the electric element. The anode electrodes are connected to each of the conductive plates with a predetermined distance. The cathode electrodes are connected to each of the conductive plates with a predetermined distance. The electric element is mounted on a substrate in a manner where the bottom surface makes contact with the substrate. The anode electrode is connected to a first signal line that has a width substantially equal to that of the electric element disposed on the substrate. The anode electrode is connected to a second signal line that has a width substantially equal to that of the electric element disposed on the substrate.

1 Claim, 54 Drawing Sheets

US 8,098,478 B2

ELECTRIC ELEMENT

TECHNICAL FIELD

The present invention relates to electric elements, and particularly, it relates to electric elements that function as a noise filter effective over a wide range of high-frequencies.

BACKGROUND ART

A three terminal feed-through capacitor is well known as a conventional multilayer electronic component (Patent Document 1). FIG. 81 is a perspective view of the conventional three terminal feed-through capacitor. With reference to FIG. 81, a three terminal feed-through capacitor 1800 comprises a laminated stack 1801, external signal electrodes 1802 and 1803, and an external ground electrode 1804.

The external signal electrode 1802 is disposed on one end surface of the laminated stack 1801, and the external signal electrode 1803 is disposed on the other end surface of the laminated stack 1801. The external ground electrode 1804 is tubular and disposed around the side surfaces of the laminated stack 1801. The external signal electrodes 1802 and 1803 and the external ground electrode 1804 are in the form of a sheet and formed by coating the laminated stack 1801 with a conductive paste and by baking the same thereafter.

FIG. 82 is a cross-sectional view of the three terminal feed-through capacitor 1800 viewed along line XXXXXXXXII-XXXXXXXXII shown in FIG. 81. With reference to FIG. 82, the laminated stack 1801 comprises an internal signal electrode 1805, an internal ground electrode 1806 and a dielectric 1807. The internal signal electrode 1805 and the internal ground electrode 1806 are alternately laminated through the dielectric 1807. One end of the internal signal electrode 1805 is connected to the external signal electrode 1802, and the other end to the external signal electrode 1803. The internal ground electrode 1806 is connected to the external ground electrode 1804 in the perpendicular direction to a surface of the figure.

When the three terminal feed-through capacitor 1800 is mounted on a substrate, bottom ends 1802A, 1803A and 1804A of the external signal electrodes 1802 and 1803 and the external ground electrode 1804 are connected to the wiring on the (printed substrate) substrate.

As described above, the conventional three terminal feed-through capacitor 1800 comprises the internal signal electrode 1805 and the external ground electrode 1806, which are laminated through the dielectric 1807 in the normal direction of the substrate.

Patent Document 1: Japanese Unexamined Patent Application Publication No. 2003-22932

DISCLOSURE OF INVENTION

With the conventional three terminal feed-through capacitor, its plurality of internal signal electrodes laminated in the normal direction of the substrate are connected to the external signal electrodes, which are in the shape of a sheet. Therefore, the resistance encountered when a DC current flows across an internal signal electrode, which is disposed near the connecting point of the wiring on the substrate and the external signal electrode, is greater than that encountered when a DC current flows across another internal signal electrode disposed far away from the connecting point. As a result, a relatively large amount of DC current flows across the internal signal electrode disposed near the connecting point, while a relatively small amount of DC current flows across the internal signal electrode disposed far away from the connecting point.

Therefore, the conventional three terminal feed-through capacitor is problematic in that, since a DC current of different amount flows across each internal signal electrode, it is hard to determine the amount of DC current acceptable in the whole three terminal feed-through capacitor according to the amount of DC current that flows across one of the internal signal electrodes.

In addition, there are problems in that with the conventional three terminal feed-through capacitor, the impedance at frequencies where the inductance is dominant is not reduced to a satisfactory level.

Accordingly, the present invention is aimed at solving the aforementioned problems. It is an object of the present invention to provide an electric element whose acceptable amount of DC current is easily determined.

Another object of the present invention is to provide an electric element having a decreased impedance at frequencies where the inductance is dominant.

According to the present invention, an electric element comprises n (n is a positive integer) first conductive plate, m (m is a positive integer) second conductive plate, first and second electrodes, and j (j is a positive integer) third electrode. The m second conductive plate is alternately laminated with the n first conductive plate. The first electrode is connected to one end of the n first conductive plate. The second electrode is connected to the other end of the n first conductive plate. The j third electrode is connected to the m second conductive plate. The n first conductive plate and the m second conductive plate are laminated in the width direction of plate-like first and second signal lines to which the first and second electrodes are respectively connected.

Preferably, the n first conductive plate includes first and second extended portions. The first extended portion is disposed on one end side of the first conductive plate. The second extended portion is disposed on the other end side of the first conductive plate. The first electrode is connected to the n first extended portion, and the second electrode is connected to the n second extended portion.

Preferably, the j third electrode includes first and second cathode electrode. The first cathode electrode is connected to a first part of the m second conductive plate. The second cathode electrode is connected to a second part of the m second conductive plate.

Preferably, the first conductive plate is substantially rectangular in plane shape, and the first and second extended portions are disposed on a same long side of the rectangle.

Preferably, the j third electrode includes first and second cathode electrodes. The first cathode electrode is connected to a first part of the m second conductive plate. The second cathode electrode is connected to a second part of the m second conductive plate.

Preferably, the m second conductive plate includes third and fourth extended portions. The third extended portion is disposed on the first part of the second conductive plate. The fourth extended portion is disposed on the second part of the second conductive plate. The first cathode electrode is connected to the m third extended portion, and the second cathode electrode is connected to the m fourth extended portion.

Preferably, the second conductive plate is substantially rectangular in plane shape, and the third and fourth extended portions are disposed on a same long side of the rectangle.

Preferably, the electric element further comprises a plurality of dielectric layers. Each of the plurality of dielectric layers is disposed between the first conductive plates and the second conductive plates.

Preferably, the n first conductive plate includes first and second extended portions. The first extended portion is disposed on one end side of the first conductive plate in the longitudinal direction of the electric element. The second extended portion is disposed on the other end side of the first conductive plate in the longitudinal direction of the electric element. The m second conductive plate includes a third extended portion disposed between the first extended portion and the second extended portion in the longitudinal direction of the electric element. When a first distance is the distance between the first extended portion and the third extended portion in the longitudinal direction of the electric element and a second distance is the distance between the second extended portion and the third extended portion in the longitudinal direction of the electric element, the distance/length ratio given by dividing the sum of the first and second distances by the total length of the electric element is lower than a standard value. The standard value is give, in a standard electric element including an anode conductive plate connected to two anode electrodes and a cathode conductive plate connected to the cathode electrode that are laminated in the normal direction of the substrate, by subtracting the length of the cathode electrode from the length of the anode conductive plate and then dividing the resulting value by the length of the standard electric element. The first electrode is connected to the n first extended portion, the second electrode is connected to the n second extended portion, and the j third electrode is connected to the m third extended portion.

Preferably, the first distance is substantially equal to the second distance.

Preferably, the n first conductive plate (11-14) includes first and second extended portions. The first extended portion is disposed on one end side of the first conductive plate in the longitudinal direction of the electric element and extending out in the normal direction of the substrate. The second extended portion is disposed on the other end side of the first conductive plate in the longitudinal direction of the electric element and extending out in the normal direction of the substrate. The m second conductive plate includes a third extended portion disposed between the first extended portion and the second extended portion in the longitudinal direction of the electric element and extending out in the normal direction of the substrate. The first extended portion, the second extended portion and the third extended portion are disposed on a same side of the first and second conductive plates in the normal direction of the substrate. The first electrode is connected to the n first extended portion, the second electrode is connected to the n second extended portion, and the j third electrode is connected to the m third extended portion.

Preferably, the m third extended portion includes fourth and fifth extended portions. The fourth extended portion is extending out in a first direction, in the normal direction of the substrate, from one end of the second conductive plate in the normal direction of the substrate. The fifth extended portion is extending out in a second direction opposite to the first direction, in the normal direction of the substrate, from the other end of the second conductive plate in the normal direction of the substrate. A laminated stack of the n first conductive plate and the m second conductive plate is substantially rectangular parallelepiped in shape. The j third electrode includes a fourth electrode connected to the m fourth extended portion on a bottom surface of the rectangular parallelepiped; a fifth electrode connected to the m fifth extended portion on an upper surface of the rectangular parallelepiped; and a sixth electrode orthogonally-crossed to the bottom surface and the upper surface of the rectangular parallelepiped, disposed on at least one of the side surfaces of the rectangular parallelepiped in a direction in which the n first conductive plate and the m second conductive plate are laminated, and connected to the fourth and fifth electrodes.

Preferably, the third extended portion includes fourth and fifth extended portions. The fourth extended portion is disposed one end side of the second conductive plate in the longitudinal direction of the electric element. The fifth extended portion is disposed on the other end side of the second conductive plate in the longitudinal direction of the electric element. The j third electrode includes first and second cathode electrodes. The first cathode electrode is connected to the m fourth extended portion. The second cathode electrode is connected to the m fifth extended portion.

Preferably, the electric element further comprises a third conductive plate. The third conductive plate is connected to the first and second electrodes electrically parallel to the n first conductive plate.

According to the present invention, an electric element comprises n (n is a positive integer) first conductive plate, m (m is a positive integer) second conductive plate, first and second electrodes, and j (j is a positive integer) third electrode. The m second electrode is alternately laminated with the n first conductive plate. The first electrode is connected to one end of the n first conductive plate. The second electrode is connected to the other end of the n first conductive plate. The j third electrode is connected to the m second conductive plate. The n first conductive plate includes first and second extended portions. The first extended portion is disposed on one end side of the first conductive plate. The second extended portion is disposed on the other end side of the first conductive plate. The m second conductive plate includes j third extended portion disposed on one end side of the second conductive plate in the width direction. The first extended portion, the second extended portion and the third extended portion are extending out in a same in-plane direction of the first conductive plate and the second conductive plate. The first electrode is connected to the n first extended portion. The second electrode is connected to the n second extended portion. The j third electrode is connected to the j third extended portion.

Preferably, when a first distance is the distance between the first extended portion and the third extended portion in the longitudinal direction of the electric element and a second distance is the distance between the second extended portion and the third extended portion in the longitudinal direction of the electric element, the distance/length ratio given by dividing the sum of the first and second distances by the total length of the electric element is lower than a standard value. The standard value is given, in a standard electric element including an anode conductive plate connected to two anode electrodes and a cathode conductive plate connected to a cathode electrode that are laminated in the normal direction of the substrate, by subtracting the length of the cathode electrode from the length of the anode conductive plate and then dividing the resulting value by the length of the standard electric element.

Preferably, the j third extended portion includes fourth and fifth extended portions. The j third electrode includes a first cathode electrode connected to the fourth extended portion and a second cathode electrode connected to the fifth extended portion.

Preferably, the fourth and fifth extended portions are disposed between the first extended portion and the second extended portion in the longitudinal direction of the electric element.

Preferably, the n first conductive plate further includes a fourth extended portion. The fourth extended portion is extending out opposite to the first and second extended portions in an in-plane direction of the first conductive plates. The m second conductive plate further includes a fifth extended portion. The fifth extended portion is extending out opposite to the third extended portion in an in-plane direction of the second conductive plate.

Preferably, the electric element further comprises a third conductive plate. The third conductive plate is connected to the first and second electrodes electrically parallel to the n first conductive plate.

In the electric element according to the present invention, the n first conductive plate receives a current through the first electrode with a series resistance substantially equal to the others, and then flows the received current to the second electrode with a series resistance substantially equal to the others. As a result, if the amount of current that flows across the one first conductive plate is determined, the total amount of current that flows across the all of the n first conductive plate is determined by multiplying the amount of the current that flows across the one first conductive plate by the number of laminated first conductive plate.

Accordingly, with the present invention, the amount of DC current acceptable in the whole element is easily determined.

In the electric element according to the present invention, when the first distance is the distance between the first extended portion, disposed on one end of the first conductive plate connected to the anode electrode, and the third extended portion of the second conductive plate connected to the cathode electrode; and a second distance is the distance between the second extended portion, disposed on the other end of the first conductive plate connected to the anode electrode, and the third extended portion of the second conductive plate connected to the cathode electrode; the distance/length ratio given by dividing the sum of the first and second distances by the total length of the electric element is lower than that of the conventional electric element. As a result, in the electric element according to the present invention, the distance for which an AC current flows across the first and second conductive plates is less than the distance for which an AC current flows across two conductive plates in the conventional electric element, and therefore, the inductance between the electric element according to the present invention and the ground potential becomes less than that between the conventional electric element and the ground potential.

Therefore, the present invention is capable of making the impedance lower than that of the conventional transmission-line noise filter.

In the electric element according to the present invention, the third conductive plate is connected between the first and second electrodes electrically parallel to the n first conductive plate. As a result, a DC current flows across the n first conductive plate and the third conductive plate from the first electrode side to the second electrode side.

Accordingly, the present invention is capable of flowing more DC current, compared with an electric element without the third conductive plate.

BEST MODE FOR CARRYING OUT THE INVENTION

Figure 1:
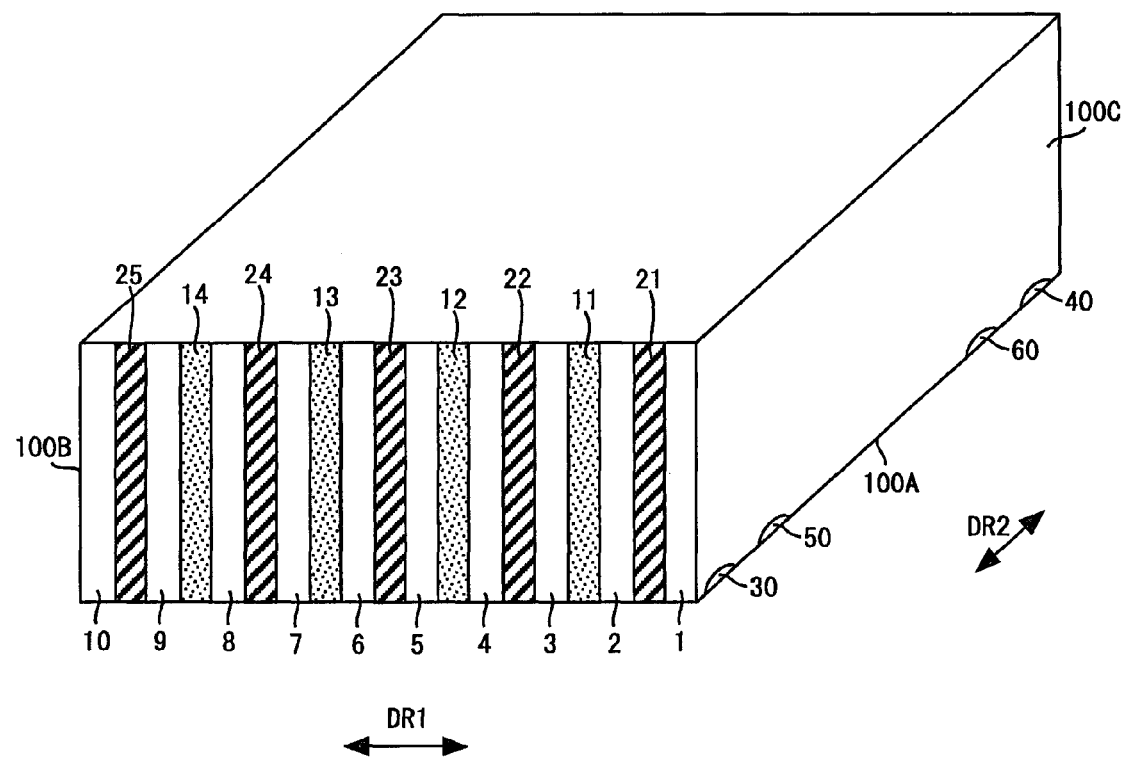
FIG. 1 is a perspective view illustrating the structure of an electric element according to Embodiment 1 of the present invention.

The present invention will now be described in embodiments with reference to the drawings more specifically. In the figures, identical or like components are identically denoted by the same reference characters and explanations thereof are not repeated.

Embodiment 1

FIG. 1 is a perspective view illustrating the structure of an electric element according to Embodiment 1 of the present invention. With reference to FIG. 1, an electric element 100 according to Embodiment 1 of the present invention comprises dielectric layers 1 to 10, conductive plates 11 to 14 and 21 to 25, anode electrodes 30 and 40, and cathode electrodes 50 and 60.

The dielectric layers 1 to 10 are subsequently laminated in the width direction DR1 that is the in-plane direction of the substrate. The conductive plates 11 to 14 are respectively disposed between the dielectric layers 2 and 3, between the dielectric layers 4 and 5, between the dielectric layers 6 and 7, and between the dielectric layers 8 and 9. The conductive plates 21 to 25 are respectively disposed between the dielectric layers 1 and 2, between the dielectric layers 3 and 4, between the dielectric layers 5 and 6, between the dielectric layers 7 and 8, and between the dielectric layers 9 and 10. As a result, the dielectric layers 1 to 9 respectively support the conductive plates 21, 11, 22, 12, 23, 13, 24, 14, and 25.

The anode electrodes 30 and 40 and the cathode electrodes 50 and 60 are disposed on the bottom surface 100A and part of the side surfaces 100B and 100C of the electric element 100. The anode electrode 30 is connected to one end of the conductive plates 11 to 14, and the anode electrode 40 is connected to the other end of the conductive plates 11 to 14. The cathode electrode 50 is connected to first parts of the conductive plates 21 to 25, and the cathode electrode 60 are connected to second parts of the conductive plates 21 to 25. The two cathode electrodes 50 and 60 are disposed between the two anode electrodes 30 and 40 in the longitudinal direction DR2 of the electric element 100.

As described above, the electric element 100 comprises the conductive plates 11 to 14 and 21 to 25, which are alternately disposed through the dielectric layers 1 to 10 interposed therebetween; the two anode electrodes 30 and 40; and the two cathode electrodes 50 and 60.

Each of the dielectric layers 1 to 10 is formed of, for example, barium titanate ($BaTiO_3$). Each of the anode electrodes 30 and 40, the conductive plates 11 to 14 and 21 to 25, and the cathode electrodes 50 and 60 is formed of, for example, nickel (Ni).

Figure 2:
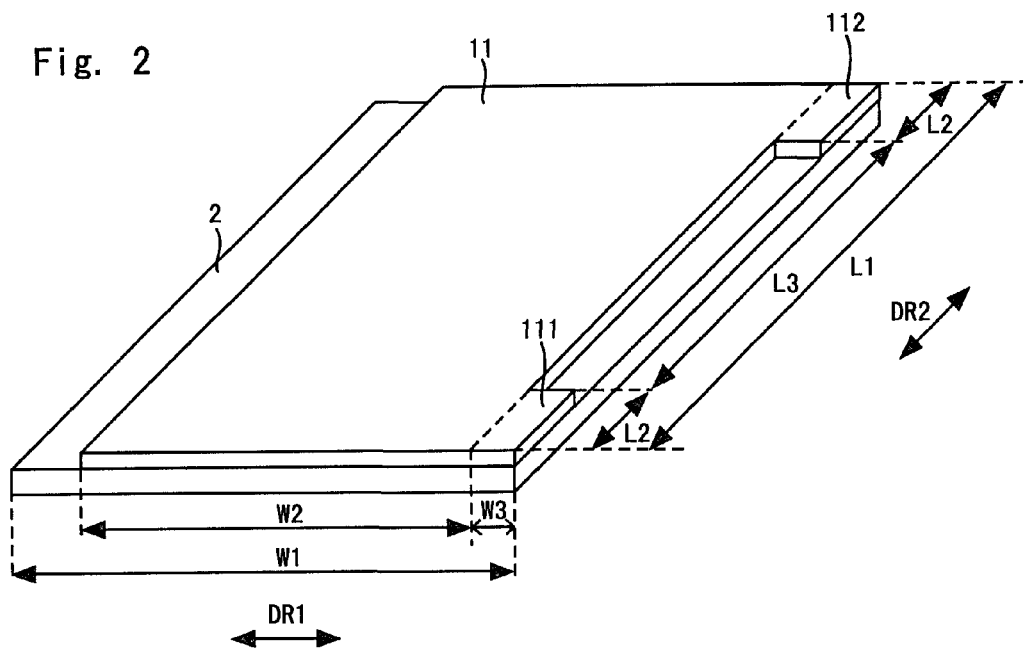
FIG. 2 illustrates the dimensions of the dielectric layer and the conductive plate shown in FIG. 1.

FIG. 2 illustrates the dimensions of the dielectric layer 2 and the conductive plate 11 shown in FIG. 1. With reference to FIG. 2, the dielectric layer 2 is plate-like in shape and has a length L1 in the longitudinal direction DR2 (=the direction in which a current flows across the conductive plate 11) and a width W1 in the width direction DR1 that is perpendicular to the longitudinal direction DR2. The length L1 is 15 mm, for example, and the width W1 is 13 mm, for example. Note that the dielectric layer 2 has a thickness of, for example, 25 μm.

The conductive plate 11 is plate-like in shape and has the length L1 and a width W2. The width W2 is shorter than the width W1 and is 11 mm, for example. The conductive plate 11 has a thickness of 10 μm to 20 μm, for example.

The conductive plate 11 is substantially rectangular and has extended portions 111 and 112 disposed on the same long side of the rectangle. The extended portion 111 is disposed on one end side of the conductive plate 11 in the longitudinal direction DR2, while the extended portion 112 is disposed on the other end side of the conductive plate 11 in the longitudinal direction DR2. Each of the extended portions 111 and 112 has a width W3 in the width direction DR1 and a length L2 in the longitudinal direction DR2. The width W3 is 0.5 mm, for example, and the length L2 is 1 mm, for example. The distance between the extended portion 111 and the extended portion 112 is a distance L3, which is 13 mm, for example.

Note that each of the conductive plates 12 to 14 has the same shape and dimensions as those of the conductive plate 11 shown in FIG. 2.

Figure 3:
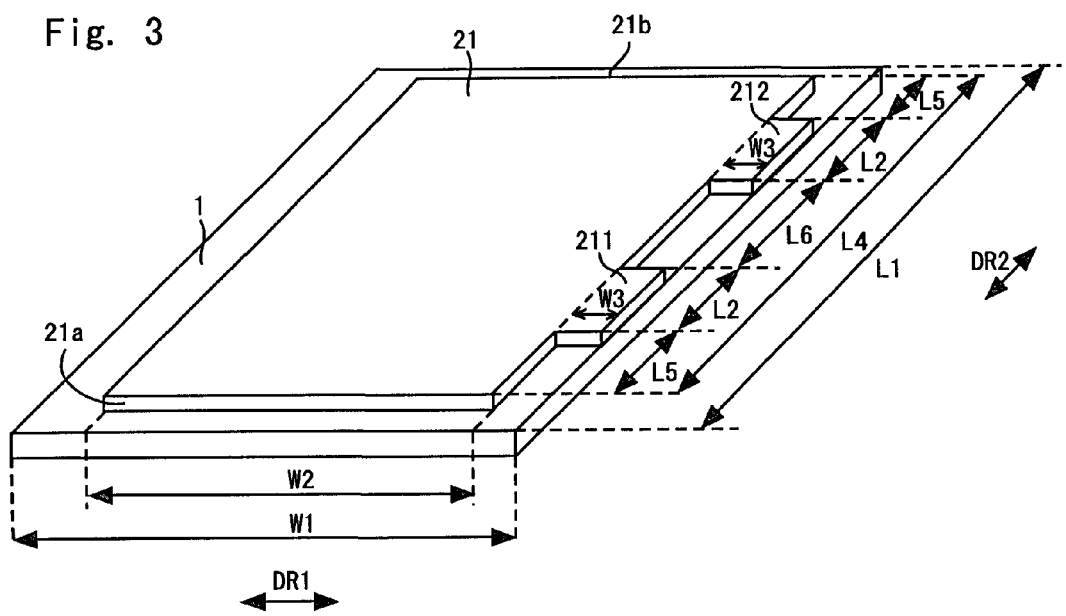
FIG. 3 illustrates the dimensions of another dielectric layer and another conductive plate shown in FIG. 1.

FIG. 3 illustrates the dimensions of another dielectric layer 1 and another conductive plate 21 shown in FIG. 1. With reference to FIG. 3, the dielectric layer 1 is plate-like in shape and has the same length L1 and width W1 as those of the dielectric layer 2. The dielectric layer 1 has a thickness of, for example, 25 μm.

The conductive plate 21 is plate-like in shape and has a length L4, which is shorter than the length L1, and the width W2. The length L4 is 13 mm, for example. The conductive plate 21 has a thickness of 10 μm to 20 μm, for example.

The conductive plate 21 has extended portions 211 and 212. The extended portion 211 has the length L2 and the width W3, and is disposed on a position that is distance-L5 away from one end 21a of the conductive plate 21. The extended portion 212 has the length L2 and the width W3, and is disposed on a position that is the distance-L5 away from the other end 21b of the conductive plate 21. As a result, the distance between the extended portion 211 and the extended portion 212 is a distance L6. The distance L5 is 2 mm, for example. Thus, the distance L6 is 7 mm.

Note that each of the conductive plates 22 to 25 has the same shape and dimensions as those of the conductive plate 21 shown in FIG. 3. Each of the dielectric layers 3 to 10 has the same shape and dimensions as those of the dielectric layer 2 shown in FIG. 2 and the dielectric layer 1 shown in FIG. 3.

Figure 4:
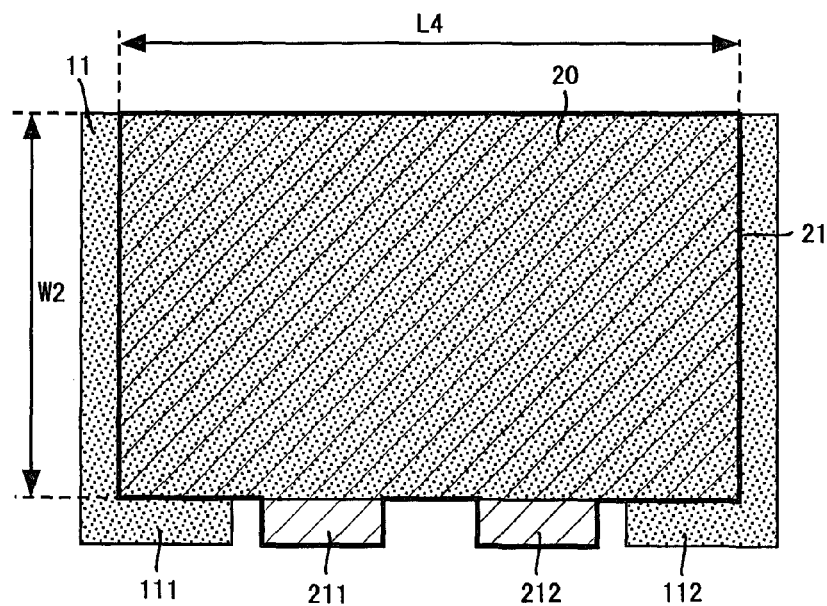
FIG. 4 is a plan view of two adjacent conductive plates.

FIG. 4 is a plan view of two adjacent conductive plates. With reference to FIG. 4, if projected onto a plain surface, the conductive plates 11 and 21 have an overlap 20. The overlap 20 between the conductive plate 11 and the conductive plate 21 has the length L4 and the width W2. Each of the overlaps between the conductive plate 11 and the conductive plate 22, between the conductive plate 12 and the conductive plate 22, between the conductive plate 12 and the conductive plate 23, between the conductive plate 13 and the conductive plate 23, between the conductive plate 13 and the conductive plate 24, between the conductive plate 14 and the conductive plate 24, and between the conductive plate 14 and the conductive plate 25 has the same length L4 and width W2 as those of the overlap 20. In Embodiment 1, the length L4 and the width W2 satisfy W2≦L4.

Figure 5:
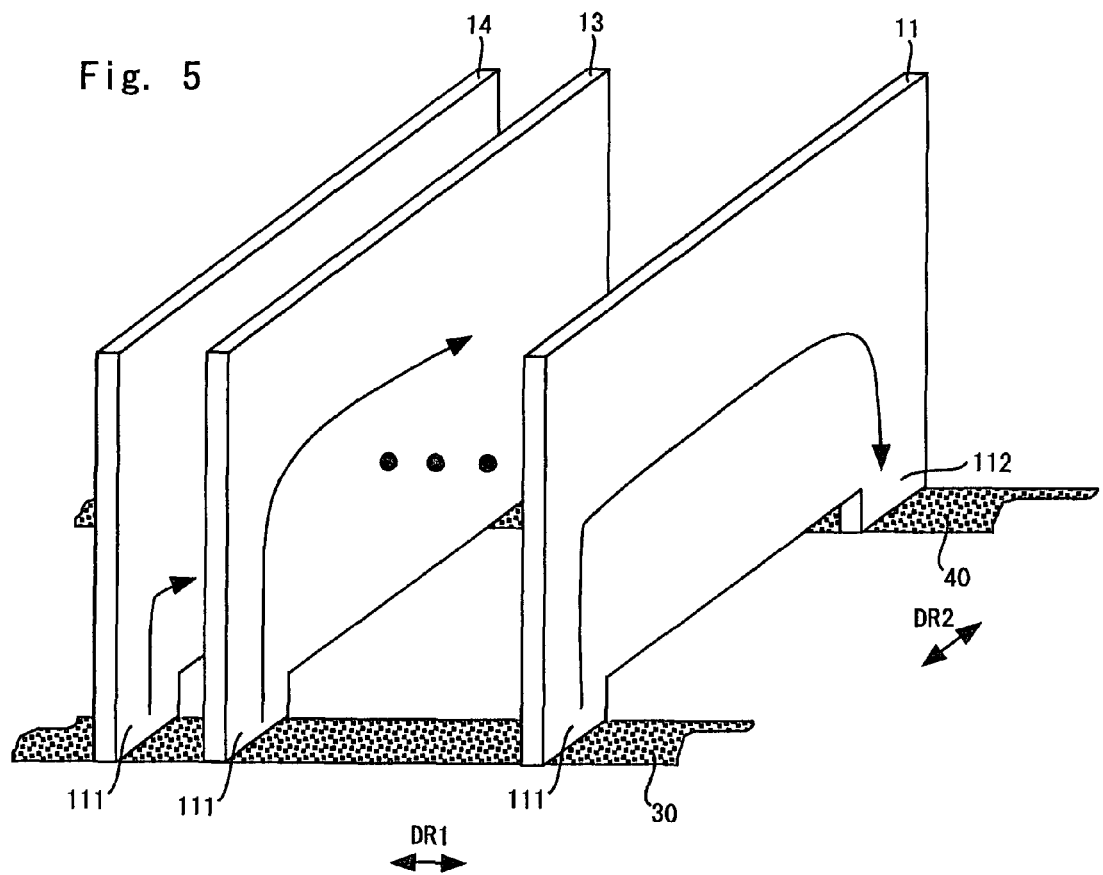
FIG. 5 is a conceptual diagram illustrating how to connect the one conductive plates and the anode electrodes of the electric element.

FIG. 5 is a conceptual diagram illustrating how to connect the one conductive plates 11 to 14 and the anode electrodes 30 and 40 of the electric element 100. With reference to FIG. 5, the anode electrodes 30 and 40 are disposed with the shape of a band in the width direction DR1. The four extended portions 111 of the four conductive plates 11 to 14 are connected to the anode electrode 30, and the four extended portions 112 of the four conductive plates 11 to 14 are connected to the anode electrode 40. As a result, the four extended portions 111, which are the connecting points of the four conductive plates 11 to 14 and the anode electrode 30, are disposed in the width direction DR1. The four extended portions 112, which are the connecting points of the four conductive plates 11 to 14 and the anode electrode 40, are disposed in the width direction DR1.

When the anode electrode 30 is connected to a power supply, and the anode electrode 40 to an electric load, a DC current flows across each of the conductive plates 11 to 14 in the arrow direction.

Figure 6:
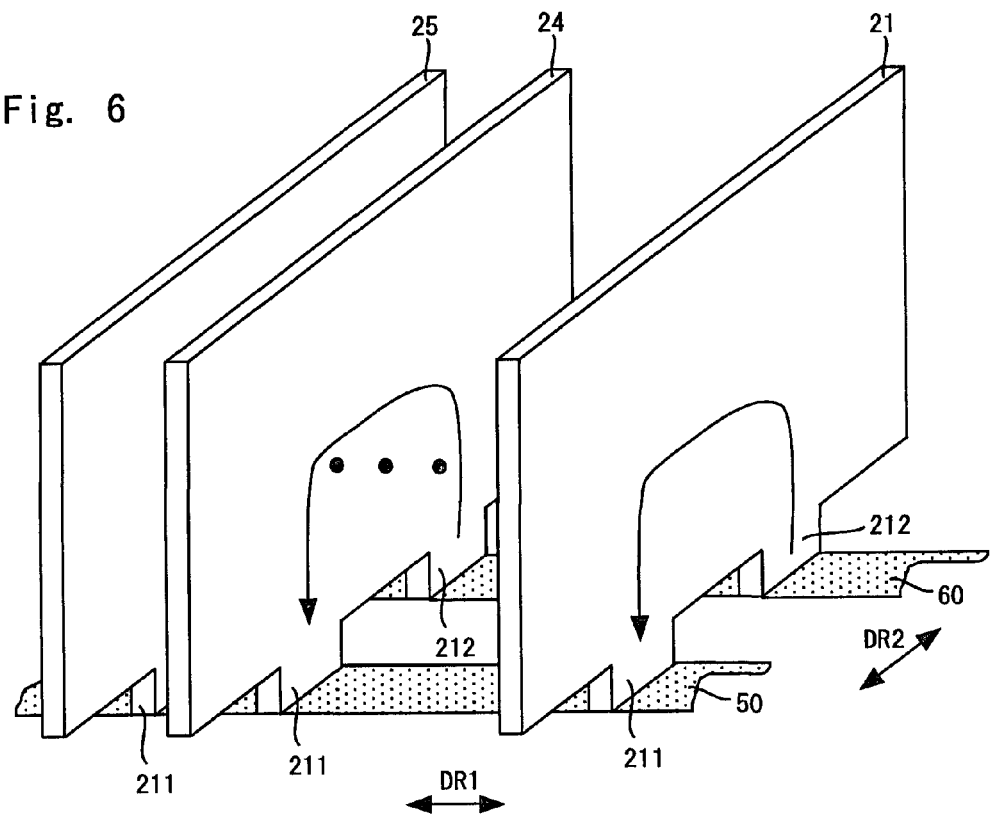
FIG. 6 is a conceptual diagram illustrating how to connect the other conductive plates and the cathode electrodes of the electric element.

FIG. 6 is a conceptual diagram illustrating how to connect the other conductive plates 21 to 25 and the cathode electrodes 50 and 60 of the electric element 100. With reference to FIG. 6, the cathode electrodes 50 and 60 are disposed with the shape of the band in the width direction DR1. The five extended portions 211 of the five conductive plates 21 to 25 are connected to the cathode electrode 50, and the five extended portions 212 of the five conductive plates 21 to 25 are connected to the cathode electrode 60. As a result, the five extended portions 211, which are the connecting points of the five conductive plates 21 to 25 and the cathode electrode 50, are disposed in the width direction DR1. The five extended portions 212, which are the connecting points of the five conductive plates 21 to 25 and the cathode electrode 60, are disposed in the width direction DR1.

When the cathode electrode 50 is connected to a power supply, and the cathode electrode 60 to an electric load, a DC current flows across each of the conductive plates 21 to 25 in the arrow direction.

The conductive plates 11 to 14 are connected to the anode electrodes 30 and 40 as illustrated in FIG. 5, and the conductive plates 21 to 25 are connected to the cathode electrodes 50 and 60 as illustrated in FIG. 6. As a result, stacks of the conductive plate 21/the dielectric layer 2/the conductive plate 11, the conductive plate 11/the dielectric layer 3/the conductive plate 22, the conductive plate 22/the dielectric layer 4/the conductive plate 12, the conductive plate 12/the dielectric layer 5/the conductive plate 23, the conductive plate 23/the dielectric layer 6/the conductive plate 13, the conductive plate 13/the dielectric layer 7/the conductive plate 24, the conductive plate 24/the dielectric layer 8/the conductive plate 14, and the conductive plate 14/the dielectric layer 9/the conductive plate 25 constitute eight capacitors that are connected parallel to each other between the anode electrodes 30 and 40 and the cathode electrodes 50 and 60.

In this case, the electrode area of each capacitor is equal to the area of the overlap 20 (refer to FIG. 4) of the two adjacent conductive plates.

The electric element 100 shown in FIG. 1 is fabricated by the method described below. An area having the length L4 and the width W2 in a surface of a green sheet, which is to be the dielectric layer 1 (BaTiO$_3$) having the length L1 and the width W1, is coated with Ni paste by screen printing to form the conductive plate 21 of Ni on the surface of the dielectric layer 1.

The dielectric layers 3, 5, 7, and 9 of BaTiO$_3$ are formed in the same manner, and then, the conductive plates 22 to 25 of Ni are respectively formed on the dielectric layers 3, 5, 7, and 9.

Then, an area having the length L1 and the width W2 in a surface of a green sheet, which is to be the dielectric layer 2 (BaTiO$_3$) having the length L1 and the width W1, is coated with Ni paste by screen printing to form the conductive plate 11 of Ni on the surface of the dielectric layer 2.

The dielectric layers 4, 6 and 8 of BaTiO$_3$ are formed in the same manner, and then, the conductive plates 12 to 14 of Ni are formed on the dielectric layers 4, 6 and 8.

In addition, a green sheet that is to be the dielectric layer 10 (BaTiO$_3$) is formed.

After that, the green sheets of the dielectric layers 1 to 9 respectively having the conductive plates 21, 11, 22, 12, 23, 13, 24, 14, and 25 thereon and the green sheet of the dielectric layer 10 are sequentially laminated in the width direction DR1. In this manner, the conductive plates 11 to 14, which are connected to the anode electrodes 30 and 40, and the conductive plates 21 to 25, which are connected to the cathode electrodes 50 and 60, are alternately laminated.

Then, Ni paste is applied by screen printing to form the anode electrodes 30 and 40 and the cathode electrodes 50 and 60. After that, they are burned at 1350 degrees Celsius to complete the electric element 100.

Note that the electric element 100 may be fabricated without using green sheets, by printing and drying a dielectric paste and then printing thereon a conductor, which is followed by further printing of a dielectric paste and the same lamination steps.

Figure 7:
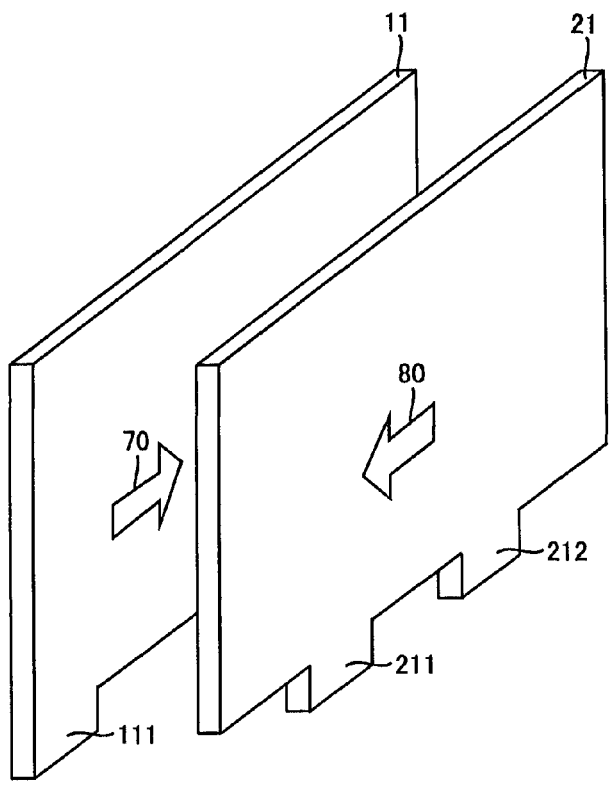
FIG. 7 is a perspective view to explain functions of the electric element shown in FIG. 1.

FIG. 7 is a perspective view to explain functions of the electric element 100 shown in FIG. 1. With reference to FIG. 7, when flowing a current across the electric element 100, the cathode electrodes 50 and 60 are connected to ground, and the current is applied, in opposite directions, to the conductive plates 11 to 14 and to the conductive plates 21 to 25 of the electric element 100.

For example, a current is applied to the electric element 100 in the direction from the anode electrode 30 to the anode electrode 40. The current flows from the anode electrode 30 to the conductive plate 11 through the extended portion 111, and then across the conductive plate 11 in a direction of a arrow 70. The current then flows to the anode electrode 40 through the extended portion 112.

On the other hand, the return current of the current that flows across the conductive plate 11 flows from the cathode electrode 60 to the conductive plate 21 through the extended portion 212, and then flows across the conductive plate 21 in a direction of a arrow 80 that is opposite to the direction of the arrow 70. Then, the return current flows to the cathode electrode 50 through the extended portion 211.

Current flows across each of the conductive plates 12 to 14 as it does across the conductive plate 11, and across each of the conductive plates 22 to 25 as it does across the conductive plate 21.

Thus, a current I1 that flows across the conductive plates 11 to 14 and a current I2 that flows across the conductive plates 21 to 25 are the same in amount and opposite in direction.

Figure 8:
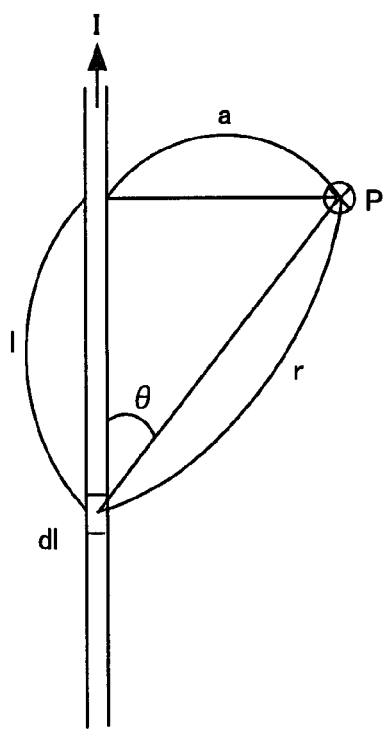
FIG. 8 is a diagram to explain a magnetic flux density produced by current that flows through a conductive wire.
Figure 9:
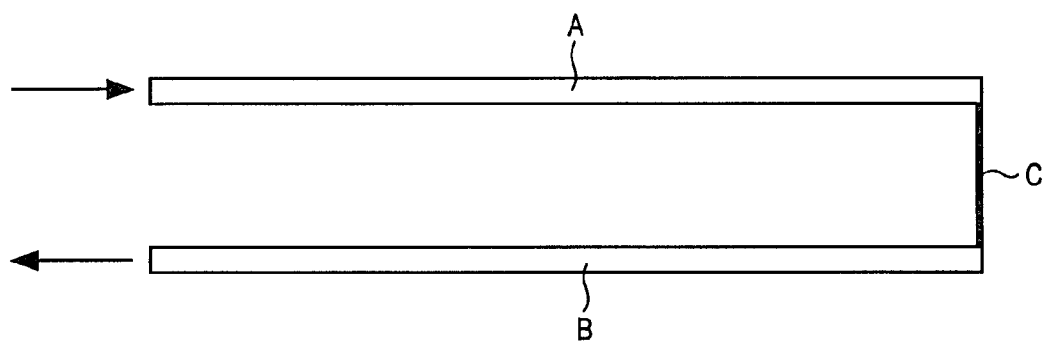
FIG. 9 is a diagram to explain the effective inductance in a case which a magnetic interference occurs between two conductive wires.

FIG. 8 is a diagram to explain a magnetic flux density produced by current that flows through a conductive wire. FIG. 9 is a diagram to explain the effective inductance in a case which a magnetic interference occurs between two conductive wires.

With reference to FIG. 8, when a current I flows across an infinitely-long conductive wire, a magnetic flux density B at point P that is distance a away from the conductive wire is given by:

Equation 1

$$B = \frac{\mu_0 I}{2\pi r} \tag{1}$$

Note that $\mu_0$ represents the space permeability.

If two conductive wires are given in FIG. 8, and they produce a magnetic interference between them, the mutual inductance $L_{12}$ between the two conductive wires is given by the following equation, where $L_{11}$ and $L_{22}$ respectively represent the self inductance of the two conductive wires, and k (0<k<1) represents the coupling coefficient.

Equation 2

$$L_{12} = k \cdot \sqrt{L_{11} \cdot L_{22}} \tag{2}$$

If $L_{11}=L_{22}$ here, the mutual inductance $L_{12}$ is given by the following equation:

Equation 3

$$L_{12}=k \cdot L_{11} \quad (3)$$

With reference to FIG. 9, assuming that conductive wires A and B are connected with a lead C and that current of the same amount flows across the conductive wires A and B in opposite directions, the effective inductance $L_{11effective}$ of the conductive wire A is given by the following equation:

Equation 4

$$L_{11effective}=L_{11}-L_{12} \quad (4)$$

As described above, if there exists a magnetic interference between the two conductive wires A and B, the effective inductance $L_{11effective}$ of the conductive wire A is less than its self inductance $L_{11}$ because of the mutual inductance $L_{12}$ with the conductive wire B. This is because the direction of a magnetic flux $\phi_A$ produced by the current I that flows across the conductive wire A is opposite to that of a magnetic flux $\phi_B$ produced by a current-I that flows across the conductive wire B, and therefore, the effective magnetic flux density produced by the current I becomes small.

As described above, with the electric element 100, the conductive plate 11 is disposed on a position that is 25 μm away from the conductive plates 21 and 22; the conductive plate 12 is disposed on a position that is 25 μm away from the conductive plates 22 and 23; the conductive plate 13 is disposed on a position that is 25 μm away from the conductive plates 23 and 24; and the conductive plate 14 is disposed on a position that is 25 μm away from the conductive plates 24 and 25. Therefore, a magnetic interference is caused between the conductive plate 11 and the conductive plates 21 and 22, between the conductive plate 12 and the conductive plates 22 and 23, between the conductive plate 13 and the conductive plates 23 and 24, and between the conductive plate 14 and the conductive plates 24 and 25. Since the current I1, which flows across the conductive plates 11 to 14, and the current I2, which flows across the conductive plates 21 to 25, are the same in amount and opposite in direction, the effective inductance of the conductive plates 11 to 14 is less than their self inductance because of the mutual inductance between the conductive plates 11 to 14 and the conductive plates 21 to 25.

The impedance Zs of the electric element 100 is given by the following equation, where C denotes the effective capacitance of the whole electric element 100:

Equation 5

$$Zs \approx \sqrt{\frac{L}{C}} \quad (5)$$

With eight capacitors connected parallel to each other, as described above, the effective capacitance C of the electric element 100 is greater than that given with one capacitor.

Therefore, the impedance Zs of the electric element 100 decreases at low frequencies where the capacitance is dominant, according to an increase in the effective capacitance C. The impedance Zs decreases at high frequencies where the inductance is dominant, according to the above-described decrease in the effective inductance L.

As a result, the electric element 100 has relatively low impedance Zs over a wide range of frequencies.

Figure 10:
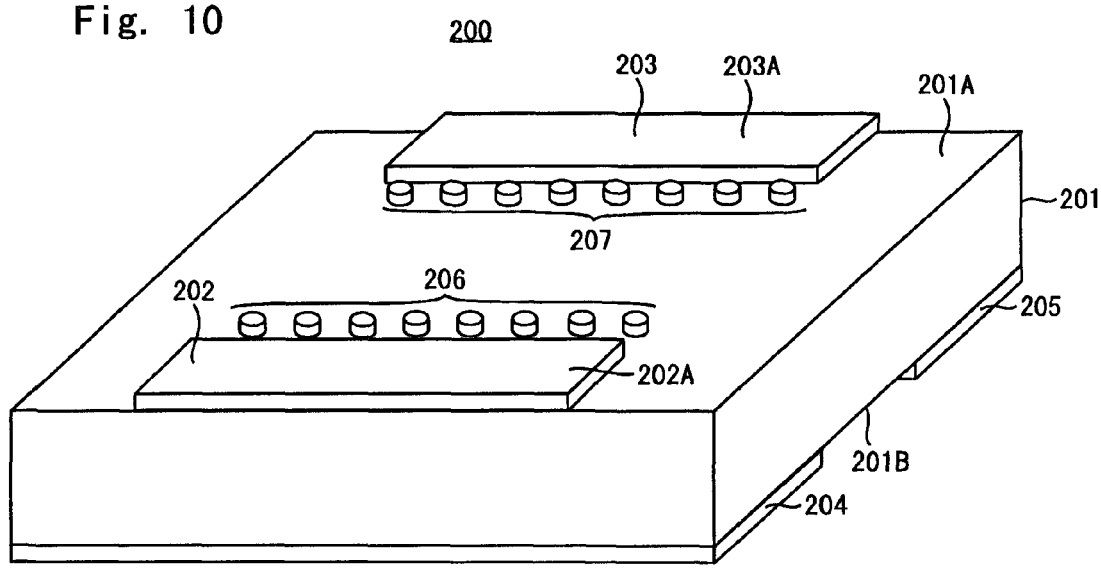
FIG. 10 is a perspective view of a substrate on which the electric element shown in FIG. 1 is disposed.

FIG. 10 is a perspective view of a substrate on which the electric element 100 shown in FIG. 1 is disposed. With reference to FIG. 10, a substrate 200 includes a dielectric 201, conductive plates 202 to 205, and via holes 206 and 207. The dielectric 201 is plate-like in shape. The conductive plates 202 and 203 have the same thickness and disposed, with a predetermined distance, on a front surface 201A of the dielectric 201. Each of the conductive plates 202 and 203 has the same width as that of the electric element 100. The conductive plates 204 and 205 have the same thickness and are disposed, with a predetermined distance, on a back surface 201B of the dielectric 201.

The via holes 206 are disposed near the conductive plate 202. The via holes 206 penetrate through the dielectric 201 and their one ends are connected to the conductive plate 204. The other ends are projecting out from the front surface 201A of the dielectric 201, so that the end faces of the other ends of the via holes 206 correspond to the surface 202A of the conductive plate 202. The via holes 207 are disposed near the conductive plate 203. The via holes 207 penetrate through the dielectric 201, and their one ends are connected to the conductive plate 205. The other ends are projecting out from the surface 201A of the dielectric 201, so that the end faces of the other ends of the via holes 207 correspond to the surface 203A of the conductive plate 203.

Figure 11:
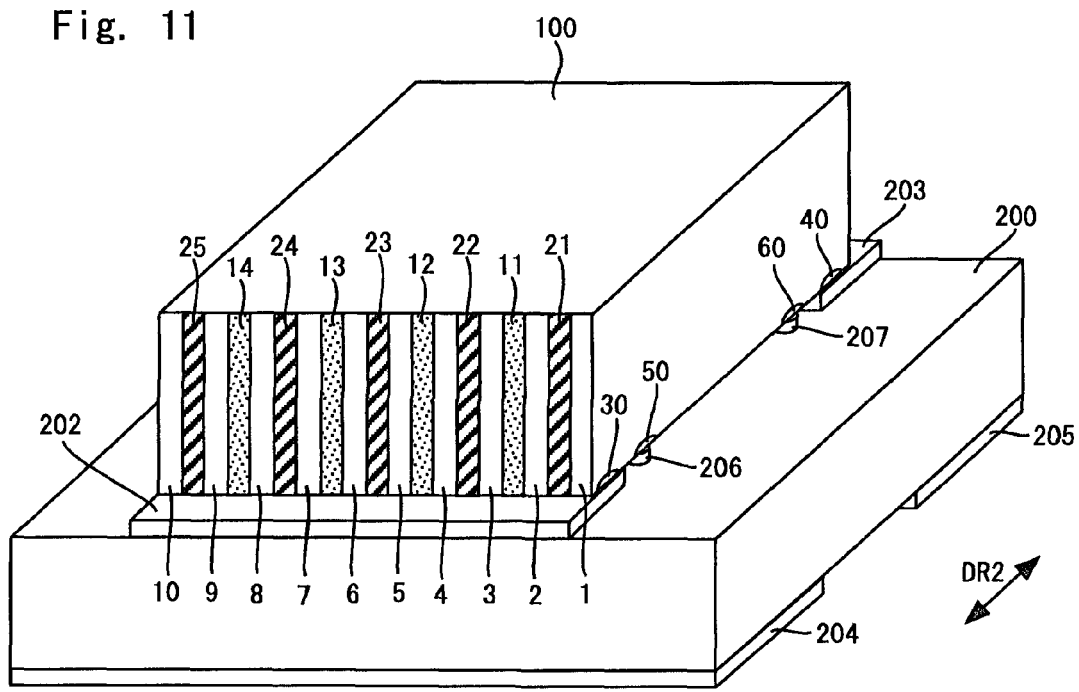
FIG. 11 is a conceptual diagram illustrating the electric element of FIG. 1 disposed on the substrate.

FIG. 11 is a conceptual diagram illustrating the electric element 100 shown in FIG. 1 disposed on the substrate 200. The electric element 100 is disposed on the substrate 200. In this case, the anode electrode 30 is connected to the conductive plate 202, while the anode electrode 40 is connected to the conductive plate 203. The cathode electrode 50 is connected to the conductive plate 204 through the via holes 206, while the cathode electrode 60 is connected to the conductive plate 205 through the via holes 207.

As described above, the conductive plate 202 has the same width as that of the electric element 100, and therefore, when the anode electrode 30 is connected to the conductive plate 202, the distances between the four extended portions 111 of the four conductive plates 11 to 14 of the electric element 100 and the conductive plate 202 are equal to each other (=the thickness of the anode electrode 30). Likewise, the conductive plate 203 has the same width as that of the electric element 100, and therefore, when the anode electrode 40 is connected to the conductive plate 203, the distances between the four extended portions 112 of the four conductive plates 11 to 14 of the electric element 100 and the conductive plate 203 are equal to each other (=the thickness of the anode electrode 40).

When the electric element 100 is mounted on the substrate 200, the conductive plate 202 is connected to a power supply (not illustrated), and the conductive plate 203 is connected to an electric load (not illustrated). As a result, a current I supplied from the power supply to the electric element 100 flows from the conductive plate 202 to the conductive plates 11 to 14 of the electric element 100 through the anode electrode 30, and then flows across the conductive plates 11 to 14 in the longitudinal direction DR2. Then, the current I flows to the conductive plate 203 through the anode electrode 40 and is supplied to the electric load.

On the other hand, a return current Ir from the electric load is supplied to the conductive plate 205 and flows across the conductive plates 21 to 25 of the electric element 100 through the via holes 207 and the cathode electrode 60. Then, the return current Ir flows to the conductive plate 204 through the cathode electrode 50 and the via holes 206 and then returns to the power supply.

As a result, since the distances between the four extended portions 111 of the four conductive plates 11 to 14 and the conductive plate 202 are equal to each other, the current I supplied from the power supply is supplied from the conductive plate 202 to the four conductive plates 11 to 14 with the same resistance. The four conductive plates 11 to 14 are connected parallel to each other between the anode electrodes 30 and 40, and therefore, a current of the same amount (=I/4) flows across each of the four conductive plates 11 to 14. Therefore, if the amount of current that flows across the one conductive plate 11 is determined, the total amount of current that flows across all of the four conductive plates 11 to 14 is given by multiplying the amount of the current that flows across the one conductive plate 11 by the number of laminated conductive plates (=by four), and thus, the total amount of current that flows across the whole electric element 100 is easily determined.

When the electric element 100 is mounted on the substrate 200, the conductive plates 202 and 203 function as signal lines. Therefore, with the electric element 100, the four conductive plates 11 to 14 and the five conductive plates 21 to 25 are laminated in the width direction (=DR1) of both of the signal lines (=the conductive plates 202 and 203) respectively connected to the anode electrode 30 and the anode electrode 40.

Further, with the electric element 100, the four conductive plates 11 to 14 and the five conductive plates 21 to 25 are laminated in a manner where the normal direction of the substrate 200 is substantially parallel to the width direction of the conductive plates 11 to 14 and 21 to 25.

Further, with the electric element 100, the four connecting points (=the four extended portions 111) of the four conductive plates 11 to 14 and the anode electrode 30 are disposed in the in-plane direction of the substrate 200, and the four connecting points (=the four extended portions 112) of the four conductive plates 11 to 14 and the anode electrode 40 are disclosed in the in-plane direction of the substrate 200.

Figure 12:
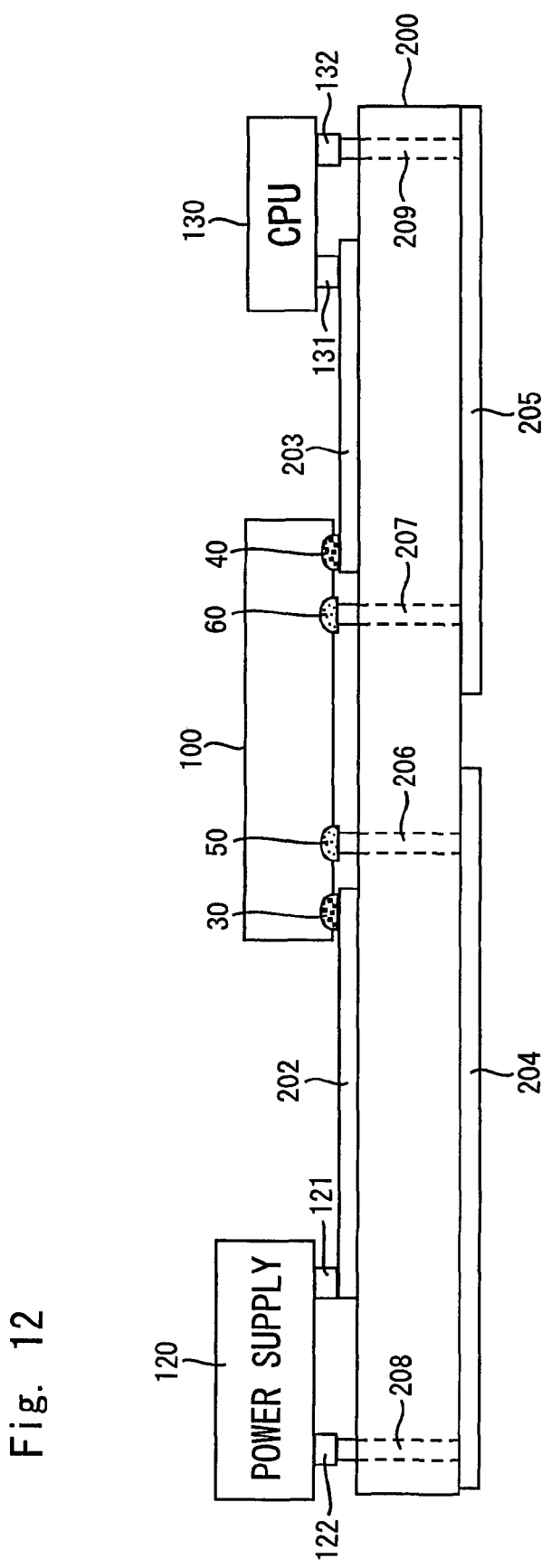
FIG. 12 is a conceptual diagram illustrating the electric element shown in FIG. 1 that is in use.

FIG. 12 is a conceptual diagram illustrating the electric element 100 shown in FIG. 1 that is in use. With reference to FIG. 12, the electric element 100 is connected between a power supply 120 and a CPU (Central Processing unit) 130. The power supply 120 comprises a positive terminal 121 and a negative terminal 122. The CPU 130 comprises a positive terminal 131 and a negative terminal 132.

One end of the conductive plate 202 (the signal line) is connected to the positive terminal 121 of the power supply 120, and the other end is connected to the anode electrode 30 of the electric element 100. One end of the conductive plate 204 is connected to the negative terminal 122 of the power supply 120 through via holes 208, and the other end is connected to the cathode electrode 50 of the electric element 100 through the via holes 206.

One end of the conductive plate 203 (the signal line) is connected to the anode electrode 40 of the electric element 100, and the other end is connected to the positive terminal 131 of the CPU 130. One end of the conductive plate 205 is connected to the cathode electrode 60 of the electric element 100 through the via holes 207, and the other end is connected to the negative terminal 132 of the CPU 130 through via holes 209.

Therefore, a current I output from the positive terminal 121 of the power supply 120 flows to the anode electrode 30 of the electric element 100 through the conductive plate 202 (the signal line), and then flows across the electric element 100 from the four extended portions 111 to the conductive plates 11 to 14, to the four extended portions 112, and to the anode electrode 40. Then, the current I flows from the anode electrode 40 to the CPU 130 through the conductive plate 203 (the signal line) and the positive terminal 131.

In this way, the current I is supplied to the CPU 130 as a power supply current. Then, the CPU 130 is driven by the current I and outputs from the negative terminal 132 a return current Ir of the same amount as the current I.

Then, the return current Ir flows to the conductive plate 205 through the via holes 209, and then flows from the conductive plate 205 to the conductive plates 21 to 25 of the electric element 100 through the via holes 207 and the cathode electrode 60. Then, the return current Ir flows from the cathode electrode 50 to the conductive plate 204 through the via holes 206, and then flows from the conductive plate 204 to the power supply 120 through the via holes 208 and the negative terminal 122.

As a result, with the electric element 100, the current I flows across the conductive plates 11 to 14 in the direction from the power supply 120 to the CPU 130, and the return current Ir flows across the conductive plates 21 to 25 in the direction from the CPU 130 to the power supply 120. Therefore, as described above, the effective inductance L of the electric element 100 relatively remarkably decreases. In addition, the electric element 100 comprises eight capacitors connected parallel to each other, and therefore, the effective capacitance C of the electric element 100 increases. Accordingly, the impedance Zs of the electric element 100 decreases.

The CPU 130 is driven by the current I supplied from the power supply 120 through the electric element 100 and generates an unwanted high-frequency current. The unwanted high-frequency current leaks into the electric element 100 through the via holes 209, the conductive plate 205 and the via holes 207. As described above, however, the electric element 100 has the low impedance Zs, and therefore, the unwanted high-frequency current flows a circuit including the electric element 100 and the CPU 130, which prevents the unwanted high-frequency current from leaking from the electric element 100 toward the power supply 120.

The operating frequency of the CPU 130 tends to be high, and it may operate at about 1 GHz. At such a high operating frequency, the impedance Zs of the electric element 100 is determined mainly based on the effective inductance L. As described above, the effective inductance L relatively remarkably decreases, and therefore, the electric element 100 functions as a noise filter for keeping an unwanted high-frequency current, which is generated by the CPU 130 operating at a high operating frequency, near the CPU 130.

As described above, the electric element 100 is connected between the power supply 120 and the CPU 130 and functions as the noise filter for keeping an unwanted high-frequency current, which is generated by the CPU 130, near the CPU 130. When the electric element 100 is connected between the power supply 120 and the CPU 130, the conductive plates 11 to 14 and 21 to 25 are connected as transmission lines. More specifically, a capacitor comprising the conductive plates 11 to 14, which are connected to the anode electrodes 30 and 40, and the conductive plates 21 to 25, which are connected to the cathode electrodes 50 and 60, are not connected to the transmission lines via terminals: The conductive plates 11 to 14 and 21 to 25 are connected as part of the transmission lines. Therefore, the conductive plates 11 to 14 are conductors for a current I, which is output by the power supply 120, to flow from the power supply 120 to the CPU 130, and the conductive plates 21 to 25 are conductors for a return current Ir to flow from the CPU 130 to the power supply 120. As a result, the equivalent series inductance is avoided as much as possible.

Further, with the electric element 100, a current that flows across the conductive plates 11 to 14 connected to the anode electrodes 30 and 40 is made to flow in the opposite direction to a current that flows across conductive plates 21 to 25 connected to the cathode electrodes 50 and 60. In this way, a magnetic interference is generated between the conductive plates 11 to 14 and the conductive plates 21 to 25, and the self inductance of the conductive plates 11 to 14 is decreased by the mutual inductance between the conductive plates 11 to 14 and the conductive plates 21 to 25. In this way, the effective inductance L of the electric element 100 is decreased, and thus the impedance Zs of the electric element 100 is decreased.

As described above, the present invention is characterized firstly in that the conductive plates 11 to 14 and 21 to 25, which are electrodes of the capacitor, are connected as part of the transmission lines; secondly in that current is applied to flow in opposite directions across the conductive plates 11 to 14 connected to the anode electrode 30 and 40 and across the conductive plates 21 to 25 connected to the cathode electrodes 50 and 60, which results in a magnetic interference between the conductive plates 11 to 14 and the conductive plates 21 to 25, which results in the effective inductance of the conductive plates 11 to 14 less than their self inductance, which result in the decreased impedance Zs of the electric element 100; and thirdly in that each of the conductive plates 11 to 14, which flow the power current, is held between two conductive plates (the conductive plates 21 and 22, the conductive plates 22 and 23, the conductive plates 23 and 24, and the conductive plates 24 and 25) connected to ground.

Further, the present invention is characterized fourthly in that the conductive plates 11 to 14 and 21 to 25 are laminated in the width direction of the conductive plates 202 and 203 (the signal lines).

The second characteristics is realized by adopting the structure where a return current Ir form the CPU 130 flows across the conductive plates 21 to 25 disposed inside the electric element 100.

By the first characteristics, the equivalent series inductance is avoided as much as possible, and by the second characteristics, an unwanted high-frequency current is kept near the CPU 130. In addition, by the third characteristics, noise from the electric element 100 is prevented from leaking out, and the electric element 100 is prevented from being influenced by noise from the outside. Further, by the fourth characteristics, if the amount of current that flows across the one conductive plate 11 is determined, the total amount of current that flows across all of the four conductive plates 11 to 14 is given by multiplying the amount of the current that flows across the one conductive plate 11 by the number of laminated conductive plates (=by 4), and thus the total amount of current that flow across the whole electric element 100 is easily determined.

Figure 13:
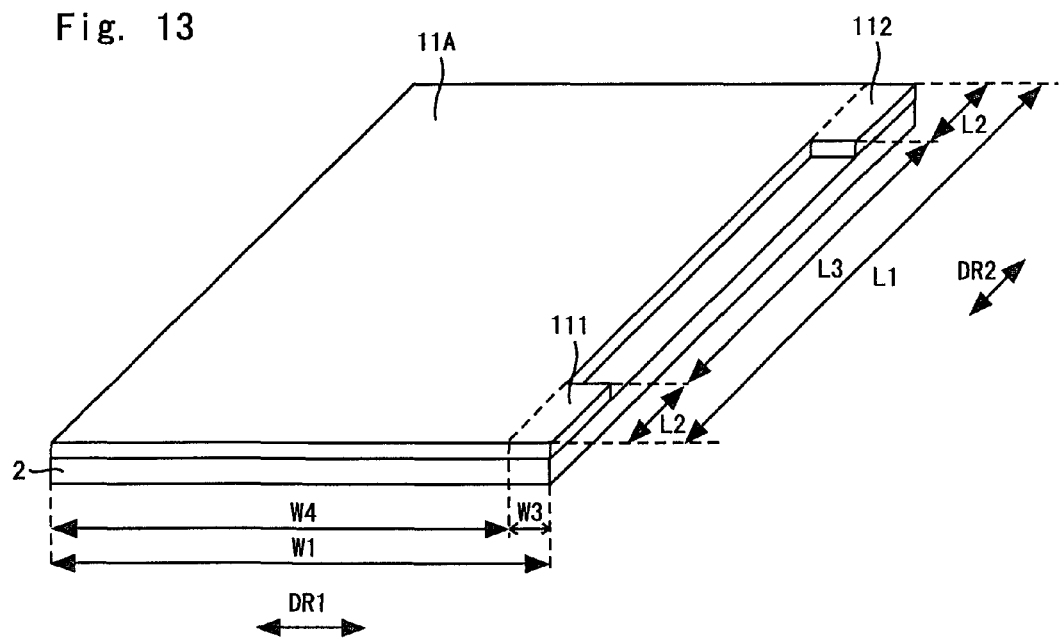
FIG. 13 is a conceptual diagram illustrating another example of one conductive plate used in the electric element shown in FIG. 1.

FIG. 13 is a conceptual diagram illustrating another example of one conductive plate used in the electric element 100 shown in FIG. 1. The electric element 100 according to Embodiment 1 may comprise a conductive plate 11A shown in FIG. 13 instead of the conductive plates 11 to 14.

With reference to FIG. 13, the conductive plate 11A is plate-like in shape and has the length L1 and a width W4. The conductive plate 11A has the same extended portions 111 and 112 as those of the conductive plate 11. The width W4 is, for example, 12 mm. In this case, the sum of the width W3 and the width W4 is equal to the width W1 of the dielectric layer 2. As described above, the conductive plate 11A is identical with the conductive plate 11 shown in FIG. 2 except that the width W2 of the conductive plate 11 is widened to the width W4.

The electric element 100 may comprise four conductive plates each comprising the conductive plate 11A instead of the conductive plates 11 to 14.

Figure 14:
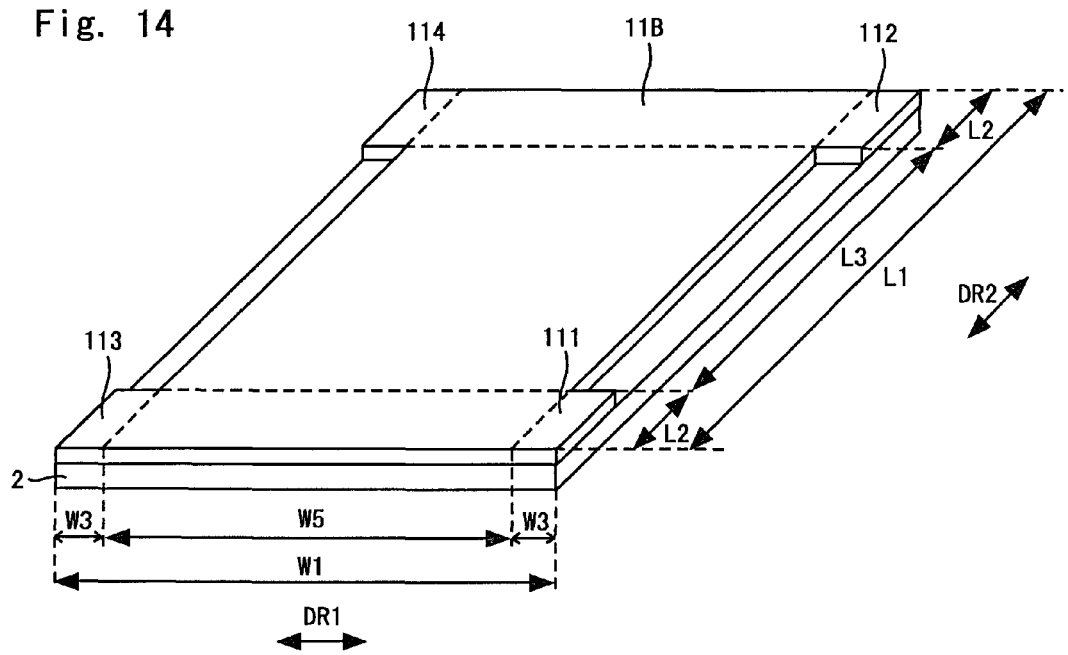
FIG. 14 is a conceptual diagram illustrating another example of one conductive plate used in the electric element shown in FIG. 1.

FIG. 14 is a conceptual diagram illustrating another example of one conductive plate used in the electric element 100 shown in FIG. 1. The electric element 100 according to Embodiment 1 may comprise a conductive plate 11B shown in FIG. 14 instead of the conductive plates 11 to 14.

With reference to FIG. 14, the conductive plate 11B is plate-like in shape and has the length L1 and a width W5. The conductive plate 11B has the extended portions 111 to 114. The width W5 is, for example, 11 mm. Each of the extended portions 113 and 114 has the length L2 and the width W3. More specifically, the four extended portions 111 to 114 have the same dimensions. The conductive plate 11B satisfies 2×W3+W5=W1. As described above, the conductive plate 11B is identical with the conductive plate 11 shown in FIG. 2 except that the width W2 of the conductive plate 11 is changed to the width W5 and that the two extended portions 113 and 114 are added in addition to the extended portions 111 and 112.

The electric element 100 may comprise four conductive plates each comprising the conductive plate 11B instead of the conductive plate 11 to 14.

Figure 15:
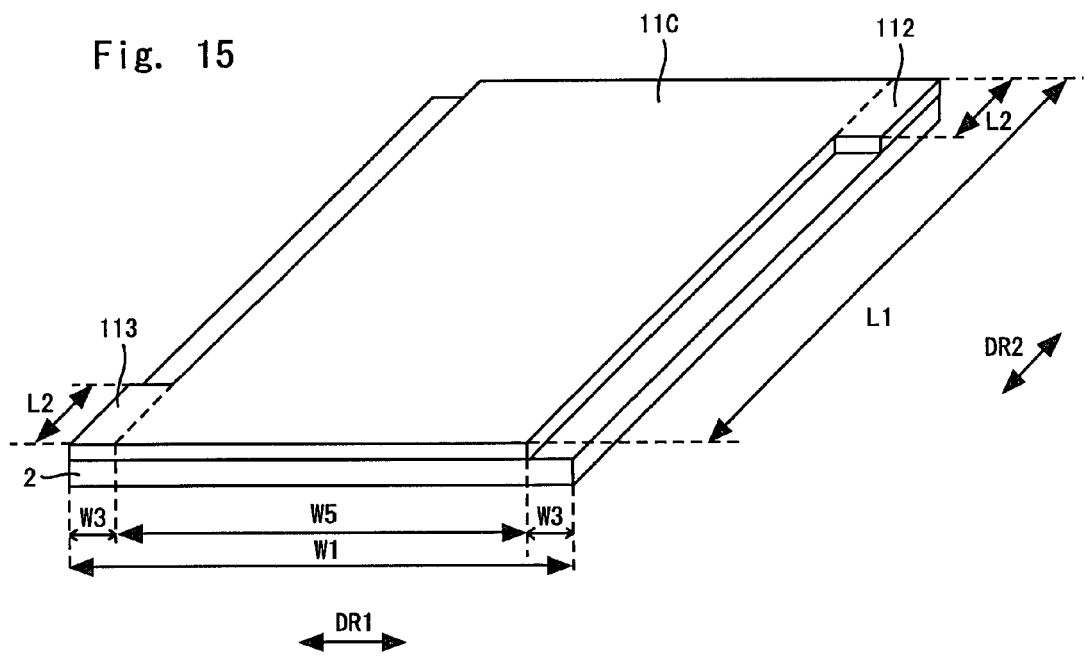
FIG. 15 is a conceptual diagram illustrating another example of one conductive plate used in the electric element shown in FIG. 1.

FIG. 15 is a conceptual diagram illustrating another example of one conductive plate used in the electric element 100 shown in FIG. 1. The electric element 100 according to Embodiment 1 may comprise a conductive plate 11C shown in FIG. 15 instead of the conductive plates 11 to 14.

With reference to FIG. 15, the conductive plate 11C is plate-like in shape and has the length L1 and the width W5. The conductive plate 11C has the extended portions 112 and 113. As described above, the conductive plate 11C is identical with conductive plate 11B shown in FIG. 14 except that the two extended portions 111 and 114 of the conductive plate 11B are removed. As a result, the conductive plate 11C has the two extended portions 112 and 113 disposed diagonally.

The electric element 100 may comprise four conductive plates each comprising the conductive plate 11C instead of the conductive plate 11 to 14.

Figure 16:
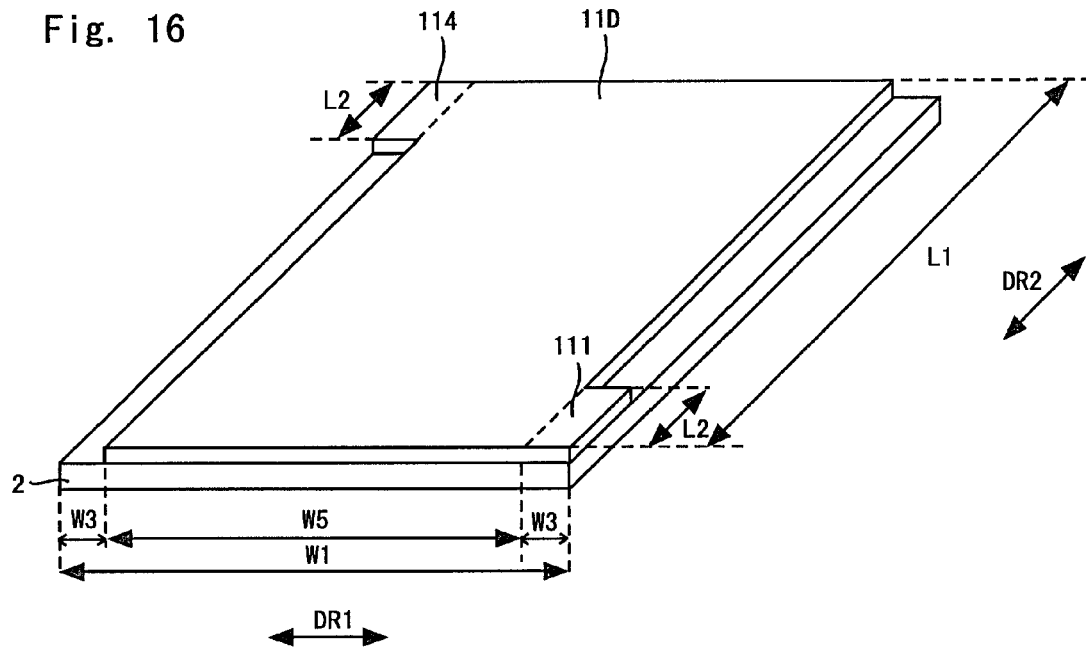
FIG. 16 is a conceptual diagram illustrating another example of one conductive plate used in the electric element shown in FIG. 1.

FIG. 16 is a conceptual diagram illustrating another example of one conductive plate used in the electric element 100 shown in FIG. 1. The electric element 100 according to Embodiment 1 may comprise a conductive plate 11D shown in FIG. 16 instead of the conductive plates 11 to 14.

With reference to FIG. 16, the conductive plate 11D is plate-like in shape and has the length L1 and the width W5. The conductive plate 11D has the extended portions 111 and 114. As described above, the conductive plate 11D is identical with the conductive plate 11B shown in FIG. 14 except that the two extended portions 112 and 113 of the conductive plate 11B are removed. As a result, the conductive plate 11D has the two extended portions 111 and 114 disposed diagonally.

The electric element 100 may comprise four conductive plates each comprising the conductive plate 11D instead of the conductive plates 11 to 14.

Figure 17:
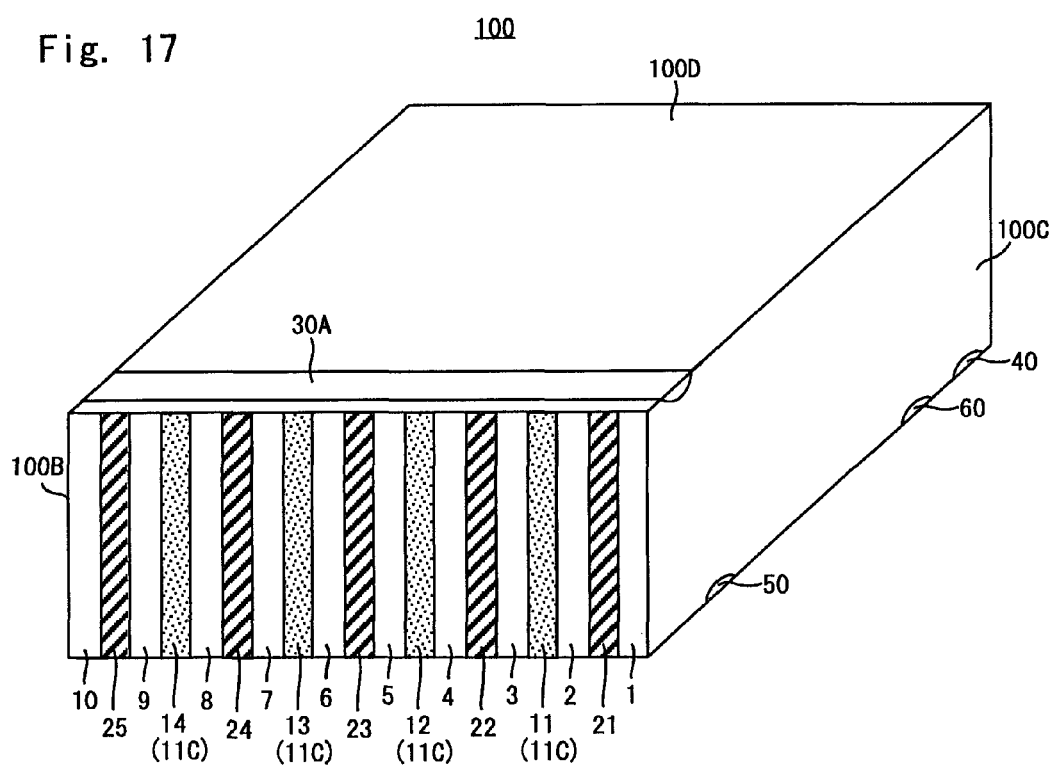
FIG. 17 is a perspective view of the electric element comprising the conductive plate shown in FIG. 15.
Figure 18:
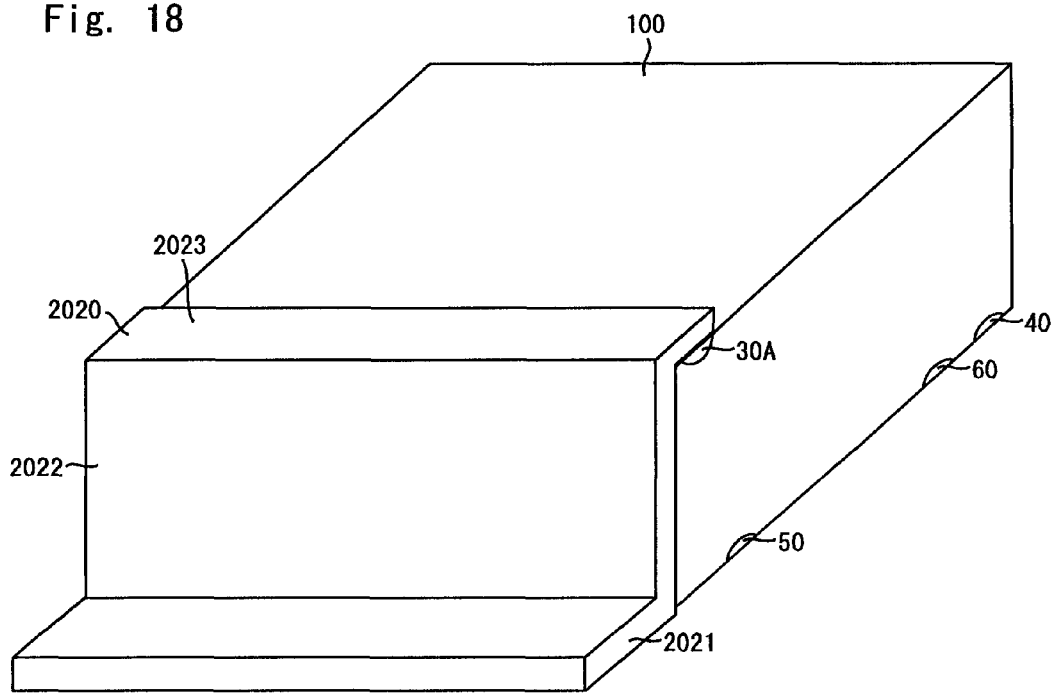
FIG. 18 is another perspective view of the electric element comprising the conductive plate shown in FIG. 15.

FIG. 17 is a perspective view of the electric element 100 comprising the conductive plate 11C shown in FIG. 15. FIG. 18 is another perspective view of the electric element 100 comprising the conductive plate 11C shown in FIG. 15. Comprising the conductive plates 11 to 14 each of which is the conductive plate 11C shown in FIG. 15, the electric element 100 comprises an anode electrode 30A instead of the anode electrode 30. The anode electrode 30A is in the shape of the band and formed on part of the side surfaces 100B and 100C and on the upper surface 100D of the electric element 100 (refer to FIG. 17).

When the electric element 100 shown in FIG. 17 is mounted on the substrate 200, the substrate 200 comprises a conductive plate 2020 (the signal line) instead of the conductive plate 202 (the signal line). The conductive plate 2020 has the same width as that of the electric element 100 and has first to third parts 2021 to 2023. The first part 2021 is formed on the front surface 201A of the dielectric 201 of the substrate 200. The second part 2022 is formed substantially perpendicular to the first part 2021. The third part 2023 is substantially parallel to the first part 2021 and substantially perpendicular to the second part 2022. The third part 2023 of the conductive plate 2020 is connected to the anode electrode 30A of the electric element 100 (refer to FIG. 18).

Accordingly, with the electric element 100, the distances between the four extended portions 113 of the four conductive plates 11 to 14 (each of which is the conductive plate 11C) and the anode electrode 30A is equal to each other, and a current I supplied to the conductive plate 2020 (the signal line) is supplied to the four conductive plates 11 to 14 (each of which is the conductive plate 11C) with the same resistance.

Therefore, when using the conductive plate 11C shown in FIG. 15, if the amount of current that flows across the one conductive plate 11 (=11C) is determined, the total amount of current that flows across all of the four conductive plates 11 (=11C) to 14 (=11C) is given by multiplying the amount of the current that flows across the one conductive plate 11 (=11C) by the number of laminated conductive plates (=by 4), and the total amount of current that flows across the whole electric element 100 is easily determined.

Figure 19:
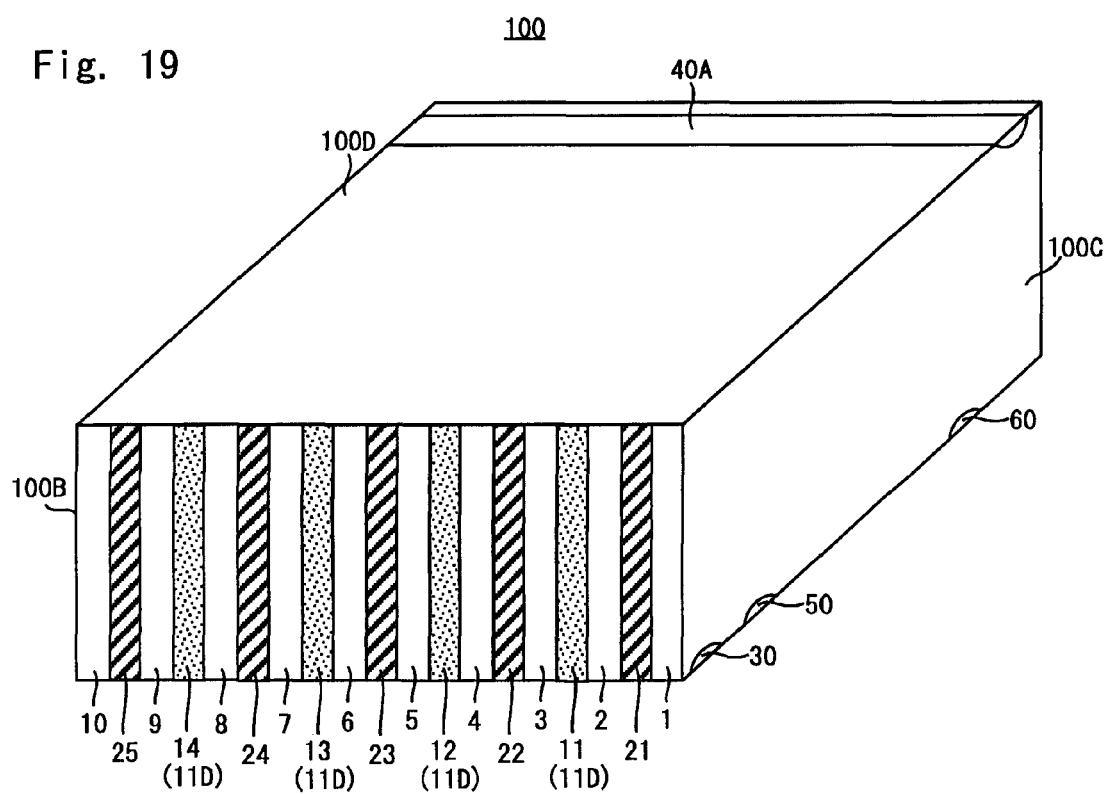
FIG. 19 is a perspective view of the electric element comprising the conductive plate shown in FIG. 16.
Figure 20:
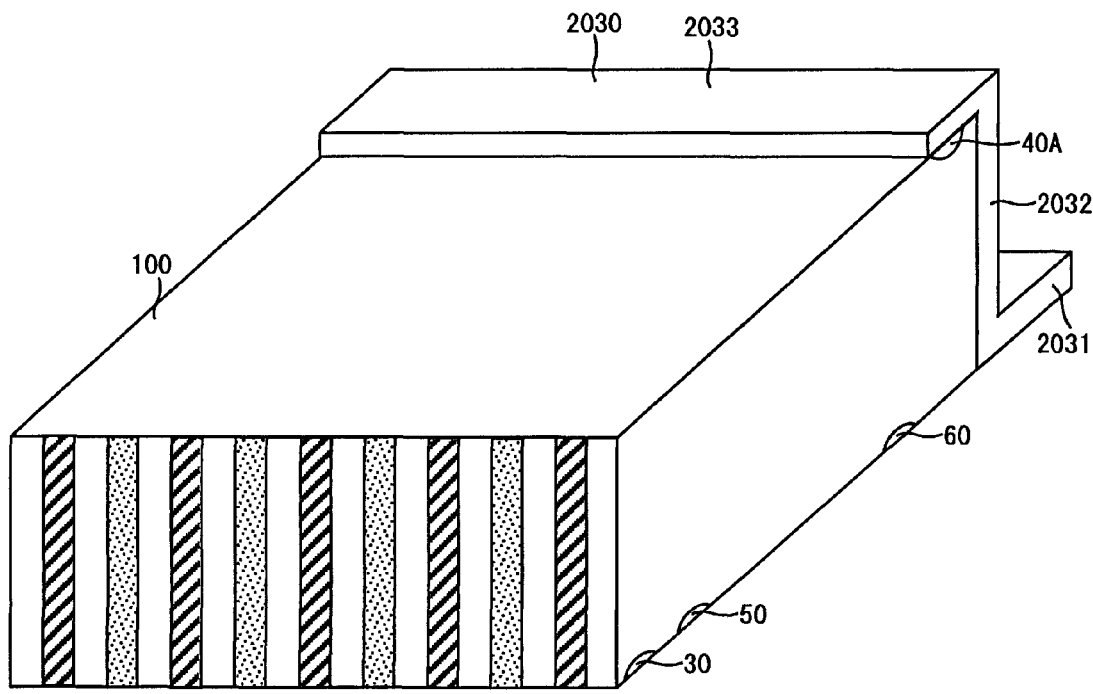
FIG. 20 is another perspective view of the electric element comprising the conductive plate shown in FIG. 16.

FIG. 19 is a perspective view of the electric element 100 comprising the conductive plate 11D shown in FIG. 16. FIG. 20 is another perspective view of the electric element 100 comprising the conductive plate 11D shown in FIG. 16. Comprising the conductive plates 11 to 14 each of which is the conductive plate 11D shown in FIG. 16, the electric element 100 comprises an anode electrode 40A instead of the anode electrode 40. The anode electrode 40A is in the shape of the band and formed on part of the side surfaces 100B and 100C and on the upper surface 100D of the electric element 100 (refer to FIG. 19).

When the electric element 100 shown in FIG. 19 is mounted on the substrate 200, the substrate 200 comprises the conductive plate 2030 (the signal line) instead of the conductive plate 203 (the signal line). The conductive plate 2030 has the same width as that of the electric element 100 and has first to third parts 2031 to 2033. The first part 2031 is formed on the front surface 201A of the dielectric 201 of the substrate 200. The second part 2032 is formed substantially perpendicular to the first part 2031. The third part 2033 is formed substantially parallel to the first part 2031 and substantially perpendicular to the second part 2032. The third part 2033 of the conductive plate 2030 is connected to the anode electrode 40A of the electric element 100 (refer to FIG. 20).

Accordingly, the distances between the four extended portions 114 of the four conductive plates 11 to 14 (each of which is the conductive plate 11D) of the electric element 100 and the anode electrode 40A is equal to each other, and a current I supplied to the four conductive plates 11 to 14 (each of which is the conductive plate 11D) is supplied to the conductive plate 2030 (the signal line) with the same resistance.

Therefore, when using the conductive plate 11D shown in FIG. 16, if the amount of current that flows across the one conductive plate 11 (=11D) is determined, the total amount of current that flows across all of the four conductive plates 11 (=11D) to 14 (=11D) is given by multiplying the amount of the current that flows across the one conductive plate 11 (=11D) by the number of laminated conductive plates (=by 4), and thus the total amount of current that flows across the electric element 100 is easily determined.

Note that when each of the conductive plate 11 to 14 is the conductive plate 11B shown in FIG. 14, the electric element 100 may comprise the anode electrode 30A shown in FIG. 17 instead of the anode electrode 30, and the anode electrode 40A shown in FIG. 19 instead of the anode electrode 40. In this case, the electric element 100 is mounted onto the substrate 200 by the mounting methods respectively shown in FIGS. 18 and 20.

It is described above that all of the dielectric layers 1 to 10 are formed of the same dielectric material ($BaTiO_3$). The present invention, however, is not limited to it: The dielectric layers 1 to 10 may be formed of each different dielectric materials, or two types of dielectric materials. In general, the dielectric layers 1 to 10 only have to be formed of at least one dielectric material. In this case, preferably, the dielectric material of each of the dielectric layers 1 to 10 has the relative permittivity of 3000 or higher.

In addition to $BaTiO_3$, the dielectric material includes $Ba(Ti,Sn)O_3$, $Bi_4Ti_3O_{12}$, $(Ba,Sr,Ca)TiO_3$, $(Ba,Ga)(Zr,Ti)O_3$, $(Ba,Sr,Ca)(Zr,Ti)O_3$, $SrTiO_3$, $CaTiO_3$, $PbTiO_3$, $Pb(Zn,Nb)O_3$, $Pb(Fe,W)O_3$, $Pb(Fe,Nb)O_3$, $Pb(Mg,Nb)O_3$, $Pb(Ni,W)O_3$, $Pb(Mg,W)O_3$, $Pb(Zr,Ti)O_3$, $Pb(Li,Fe,W)O_3$, $Pb_5Ge_3O_{11}$ and $CaZrO_3$.

It is described above that the anode electrodes 30, 40, 30A, and 40A, the conductive plates 11 to 14, 11A, 11B, 11C, 11D, and 21 to 25, and the cathode electrodes 50 and 60 are formed of nickel (Ni). The present invention, however, is not limited to it: The anode electrodes 30, 40, 30A, 40A, the conductive plates 11 to 14, 11A, 11B, 11C, 11D, and 21 to 25, and the cathode electrodes 50 and 60 may be formed of any one of silver (Ag), palladium (Pd), silver-palladium alloy (Ag—Pd), platinum (Pt), gold (Au), copper (Cu), rubidium (Ru), and tungsten (W).

Further, it is described above that the number of conductive plate connected to the anode electrodes 30 and 40 is four (the conductive plates 11 to 14) and that the number of conductive plate connected to the cathode electrodes 50 and 60 is five (the conductive plates 21 to 25). The present invention, however, is not limited to that: The electric element 100 only has to comprise n (n is a positive integer) conductive plate connected to the anode electrodes 30 and 40 and m (m is a positive integer) conductive plate connected to the cathode electrodes 50 and 60. In this case, the electric element 100 comprises j (j=m+n) dielectric layers. This is because, by comprising at least one each of conductive plates connected to the anode electrodes 30 and 40 and to the cathode electrodes 50 and 60, a magnetic interference is generated, which results in a decreased effective inductance.

With the present invention, the more current flows across the electric element 100, the more number of conductive plates are connected to the anode electrodes 30 and 40 and to the cathode electrodes 50 and 60. This is because, when a plurality of conductive plates are connected to the anode electrodes 30 and 40 and to the cathode electrodes 50 and 60, the plurality of conductive plates are connected parallel to each other between two anode electrodes (30 and 40) or two cathode electrodes (50 and 60), and therefore, if the number of conductive plates connected to the anode electrodes 30 and 40 and to the cathode electrodes 50 and 60 increases, the amount of current that flows across the electric element 100 increases.

Further, with the present invention, in order to relatively lower the impedance of the electric element 100, the number of conductive plates connected to the anode electrodes 30 and 40 and to the cathode electrodes 50 and 60 is increased. This is because, if the number of conductive plates connected to the anode electrodes 30 and 40 and to the cathode electrodes 50 and 60 increases, the number of capacitors connected parallel to each other increases, and therefore, the effective capacitance of the electric element 100 increases, which results in a decrease in the impedance.

Further, it is described above that the electric element 100 is used as a noise filter for keeping an unwanted high-frequency current, which is generated by the CPU 130, near the CPU 130. The present invention, however, is not limited to that: The electric element 100 is also used as a capacitor. As described above, the electric element 100 comprises eight capacitors connected parallel to each other, and therefore, is usable as a capacitor.

More specifically, the electric element 100 is used in a laptop computer, a CD-RW/DVD recorder/player, a game console, an information appliance, a digital camera, an in-vehicle equipment, an in-vehicle digital equipment, a peripheral circuit for the MPU, a DC/DC converter or the like.

Therefore, the electric element 100 according to the present invention includes an electric element that is disposed between the power supply 120 and the CPU 130 and functions as a noise filter for keeping an unwanted high-frequency current, which is generated by the CPU 130, near the CPU 130, although it is used in a laptop computer, a CD-RW/DVD recorder/player or the like as a capacitor.

Embodiment 2

Figure 21:
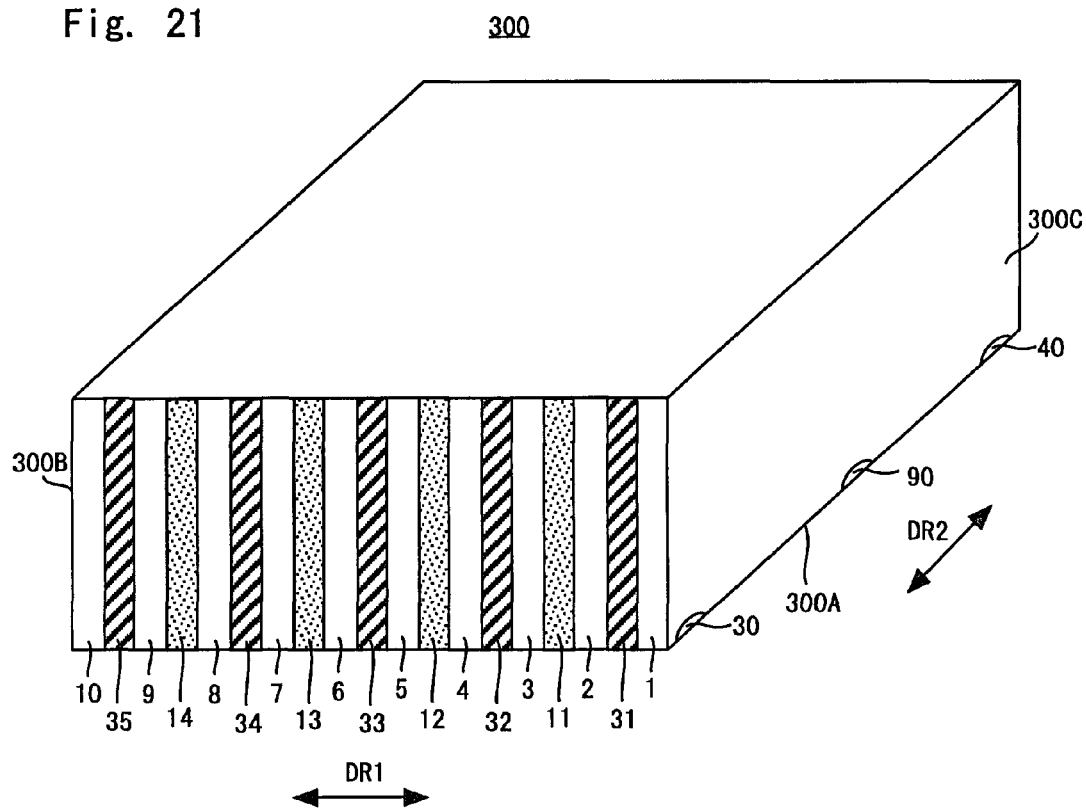
FIG. 21 is a perspective view illustrating the structure of an electric element according to Embodiment 2.

FIG. 21 is a perspective view illustrating the structure of an electric element according to Embodiment 2. With reference to FIG. 21, an electric element 300 according to Embodiment 2 is identical with the electric element 100 shown in FIG. 1 except that the conductive plates 21 to 25 and the cathode electrodes 50 and 60 of the electric element 100 are respectively replaced with conductive plates 31 to 35 and a cathode electrode 90.

The conductive plates 31 to 35 are respectively disposed between the dielectric layers 1 and 2, between the dielectric layers 3 and 4, between the dielectric layers 5 and 6, between the dielectric layers 7 and 8, and between the dielectric layers 9 and 10. As a result, the conductive plates 11 to 14 and 31 to 35 are alternately laminated in the width direction DR1 of the electric element 300.

The cathode electrode 90 is in the shape of the band and formed on the bottom surface 300A and on part of the side surfaces 300B and 300C of the electric element 300. The cathode electrode 90 is connected to the conductive plates 31 to 35. Each of the conductive plates 31 to 35 and the cathode electrode 90 is formed of, for example, Ni.

Figure 22:
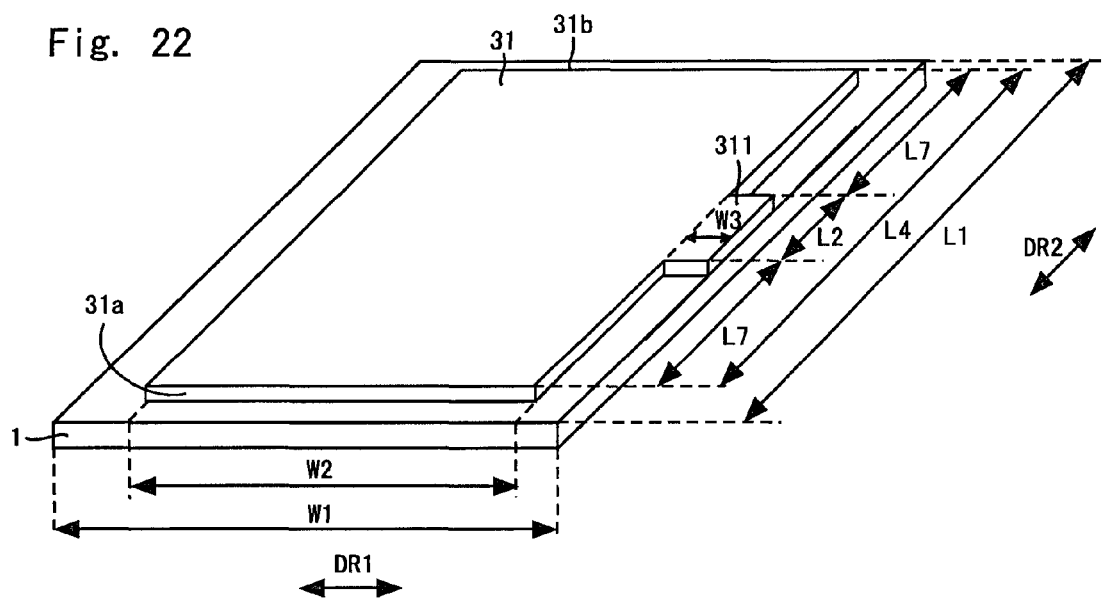
FIG. 22 illustrates the dimensions of the dielectric layer and the conductive plate shown in FIG. 21.

FIG. 22 illustrates the dimensions of the dielectric layer 1 and the conductive plate 31 shown in FIG. 21. With reference to FIG. 22, the conductive plate 31 is plate-like in shape and has the length L4 and the width W2. The conductive plate 31 has a thickness of, for example, 10 μm to 20 μm.

The conductive plate 31 has a extended portion 311. The extended portion 311 has the length L2 and the width W3 and is disposed on a position that is distance-L7 away from the both edges 31a and 31b of the conductive plate 31. The distance L7 is, for example, 5 mm.

Note that each of the conductive plates 32 to 35 has the same shape and dimensions as those of the conductive plate 31 shown in FIG. 22.

Figure 23:
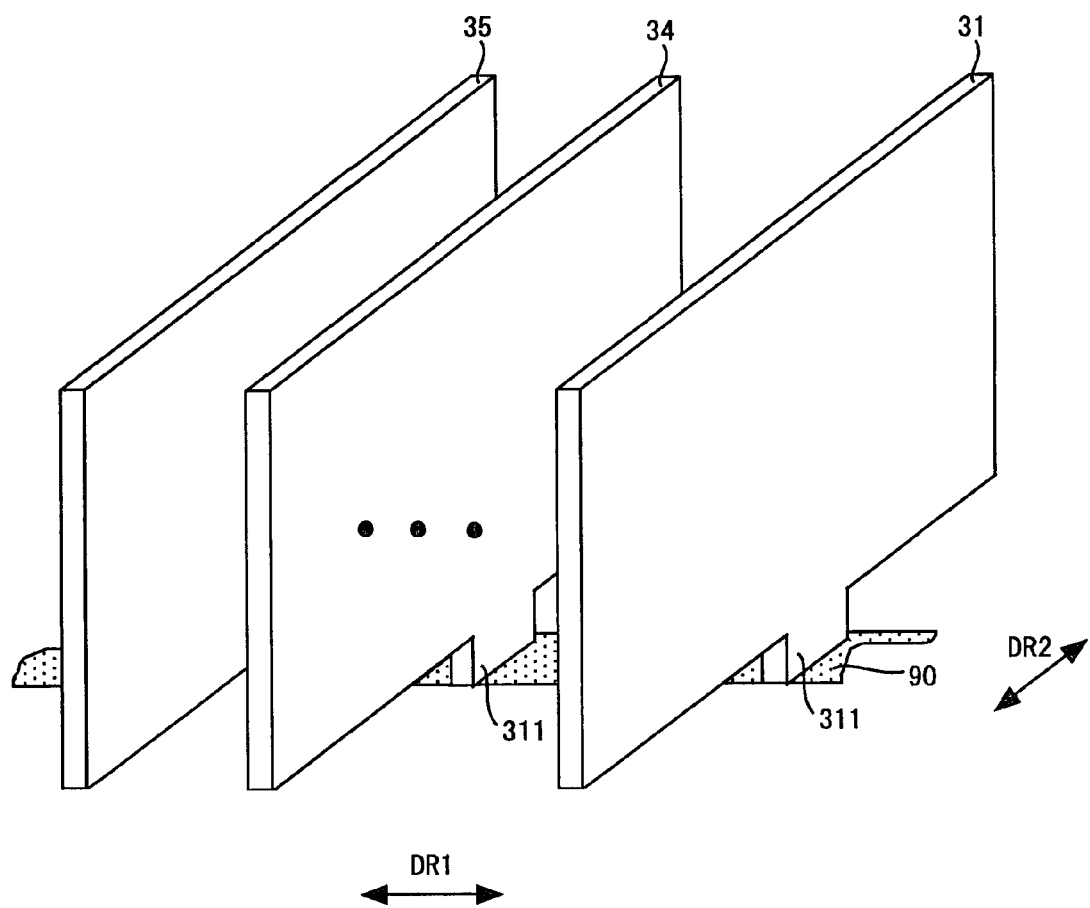
FIG. 23 is a conceptual diagram illustrating how to connect the other conductive plates and the cathode electrode of the electric element shown in FIG. 21.

FIG. 23 is a conceptual diagram illustrating how to connect the other conductive plates 31 to 35 and the cathode electrode 90 of the electric element 300 shown in FIG. 21. With reference to FIG. 23, the cathode electrode 90 is in the shape of the band and disposed in the width direction DR1. The five extended portions 311 of the five conductive plates 31 to 35 are connected to the cathode electrode 90.

The conductive plates 11 to 14 are connected to the anode electrodes 30 and 40 as illustrated in FIG. 5. The conductive plates 31 to 35 are connected to the cathode electrode 90 as illustrated in FIG. 23. As a result, stacks of the conductive plate 31/the dielectric layer 2/the conductive plate 11, the conductive plate 11/the dielectric layer 3/the conductive plate 32, the conductive plate 32/the dielectric layer 4/the conductive plate 12, the conductive plate 12/the dielectric layer 5/the conductive plate 33, the conductive plate 33/the dielectric layer 6/the conductive plate 13, the conductive plate 13/the dielectric layer 7/the conductive plate 34, the conductive plate 34/the dielectric layer 8/the conductive plate 14, and the conductive plate 14/the dielectric layer 9/the conductive plate 35 constitute eight capacitors connected parallel to each other between the anode electrodes 30 and 40 and the cathode electrode 90.

In this case, the electrode area of each capacitor is equal to the overlap area of two adjacent conductive plates.

Note that the electric element 300 is fabricated by the same method as that for fabricating the electric element 100 shown in FIG. 1.

Figure 24:
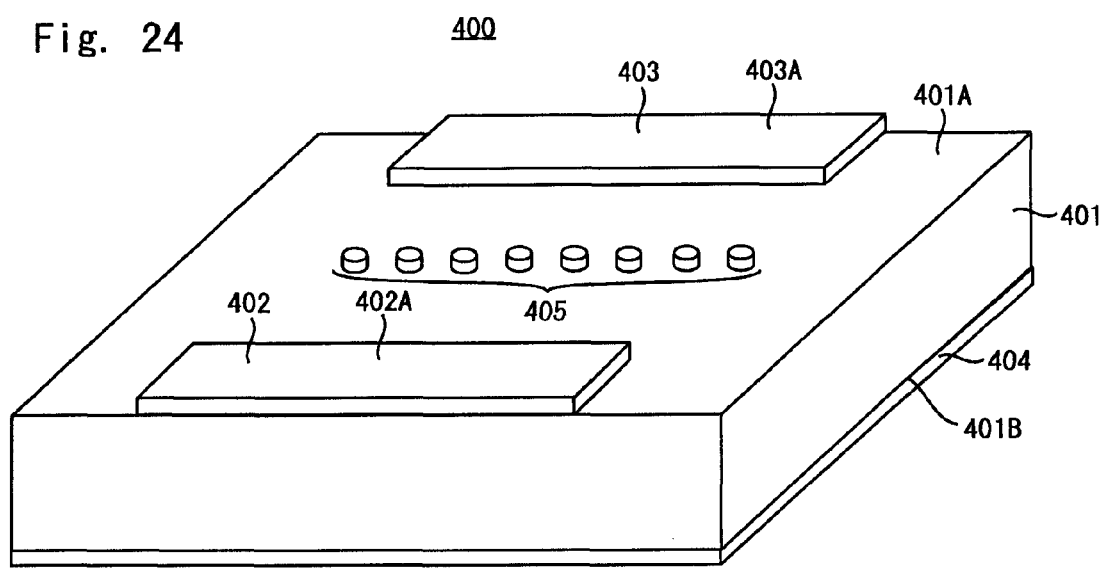
FIG. 24 is a perspective view of a substrate on which the electric element shown in FIG. 21 is disposed.

FIG. 24 is a perspective view of a substrate on which the electric element 300 shown in FIG. 21 is disposed. With reference to FIG. 24, a substrate 400 comprises a dielectric 401, conductive plates 402 to 404 and via holes 405. The dielectric 401 is plate-like in shape. The conductive plates 402 and 403 have the same thickness and are disposed on a front surface 401A of the dielectric 401 with a predetermined distance. Each of the conductive plates 402 and 403 has the same width as that of the electric element 300. The conductive plate 404 is disposed on a back surface 401B of the dielectric 401.

The via holes 405 are disposed substantially in the center between the conductive plate 402 and the conductive plate 403. The via holes 405 penetrate through the dielectric 401. One ends of the via holes 405 are connected to the conductive plate 404. The other ends are projecting out of the front surface 401A of the dielectric 401, so that the end faces of the other ends of the via holes 405 correspond to the surfaces 402A and 403A of the conductive plates 402 and 403.

Figure 25:
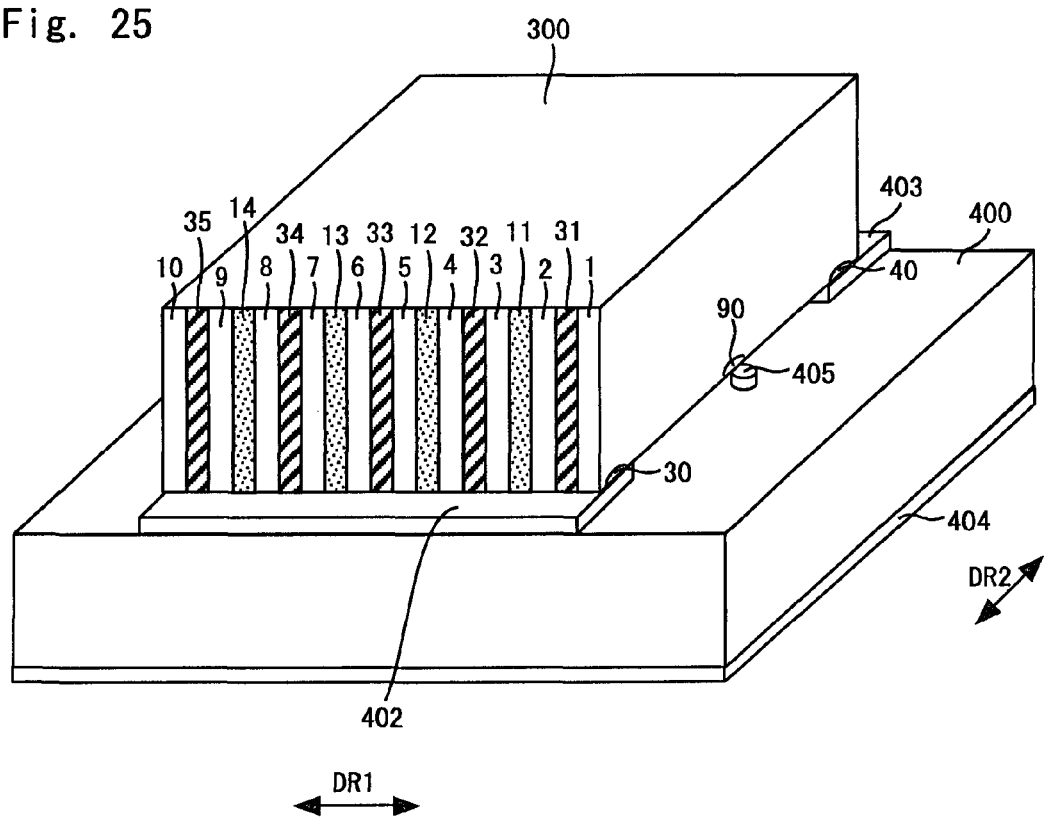
FIG. 25 is a conceptual diagram illustrating the electric element shown in FIG. 21 disposed on the substrate.

FIG. 25 is a conceptual diagram illustrating the electric element 300 shown in FIG. 21 disposed on the substrate 400. The electric element 300 is disposed on the substrate 400. In this case, the anode electrode 30 is connected to the conductive plate 402. The anode electrode 40 is connected to the conductive plate 403. The cathode electrode 90 is connected to the conductive plate 404 through the via holes 405.

As described above, the conductive plate 402 has the same width as that of the electric element 300, and therefore, by connecting the anode electrode 30 to the conductive plate 402, the distances between the four extended portions 111 of the four conductive plates 11 to 14 constituting the electric element 300 and the conductive plate 402 are equal to each other (=the thickness of the anode electrode 30). Likewise, the conductive plate 403 has the same width as that of the electric element 300, and therefore, by connecting the anode electrode 40 to the conductive plate 403, the distances between the four extended portions 112 of the four conductive plates 11 to 14 constituting the electric element 300 and the conductive plate 403 are equal to each other (=the thickness of the anode electrode 40).

When the electric element 300 is mounted onto the substrate 400, the conductive plate 402 is connected to a power supply (not illustrated), and the conductive plate 403 is connected to an electric load (not illustrated). As a result, a current I supplied from the power supply to the electric element 300 flows from the conductive plate 402 to the conductive plates 11 to 14 of the electric element 300 through the anode electrode 30, and then flows across the conductive plates 11 to 14 in the longitudinal direction DR2. Then, the current I flows to the conductive plate 403 through the anode electrode 40 and supplied to the electric load.

Then, since the distances between the four extended portions 111 of the four conductive plates 11 to 14 and the conductive plate 402 are equal to each other, the current I supplied from the power supply is supplied from the conductive plate 402 to the four conductive plates 11 to 14 with the same resistance. The four conductive plates 11 to 14 are connected parallel to each other between the anode electrodes 30 and 40, and therefore, current of an equal amount (=I/4) flows across each of the four conductive plates 11 to 14. Accordingly, if the amount of current that flows across the one conductive plate 11 is determined, the total amount of current that flows across all of the four conductive plates 11 to 14 is given by multiplying the amount of the current that flows across the one conductive plate 11 by the number of laminated conductive plates (=by 4), and thus the total amount of current that flows across the whole electric element 300 is easily determined.

When the electric element 300 is mounted onto the substrate 400, the conductive plates 402 and 403 function as signal lines. Therefore, in the electric element 300, the four conductive plates 11 to 14 and the five conductive plates 31 to 35 are laminated in the width direction (=DR1) of the signal lines (=the conductive plates 402 and 403), to which the anode electrode 30 and the anode electrode 40 are respectively connected.

In addition, in the electric element 300, the four conductive plates 11 to 14 and the five conductive plates 31 to 35 are laminated in a manner where the normal direction of the substrate 400 is substantially parallel to the width direction of the conductive plates 11 to 14 and 31 to 35.

Further, in the electric element 300, the four connecting points (=the four extended portions 111) of the four conductive plates 11 to 14 and the anode electrode 30 are disposed in a in-plane direction of the substrate 400, and the four connecting points (=the four extended portions 112) of the four conductive plates 11 to 14 and the anode electrode 40 are disposed in the in-plane direction of the substrate 400.

Figure 26:
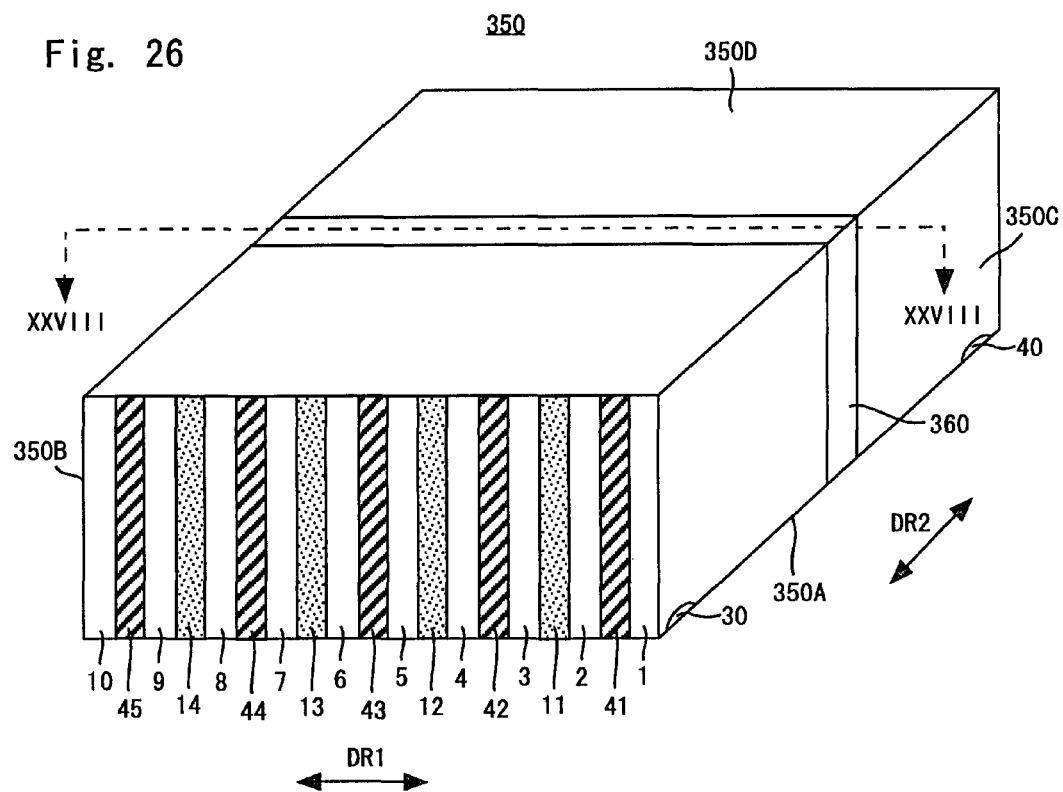
FIG. 26 is a perspective view illustrating the structure of another electric element according to Embodiment 2.

FIG. 26 is a perspective view illustrating the structure of another electric element according to Embodiment 2. The electric element according to Embodiment 2 may be an electric element 350 shown in FIG. 26. With reference to FIG. 26, the electric element 350 is identical with the electric element 300 shown in FIG. 21 except that the conductive plates 31 to 35 and the cathode electrode 90 of the electric element 300 are respectively replaced with conductive plates 41 to 45 and a cathode electrode 360.

The conductive plate 41 is disposed between the dielectric layers 1 and 2. The conductive plate 42 is disposed between the dielectric layers 3 and 4. The conductive plate 43 is disposed between the dielectric layers 5 and 6. The conductive plate 44 is disposed between the dielectric layers 7 and 8. The conductive plate 45 is disposed between the dielectric layers 9 and 10. As a result, the conductive plates 11 to 14 and 41 to 45 are alternately laminated in the width direction DR1 of the electric element 350.

The cathode electrode 360 is disposed, between the anode electrode 30 and the anode electrode 40, on the bottom surface 350A, the side surfaces 350B and 350C and the upper surface 350D of the electric element 350 and connected to the conductive plates 41 to 45.

Figure 27:
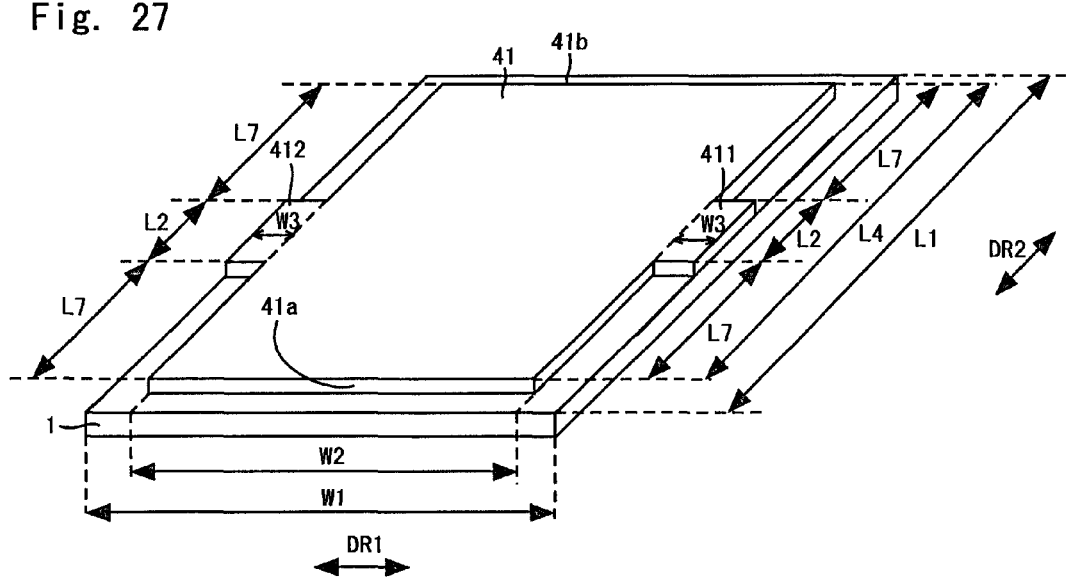
FIG. 27 is a perspective view of the conductive plate shown in FIG. 26.

FIG. 27 is a perspective view of the conductive plate 41 shown in FIG. 26. With reference to FIG. 27, the conductive plate 41 is plate-like in shape and has the length L4 and the width W2. The conductive plate 41 has a thickness of, for example, 10 μm to 20 μm and formed of Ni.

The conductive plate 41 has extended portions 411 and 412. The extended portion 411 is disposed on a position that is the distance-L7 away from the both ends 41a and 41b in the longitudinal direction DR2, in one end side of the conductive plate 41 in the width direction DR1. The extended portion 412 is disposed on a position that is the distance-L7 away from the both ends 41a and 41b in the longitudinal direction DR2, in the other end side of the conductive plate 41 in the width direction DR1. Each of the extended portions 411 and 412 has the length L2 and the width W3. In this case, the distance L7 is, for example, 5 mm.

Note that each of the conductive plates 42 to 45 has the same shape and dimensions of those of the conductive plate 41 shown in FIG. 27 and is formed of the same material as that of the conductive plate 41.

Figure 28:
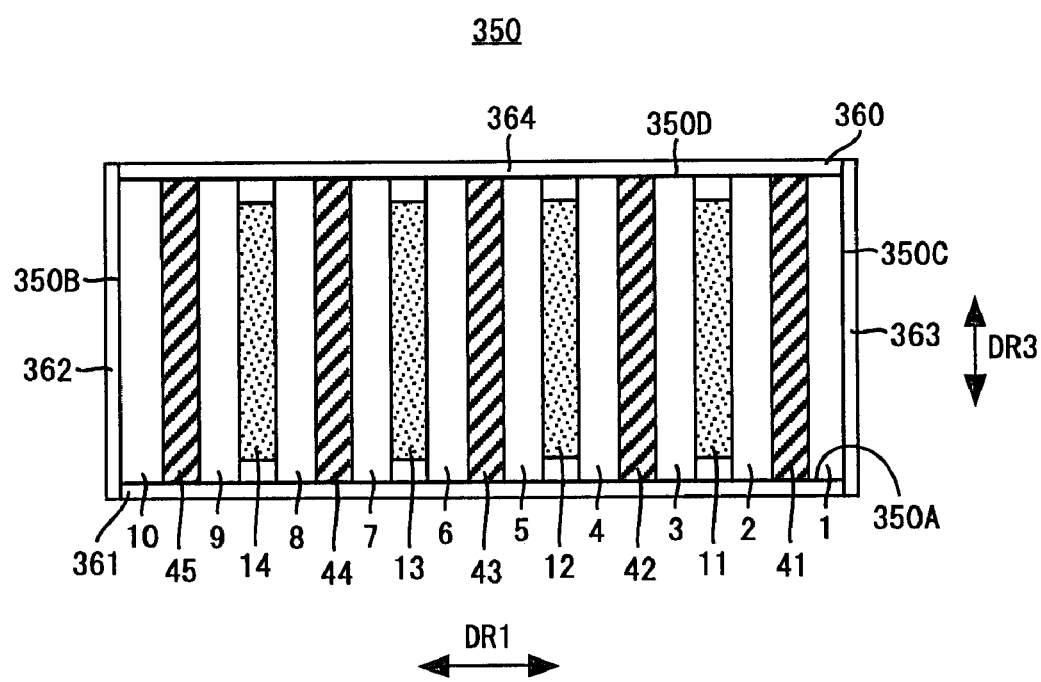
FIG. 28 is a cross-sectional view of the electric element viewed along line XXVIII-XXVIII shown in FIG. 26.

FIG. 28 is a cross-sectional view of the electric element 350 viewed along line XXVIII-XXVIII shown in FIG. 26. With reference to FIG. 28, the cathode electrode 360 comprises electrodes 361 to 364. The electrode 361 is disposed on the bottom surface 350A of the electric element 350. The electrode 362 is disposed on the side surface 350B of the electric element 350. The electrode 363 is disposed on the side surface 350C of the electric element 350. The electrode 364 is disposed on the upper surface 350D of the electric element 350.

The electrode 361 is connected to one end of the conductive plates 41 to 45 in a perpendicular direction DR3 that is perpendicular to the width direction DR1 of the electric element 350. The electrode 364 is connected to the other end of the conductive plates 41 to 45 in the perpendicular direction DR3. The electrodes 361 to 364 are not connected to the conductive plates 11 to 14.

As described above, the cathode electrode 360 is connected to the conductive plates 41 to 45 on the bottom surface 350A and the upper surface 350D of the electric element 350.

The rest of the electric element 350 is the same the electric element 300.

Figure 29:
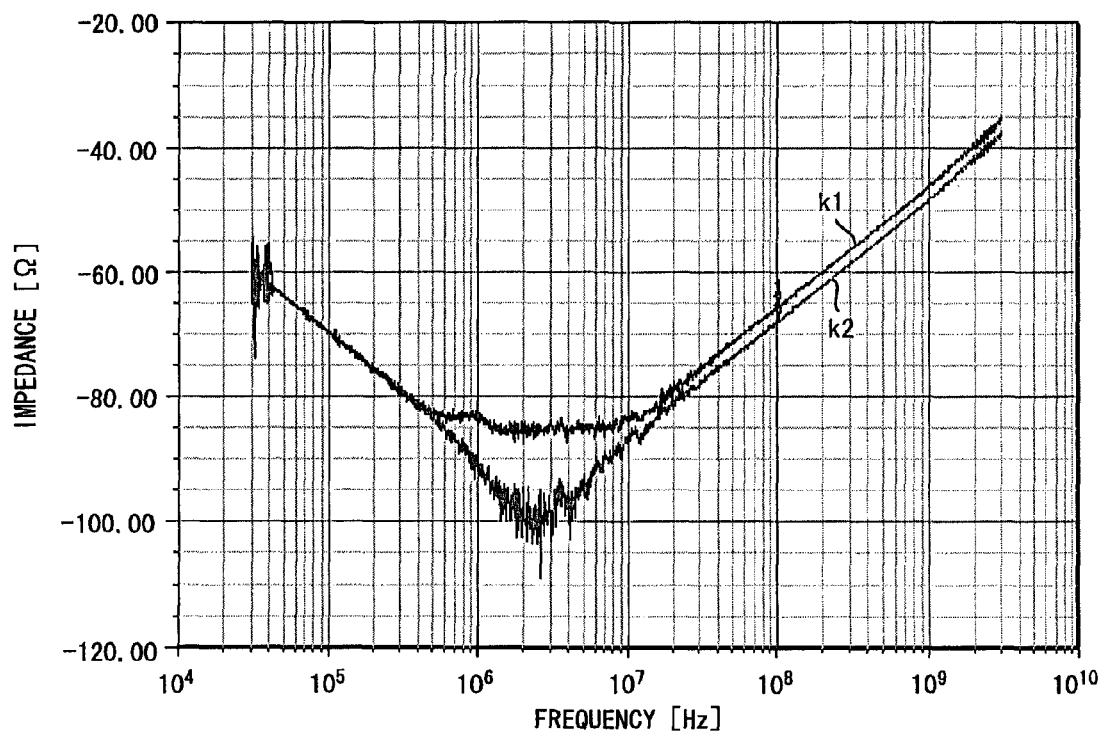
FIG. 29 illustrates a relationship between the impedance and the frequency.
Figure 30:
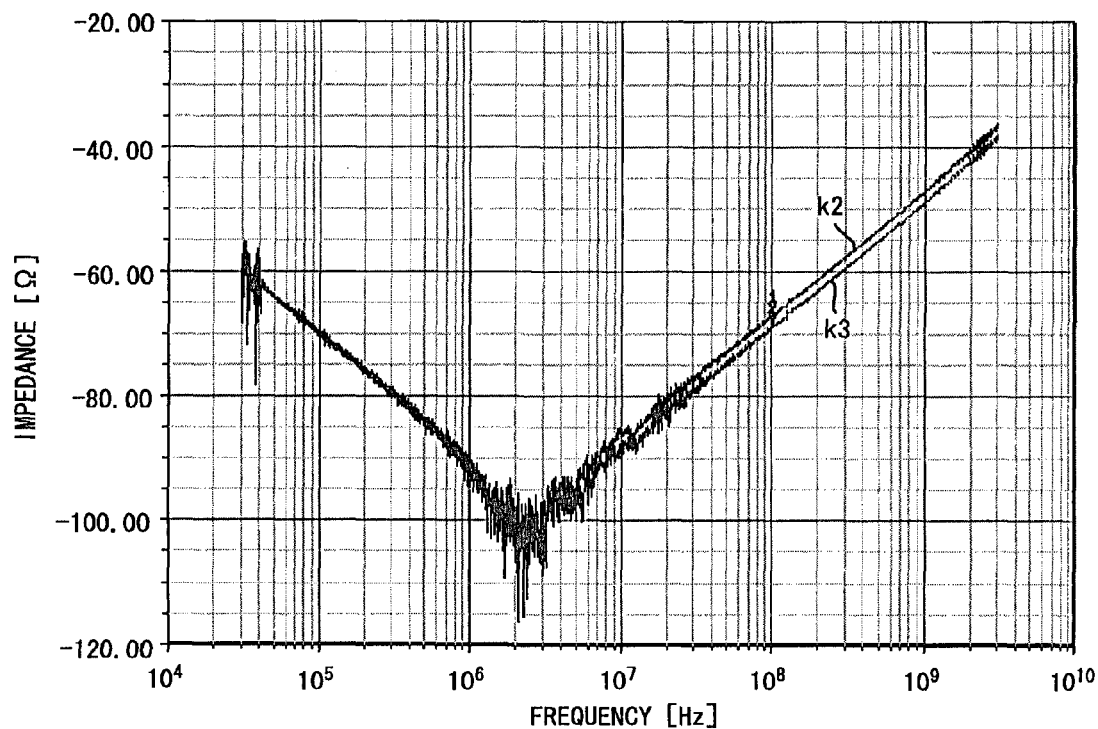
FIG. 30 illustrates another relationship between the impedance and the frequency.

FIG. 29 illustrates a relationship between the impedance and the frequency. FIG. 30 illustrates another relationship between the impedance and the frequency. In FIGS. 29 and 30, the vertical axes represent the impedance, and the abscissa axes represent the frequency. Curve k1 illustrates the relationship between the impedance and the frequency of a conventional electric element. Curve k2 illustrates the relationship between the impedance and the frequency of the electric element 300 shown in FIG. 21. Curve k3 illustrates the relationship between the impedance and the frequency of the electric element 350 shown in FIG. 26.

Note that the conventional electric element comprises a conductive plate connected to two anode electrodes, and a conductive plate connected to one cathode electrode. In the conventional electric element, the conductive plates are laminated in the normal direction of the substrate.

At a frequency of $3 \times 10^6$ [Hz] or higher, the impedance of the electric element 300 is lower than that of the conventional electric element (refer to Curves k1 and k2). As described above, in the electric element 300, the distances between the conductive plate 402 and the four conductive plates 11 to 14 are substantially equal to each other, and so are the distances between the conductive plate 403 and the four conductive plates 11 to 14. The distances between the via holes 405 and the five conductive plates 31 to 35 are also substantially equal to each other.

On the other hand, in the conventional electric element, the conductive plates connected to the anode electrodes and the cathode electrode are laminated in the normal direction of the substrate. Therefore, when the conventional electric element is disposed on the substrate 400, the distances between the conductive plates 402 and 403 and the plurality of conductive plates connected to the anode electrodes are not equal to each other. The distances between the via holes 405 and the plurality of conductive plates connected to the cathode electrode are not equal to each other, either. As a result, a current is supplied to the conductive plate disposed away from the substrate 400 after it flows away from the substrate, and therefore, the impedance encountered when a current is supplied to the conductive plate disposed away from the substrate 400 is greater than that encountered when a current is supplied to the conductive plate disposed near the substrate 400.

Therefore, the impedance of the electric element 300 is lower than that of the conventional electric element.

At a frequency of about $1 \times 10^7$ [Hz] or higher, the impedance of the electric element 350 is lower than that of the electric element 300 (refer to Curves k2 and k3). The conductive plates 31 to 35 of the electric element 300 are connected to the cathode electrode 90 only on the bottom surface 300A of the electric element 300. The conductive plates 41 to 45 of the electric element 350 are, however, connected to the cathode electrode 360 on the bottom surface 350A and the upper surface 350D of the electric element 350. Therefore, the impedance between the conductive plates 41 to 45 and the cathode electrode 360 is lower than that between the conductive plates 31 to 35 and the cathode electrode 90. As a result, the impedance of the electric element 350 is lower than that of the electric element 300.

As described above, by laminating the conductive plate 11 to 14 and 31 to 35 in the width direction DR1 of the electric element 300, the impedance of the electric element 300 at a high-frequency is lower than that of the conventional electric element. Further, by connecting the conductive plates 41 to 45 to the cathode electrode 360 on the bottom surface 350A and the upper surface 350D of the electric element 350, the impedance of the electric element 350 is lower than that of the electric element 300.

Therefore, the electric elements 300 and 350 according to Embodiment 2 is effective to decrease the impedance at a high-frequency.

Note that the electric element 350 may comprise a cathode electrode comprising the electrodes 361, 363 and 364 or a cathode electrode comprising the electrodes 361, 362 and 364. More specifically, the cathode electrode of the electric element 350 does not have to be disposed around the electric element 350, and only has to comprise two electrodes connected to the two extended portions 411 and 412 of the conductive plates 41 to 45, and an electrode for connecting the two electrodes.

The rest is the same as Embodiment 1.

Embodiment 3

Figure 31:
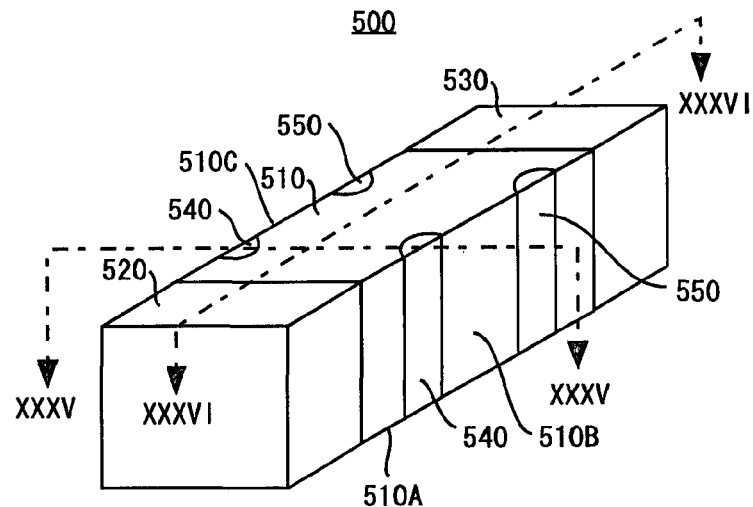
FIG. 31 is a perspective view illustrating the structure of an electric element according to Embodiment 3.

FIG. 31 is a perspective view illustrating the structure of an electric element according to Embodiment 3. With reference to FIG. 31, an electric element 500 according to Embodiment 3 comprises a laminated stack 510, anode electrodes 520 and 530, and cathode electrodes 540 and 550.

The anode electrode 520 has a three-dimensional shape and is disposed on one end face of the laminated stack 510. The anode electrode 530 has a three-dimensional shape and is disposed on the other end face of the laminated stack 510 so as to face the anode electrode 520. The cathode electrode 540 is disposed, on the anode electrode 520 side, on the bottom surface 510A and part of the side surfaces 510B and 510C of the laminated stack 510. The cathode electrode 550 is disposed, on the anode electrode 530 side, on the bottom surface 510A and part of the side surfaces 510B and 510C of the laminated stack 510.

Figure 32:
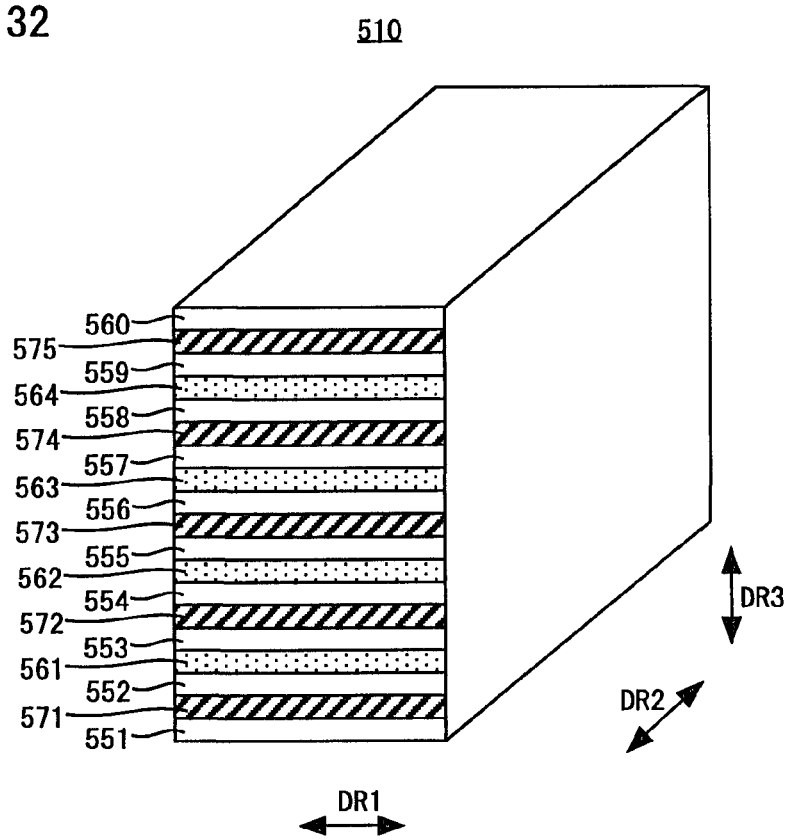
FIG. 32 is a perspective view of the laminated stack shown in FIG. 31.

FIG. 32 is a perspective view of the laminated stack 510 shown in FIG. 31. With reference to FIG. 32, the laminated stack 510 comprises dielectric layers 551 to 560 and conductive plates 561 to 564 and 571 to 575. The dielectric layers 551 to 560 are laminated in the perpendicular direction DR3 that is perpendicular to the width direction DR1 and the longitudinal direction DR2 of the electric element 500.

Each of the conductive plates 561 to 564 and 571 to 575 is plate-like in shape. The conductive plates 561 to 564 are respectively disposed between the dielectric layers 552 and 553, between the dielectric layers 554 and 555, between the dielectric layers 556 and 557, and between the dielectric layers 558 and 559. The conductive plates 571 to 575 are respectively disposed between the dielectric layers 551 and 552, between the dielectric layers 553 and 554, between the dielectric layers 555 and 556, between the dielectric layers 557 and 558, and between the dielectric layers 559 and 560. As a result, the dielectric layers 551 to 559 respectively support the conductive plates 571, 561, 572, 562, 573, 563, 574, 564, and 575.

One end of the conductive plates 561 to 564 is connected to the anode electrode 520, and the other end to the anode electrode 530, in the longitudinal direction DR2. The conductive plates 571 to 575 is connected to the cathode electrode 540 on the anode electrode 520 side in the longitudinal direction DR2, and to the cathode electrode 550 on the anode electrode 530 side in the longitudinal direction DR2.

Each of the dielectric layers 551 to 560 is formed of, for example, $BaTiO_3$, and each of the anode electrodes 520 and 530, the conductive plates 561 to 564 and 571 to 575, and the cathode electrodes 540 and 550 is formed of, for example, Ni.

Figure 33:
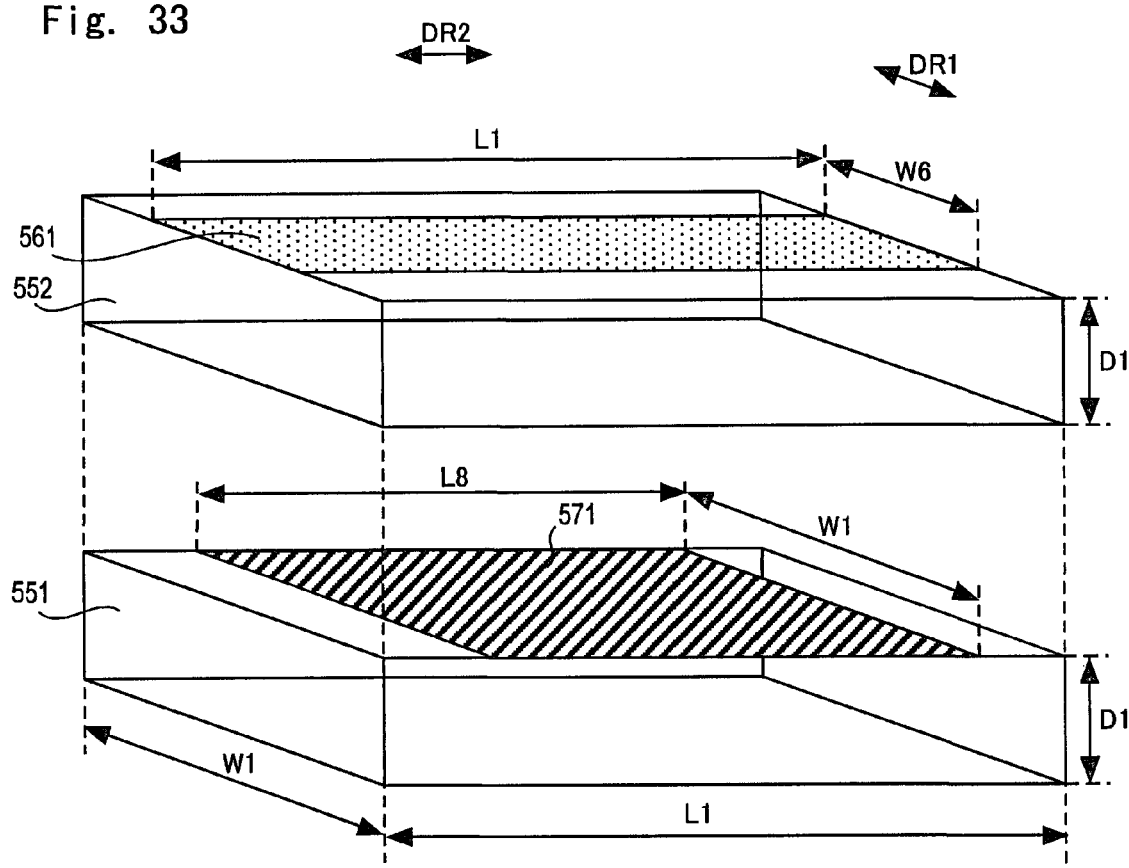
FIG. 33 illustrates the dimensions of the dielectric layers and the conductive plates shown in FIG. 32.

FIG. 33 illustrates the dimensions of the dielectric layers 551 and 552 and the conductive plates 571 and 561 shown in FIG. 32. With reference to FIG. 33, each of the dielectric layers 551 and 552 has the length L1 in the longitudinal direction DR2 in which a current flows across the conductive plates 561 and 571, the width W1 in the width direction DR1 that is perpendicular to the direction DR2. Each of the dielectric layers 551 and 552 has a thickness D1, which is 25 μm, for example.

The conductive plate 561 has the length L1 and a width W6. The width W6 is, for example, 11 mm. The conductive plate 571 has a length L8 and the width W1. The length L8 is, for example, 13 mm. Each of the conductive plates 561 and 571 has a thickness of, for example, 10 μm to 20 μm.

Each of the dielectric layers 553 to 560 has the same length L1, width W1, and thickness D1 as those of the dielectric layers 551 and 552 shown in FIG. 33. Each of the conductive plates 562 to 564 has the same length L1, width W6 and thickness as those of the conductive plate 561 shown in FIG. 33. Each of the conductive plates 572 to 575 has the same length L8, width W1 and thickness as those of the conductive plate 571 shown in FIG. 33.

As described above, the conductive plates 561 to 564 have a length and a width different from those of the conductive plates 571 to 575. This is to prevent a short circuit between the anode electrodes 520 and 530 connected to the conductive plates 561 to 564 and the cathode electrodes 540 and 550 connected to the conductive plates 571 to 575.

Figure 34:
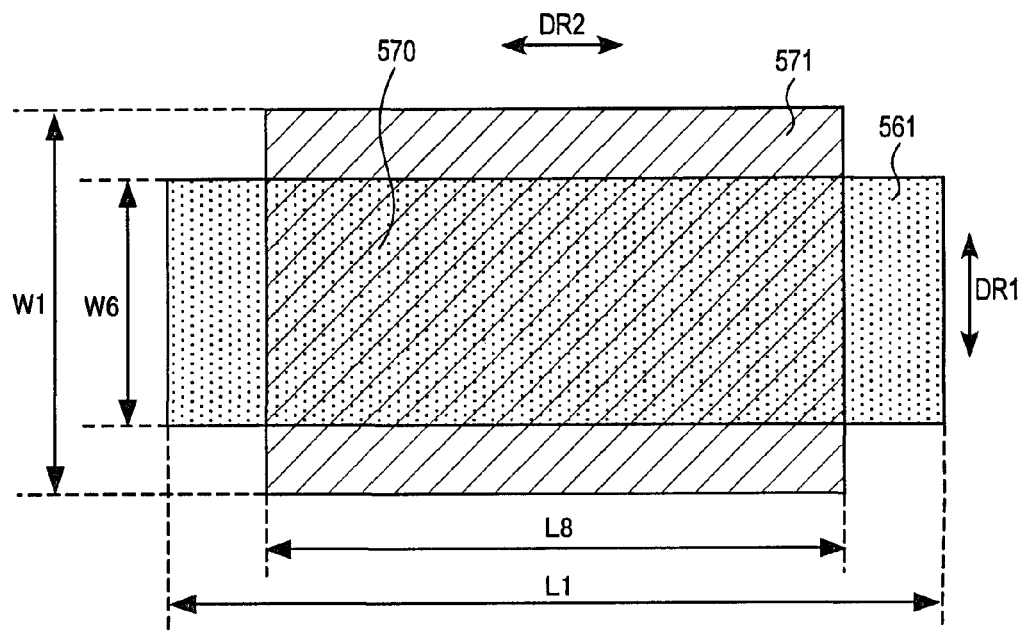
FIG. 34 is a plan view of two adjacent conductive plates.

FIG. 34 is a plan view of two adjacent conductive plates. With reference to FIG. 34, if projected onto a plain surface, the conductive plates 561 and 571 have an overlap 570. The overlap 570 between the conductive plate 561 and the conductive plate 571 has the length L8 and the width W6. The overlaps between the conductive plate 561 and the conductive plate 572, between the conductive plate 562 and the conductive plate 572, between the conductive plate 562 and the conductive plate 573, between the conductive plate 563 and the conductive plate 573, between the conductive plate 564 and the conductive plate 574, and between the conductive plate 564 and the conductive plate 575 have the same length L8 and width W6 as those of the overlap 570.

Figure 35:
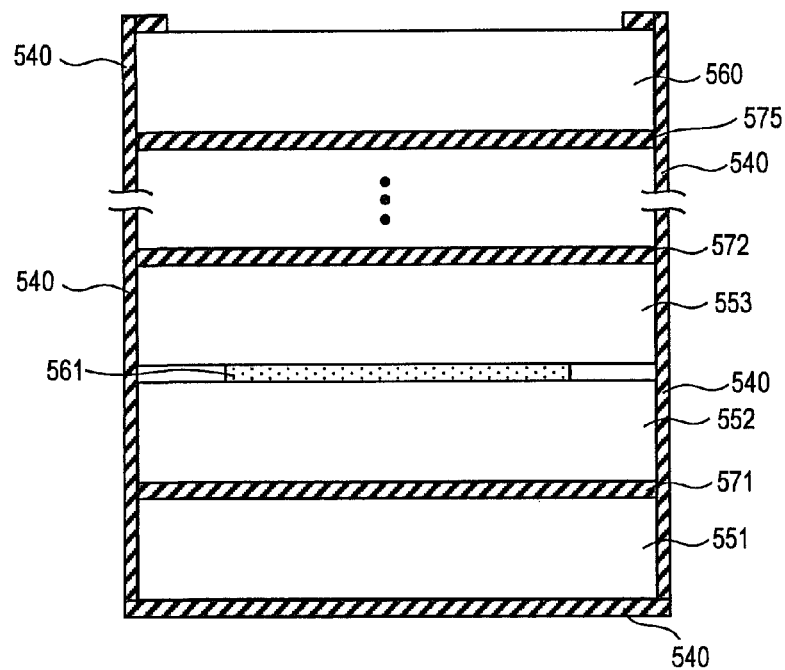
FIG. 35 is a first cross-sectional view of the electric element shown in FIG. 31.
Figure 36:
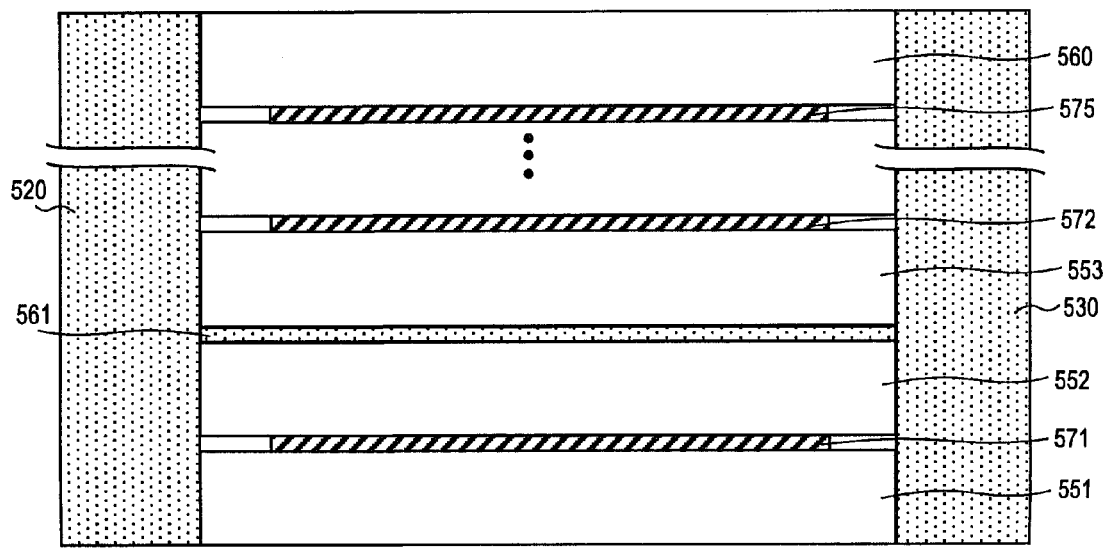
FIG. 36 is a second cross-sectional view of the electric element shown in FIG. 31.

FIGS. 35 and 36 are, respectively, first and second cross-sectional views of the electric element 500 shown in FIG. 31. FIG. 35 is a cross-sectional view of the electric element 500 viewed along line XXXV-XXXV shown in FIG. 31. FIG. 36 is a cross-sectional view of the electric element 500 viewed along line XXXVI-XXXVI shown in FIG. 31.

With reference to FIG. 35, the conductive plate 571 is in contact with both of the dielectric layers 551 and 552, and the conductive plate 561 is in contact with both of the dielectric layers 552 and 553. The conductive plate 572 is in contact with both of the dielectric layers 553 and 554. Likewise, the conductive plate 575 is in contact with both of the dielectric layers 559 and 560.

The cathode electrode 540 is not connected to the conductive plates 561 to 564, but to the conductive plates 571 to 575 (refer to FIG. 35).

The anode electrodes 520 and 530 are not connected to the conductive plates 571 to 575, but to the conductive plates 561 to 564 (refer to FIG. 36).

As a result, stacks of the conductive plate 571/the dielectric layer 552/the conductive plate 561, the conductive plate 561/the dielectric layer 553/the conductive plate 572, the conductive plate 572/the dielectric layer 554/the conductive plate 562, the conductive plate 562/the dielectric layer 555/the conductive plate 573, the conductive plate 573/the dielectric layer 556/the conductive plate 563, the conductive plate 563/the dielectric layer 557/the conductive plate 574, the conductive plate 574/the dielectric layer 558/the conductive plate 564, and the conductive plate 564/the dielectric layer 559/the conductive plate 575 constitute eight capacitors connected parallel to each other between the anode electrodes 520 and 530 and the cathode electrodes 540 and 550.

In this case, the electrode area of each capacitor is equal to the area of the overlap 570 (refer to FIG. 34) of two adjacent conductive plates.

The electric element 500 is mounted on the substrate 200. In this case, the anode electrode 520 is connected to the conductive plate 202 of the substrate 200. The anode electrode 530 is connected to the conductive plate 203 of the substrate 200. The cathode electrode 540 is connected to the conductive plate 204 through the via holes 206. The cathode electrode 550 is connected to the conductive plate 205 through the via holes 207.

As described above, the anode electrode 520 is the three-dimensional shape, and therefore, when the anode electrode 520 is connected to the conductive plate 202, the resistances between each of the conductive plates 561 to 564 and the conductive plate 202 are substantially equal between the four conductive plates 561 to 564. Likewise, the conductive plate 203 is the three-dimensional shape, and therefore, when the anode electrode 520 is connected to the conductive plate 203, the resistances between each of the conductive plates 561 to 564 and the conductive plate 203 are substantially equal between the four conductive plates 561 to 564.

More specifically, although the distances between the conductive plate 202 and the conductive plates 561 to 564 are different between the four conductive plates 561 to 564, and so are the distances between the conductive plate 203 and the conductive plates 561 to 564, since the anode electrodes 520 and 530 are the three-dimensional shape, the resistance does not receive influence of the differences in distance between the conductive plates 502 and 503 and the four conductive plates 561 to 564.

When the electric element 500 is mounted onto the substrate 200, the conductive plate 202 is connected to a power supply (not illustrated), and the conductive plate 203 is connected to an electric load (not illustrated). As a result, a current I supplied from the power supply to the electric element 500 flows from the conductive plate 202 to the conductive plates 561 to 564 of the electric element 500 through the anode electrode 520, and then flows across the conductive plates 561 to 564 in the longitudinal direction DR2. Then the current I flows to the conductive plate 203 through the anode electrode 530 and then is supplied to the electric load.

A return current Ir from the electric load is supplied to the conductive plate 205, and flows across the conductive plates 571 to 575 of the electric element 500 through the via holes 207 and the cathode electrode 550. Then, the return current Ir flows to the conductive plate 204 through the cathode electrode 540 and the via holes 206, and then returns to the power supply.

The resistances between the four one ends of the four conductive plates 561 to 564 and the conductive plate 202 are equal to each other, and therefore, the current I supplied from the power supply is supplied from the conductive plate 202 to the four conductive plates 561 to 564 with the same resistance. Since the four conductive plates 561 to 564 are connected parallel to each other between the anode electrodes 520 and 530, current of an equal amount (=I/4) flows across each of the four conductive plates 561 to 564. Therefore, if the amount of current that flows across the one conductive plate 561 is determined, the total amount of current that flows across all of the four conductive plates 561 to 564 is given by multiplying the amount of the current that flows across the conductive plate 561 by the number of laminated conductive plates (=by 4), and thus the total amount of current that flows across the whole electric element 500 is easily determined.

As described above, in the electric element 500 which comprises the dielectric layers 551 to 560 and the conductive plates 561 to 564 and 571 to 575 laminated in the normal direction (=the perpendicular direction DR3) of the substrate 200, by using the anode electrodes 520 and 530 that are the three-dimensional shape, if the amount of current that flows across the one conductive plate 561 is determined, the total amount of current that flows across all of the four conductive plates 561 to 564 is given by multiplying the amount of the current that flows across the one conductive plate 561 by the number of the laminated conductive plates (=by 4), and thus the total amount of current that flows across the whole electric element 500 is easily determined.

Note that it is described above that the number of conductive plate connected to the anode electrodes 520 and 530 is four (the conductive plates 561 to 564) and that the number of conductive plate connected to the cathode electrodes 540 and 550 is five (the conductive plates 571 to 575). The present invention, however, is not limited to that: The electric element 500 only has to comprise n (n is a positive integer) conductive plates connected to the anode electrodes 520 and 530 and m (m is a positive integer) conductive plates connected to the cathode electrodes 540 and 550. In this case, the electric element 500 comprises j (j=m+n) dielectric layers. This is because, comprising at least one each of conductive plates connected to the anode electrodes 520 and 530 and to the cathode electrodes 540 and 550, a magnetic interference is generated, which results in a decrease in the effective inductance.

Embodiment 4

Figure 37:
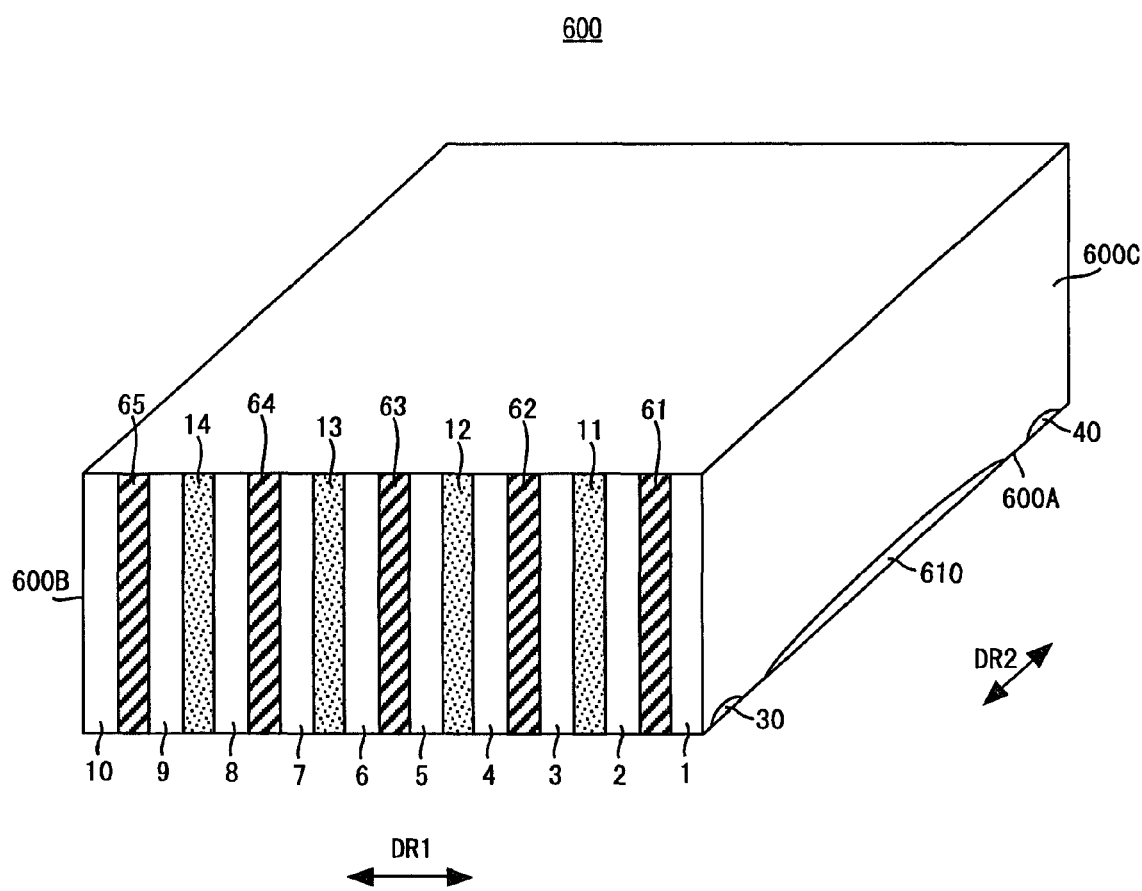
FIG. 37 is a perspective view illustrating the structure of an electric element according to Embodiment 4.

FIG. 37 is a perspective view illustrating the structure of an electric element according to Embodiment 4. With reference to FIG. 37, an electric element 600 according to Embodiment 4 is identical with the electric element 100 shown in FIG. 1 except that the conductive plates 21 to 25 and the cathode electrodes 50 and 60 of the electric element 100 are respectively replaced with conductive plates 61 to 65 and a cathode electrode 610.

The conductive plates 61 to 65 are respectively disposed between the dielectric layers 1 and 2, between the dielectric layers 3 and 4, between the dielectric layers 5 and 6, between the dielectric layers 7 and 8, and between the dielectric layers 9 and 10. As a result, the conductive plates 11 to 14 and 61 to 65 are alternately laminated in the width direction DR1 of the electric element 600.

The cathode electrode 610 is in the shape of the band and formed, between the anode electrode 30 and the anode electrode 40 in the longitudinal direction DR2 of the electric element 600, on the bottom surface 600A and part of the side surfaces 600B and 600C of the electric element 600 and connected to the conductive plates 61 to 65. Each of the conductive plates 61 to 65 and the cathode electrode 610 is formed of, for example, Ni.

Figure 38:
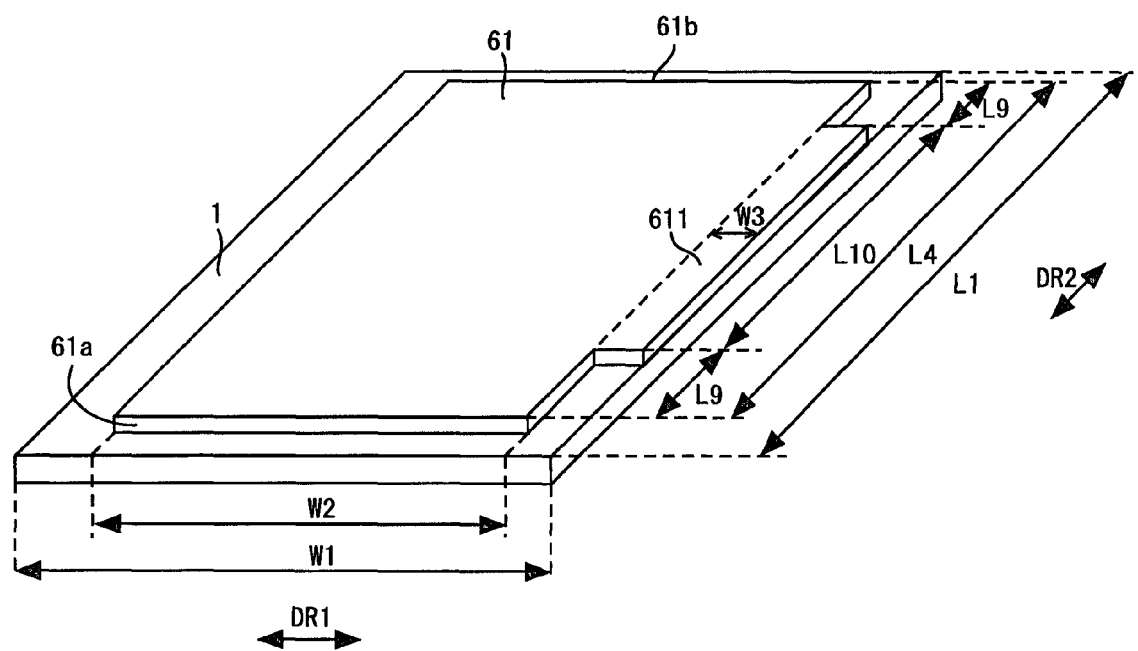
FIG. 38 illustrates the dimensions of the dielectric layer and the conductive plate shown in FIG. 37.

FIG. 38 illustrates the dimensions of the dielectric layer 1 and the conductive plate 61 shown in FIG. 37. With reference to FIG. 38, the conductive plate 61 is plate-like in shape and has the length L4 and the width W2. The conductive plate 61 has a thickness of, for example, 10 μm to 20 μm.

The conductive plate 61 has an extended portion 611. The extended portion 611 is disposed on a position that is distance-L9 away from the both ends 61a and 61b of the electric conductive plate 61 in the longitudinal direction DR2, on one end side of the conductive plate 61 in the width direction DR1 of the electric element 600. The conductive plate 61 has a length L10 and the width W3. The distance L9 is, for example, 1.0 mm. As a result, the length L10 is 11.0 mm.

As described above, the conductive plate 61 includes the extended portion 611 that is disposed on one end side of the conductive plate 61 in the width direction DR1.

Note that each of the conductive plates 62 to 65 has the same shape and dimensions as those of the conductive plate 61 shown in FIG. 38.

Figure 39:
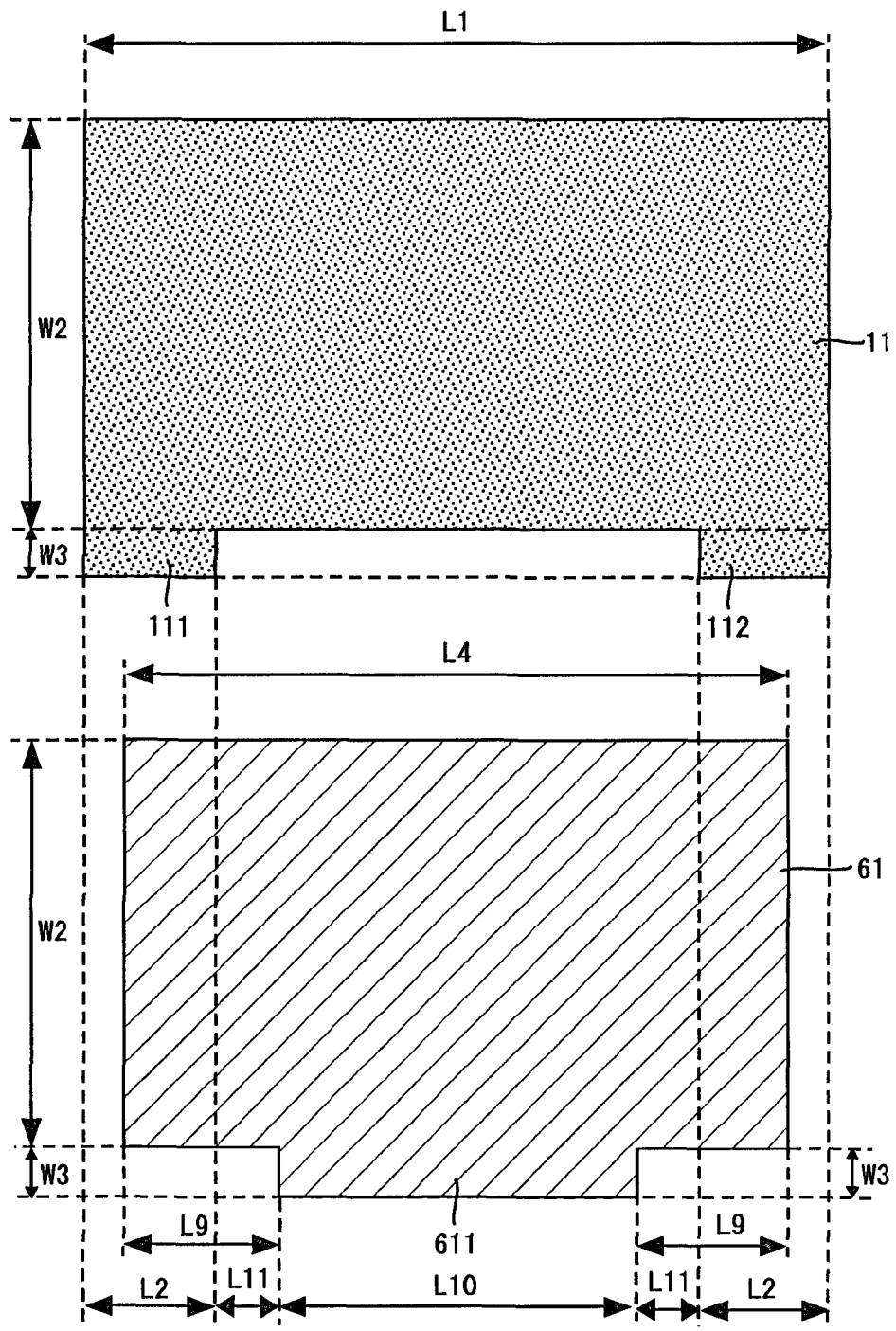
FIG. 39 is a plan view of the two conductive plates shown in FIG. 37.

FIG. 39 is a plan view of the two conductive plates 11 and 61 shown in FIG. 37. With reference to FIG. 39, the conductive plate 11 has the length L1, and each of the extended portions 111 and 112 has the length L2. The conductive plate 61 has the length L4. The extended portion 611 is disposed on a position that is the distance-L9 away from the both ends of the conductive plate 61, and therefore, the distance between the extended portion 111 of the conductive plate 11 and the extended portion 611 of the conductive plate 61 and that between the extended portion 112 of the conductive plate 11 and the extended portion 611 of the conductive plate 61 are a distance L11. The distance L11 is determined to satisfy (2×L11)/L1<0.18, and for example, is 1.0 mm.

Note that the cathode electrode 610 is connected to the five extended portions 611 of the five conductive plates 61 to 65 as the cathode electrode 90 shown in FIG. 23 is connected to the five extended portions 311 of the five conductive plates 31 to 35. The conductive plate 11 to 14 are connected to the anode electrodes 30 and 40 as is illustrated in FIG. 5. Therefore, stacks of the conductive plate 61/the dielectric layer 2/the conductive plate 11, the conductive plate 11/the dielectric layer 3/the conductive plate 62, the conductive plate 62/the dielectric layer 4/the conductive plate 12, the conductive plate 12/the dielectric layer 5/the conductive plate 63, the conductive plate 63/the dielectric layer 6/the conductive plate 13, the conductive plate 13/the dielectric layer 7/the conductive plate 64, the conductive plate 64/the dielectric layer 8/the conductive plate 14, and the conductive plate 14/the dielectric layer 9/the conductive plate 65 constitute eight capacitors connected parallel to each other between the anode electrodes 30 and 40 and the cathode electrode 610. In this case, the electrode area of each capacitor is equal to the overlap area of two adjacent conductive plates.

Figure 40:
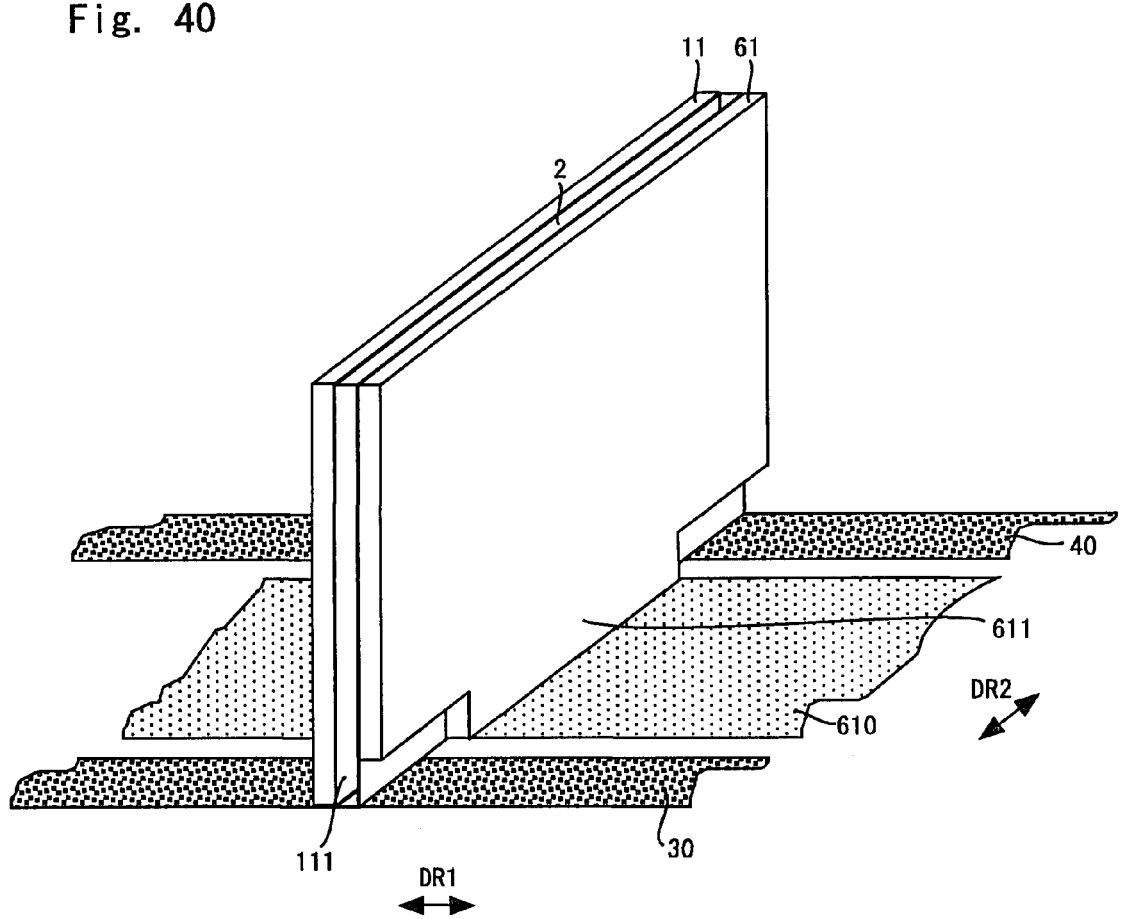
FIG. 40 is a perspective view illustrating the structure of a capacitor of the electric element shown in FIG. 37.

FIG. 40 is a perspective view illustrating the structure of a capacitor of the electric element 600 shown in FIG. 37. With reference to FIG. 40, in the electric element 600, the dielectric layer 2 and the conductive plates 11 and 61 constitute a capacitor.

The anode electrode 30 is connected to the extended portion 111 of the conductive plate 11, and the anode electrode 40 is connected to the extended portion 112 (not illustrated in FIG. 40) of the conductive plate 11. The cathode electrode 610 is connected to the extended portion 611 of the conductive plate 61.

The anode electrode 30 has the width that is equal to the length L2 of the extended portion 111 of the conductive plate 11, and the anode electrode 40 has the width that is equal to the length L2 of the extended portion 112 (not illustrated in FIG. 40) of the conductive plate 11. The cathode electrode 610 has the width that is equal to the length L10 of the extended portion 611 of the conductive plate 61. As a result, the distance between the anode electrode 30 and the cathode electrode 610 and that between the anode electrode 40 and the cathode electrode 610 are equal to the distance L11 between the extended portions 111 and 112 and the extended portion 611.

Figure 41:
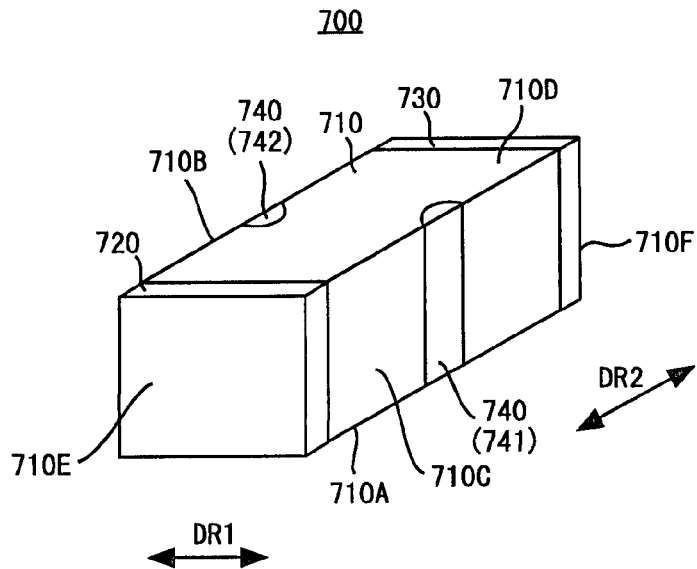
FIG. 41 is a perspective view illustrating the structure of a conventional electric element.

FIG. 41 is a perspective view illustrating the structure of a conventional electric element. With reference to FIG. 41, a conventional electric element 700 comprises a laminated stack 710, anode electrodes 720 and 730, and a cathode electrode 740.

The laminated stack 710 is substantially rectangular parallelepiped in shape. The anode electrode 720 is disposed on one end of the laminated stack 710 in the longitudinal direction DR2 of the electric element 700. The anode electrode 730 is disposed on the other end of the laminated stack 710 in the longitudinal direction DR2 of the electric element 700. More specifically, the anode electrode 720 is disposed on part of the bottom surface 710A, the side surfaces 710B and 710C and the upper surface 710D and on the whole side surface 710E of the laminated stack 710. The anode electrode 730 is dispose on part of the bottom surface 710A, the side surfaces 710B and 710C and the upper surface 710D and on the whole side surface 710F of the laminated stack 710. As a result, the anode electrodes 720 and 730 are disposed on the laminated stack 710, facing each other in the longitudinal direction DR2.

The cathode electrode 740 is disposed between the anode electrode 720 and the anode electrode 730 in the longitudinal direction DR2 and comprises electrodes 741 and 742. The electrode 741 is in the shape of the band and formed, on one end side of the laminated stack 710 in the width direction DR1, on part of the bottom surface 710A, the side surface 710C and the upper surface 710D of the laminated stack 710. Likewise, the electrode 742 is in the shape of the band and formed, on the other end side of the laminated stack 710 in the width direction DR1, on part of the bottom surface 710A, the side surface 710B and the upper surface 710D of the laminated stack 710. As a result, the electrodes 741 and 742 are disposed on the laminated stack 710, facing each other in the width direction DR1.

Figure 42:
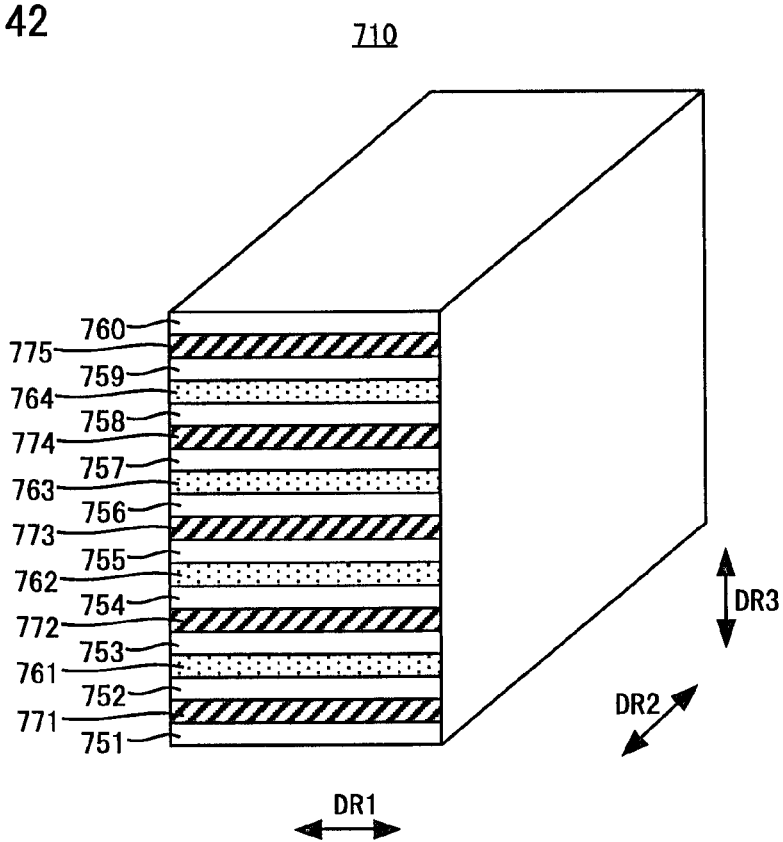
FIG. 42 is a perspective view illustrating the structure of the laminated stack shown in FIG. 41.

FIG. 42 is a perspective view illustrating the structure of the laminated stack 710 shown in FIG. 41. With reference to FIG. 42, the laminated stack 710 includes dielectric layers 751 to 760 and conductive plates 761 to 764 and 771 to 775.

The dielectric layers 751 to 760 and the conductive plates 761 to 764 and 771 to 775 are laminated in the perpendicular direction DR3 that is perpendicular to the width direction DR1 and the longitudinal direction DR2.

The dielectric layers 751 to 760 are formed of the same material as that of the dielectric layers 1 to 10 shown in FIG. 1 and have the same shape and dimensions as those of the dielectric layers 1 to 10. The conductive plates 761 to 764 and 771 to 775 are formed of the same material as that of the conductive plates 11 to 14 and 21 to 25 and have the same thickness as that of the conductive plates 11 to 14 and 21 to 25.

The conductive plates 761 to 764 are respectively disposed between the dielectric layers 752 and 753, between the dielectric layers 754 and 755, between the dielectric layers 756 and 757, and between the dielectric layers 758 and 759. The conductive plates 771 to 775 are respectively disposed between the dielectric layers 751 and 752, between the dielectric layers 753 and 754, between the dielectric layers 755 and 756, between the dielectric layers 757 and 758, and between the dielectric layers 759 and 760. As a result, the dielectric layers 751 to 759 respectively support the conductive plates 771, 761, 772, 762, 773, 763, 774, 764, and 775. The conductive plates 761 to 764 and the conductive plates 771 to 775 are alternately laminated in the perpendicular direction DR3.

Figure 43:
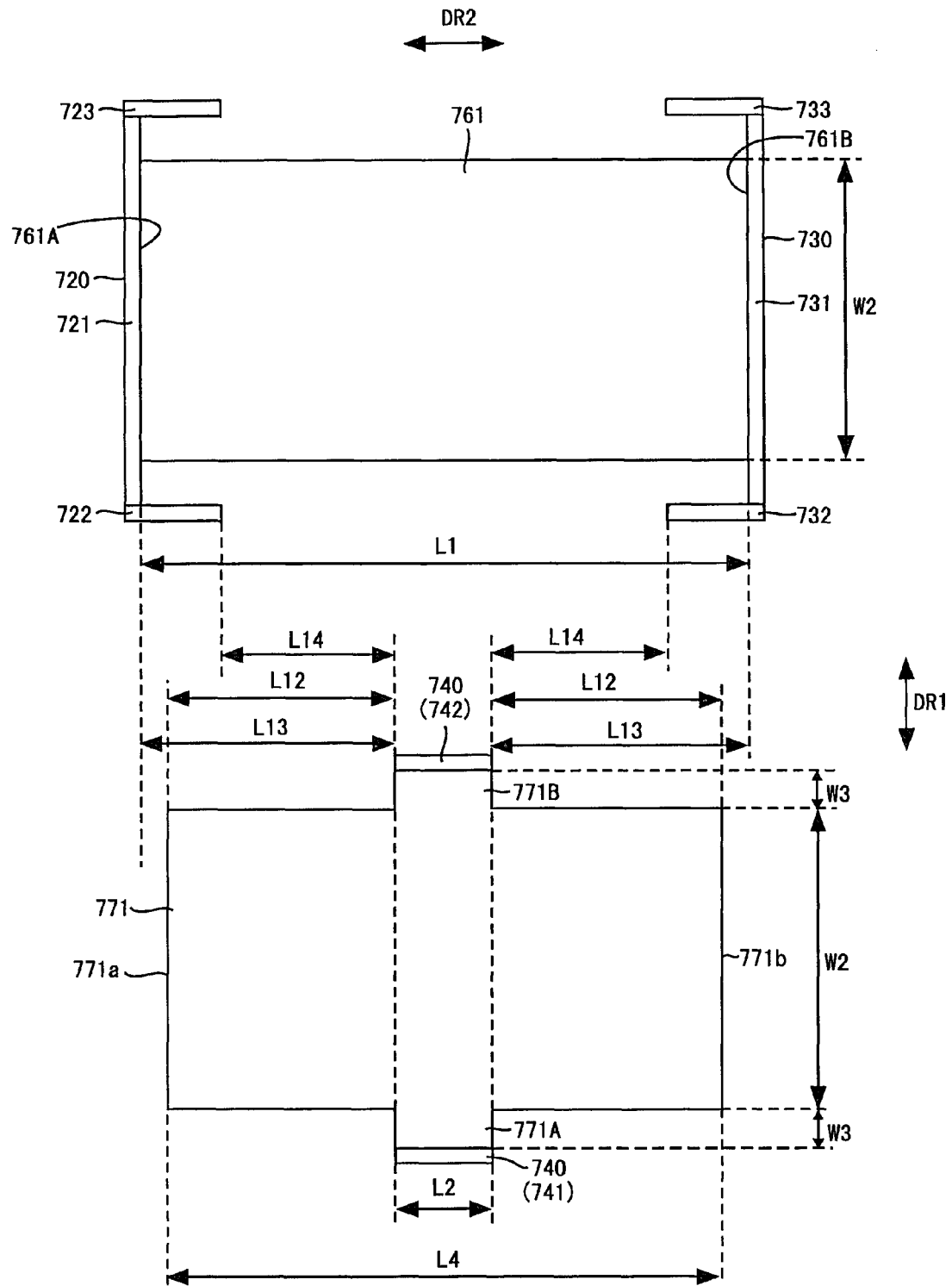
FIG. 43 is a plan view of the two adjacent conductive plates shown in FIG. 42.

FIG. 43 is a plan view of the two adjacent conductive plates 761 and 771 shown in FIG. 42. With reference to FIG. 43, the conductive plate 761 is substantially rectangle in shape and has the length L1 and the width W2. More specifically, the conductive plate 761 has a fixed width in the longitudinal direction DR2.

The anode electrode 720 comprises electrodes 721 to 723, and the anode electrode 730 comprises electrodes 731 to 733. Only the electrode 721 in the anode electrode 720 is connected to the end face 761A of the conductive plate 761 in the longitudinal direction DR2, and the electrodes 722 and 723 are not connected to the conductive plate 761. Likewise, only the electrode 731 in the anode electrode 730 is connected to the other end face 761B of the conductive plate 761 in the longitudinal direction DR2, and the electrodes 732 and 733 are not connected to the conductive plate 761.

As described above, the anode electrodes 720 and 730 are only connected to only the end faces 761A and 761B of the conductive plate 761 in the longitudinal direction DR2.

The conductive plate 771 is a flat plate and has the length L4 and the width W2. The conductive plate 771 includes extended portions 771A and 771B. The extended portion 771A is disposed on a position that is distance-L12 away from the both ends 771a and 771b in the longitudinal direction, on one end side of the conductive plate 771 in the width direction DR1. The extended portion 771B is disposed on a position that is the distance-L12 away from the both ends 771a and 771b in the longitudinal direction, on the other end side of the conductive plate 771 in the width direction DR1. Each of the extended portions 771A and 771B has the length L2. In this case, the length L12 is 1.0 mm.

The electrode 741 of the cathode electrode 740 is connected to the extended portion 771A of the conductive plate 771. The electrode 742 of the cathode electrode 740 is connected to the extended portion 771B of the conductive plate 771.

Since the conductive plates 761 and 771 have the dimensions described above, the distance from the connecting point (=the end face 761A) of the conductive plate 761 and the anode electrode 720 to the extended portions 771A and 771B of the conductive plate 771 and that from the connecting point (=the end face 761B) of the conductive plate 761 and the anode electrode 730 to the extended portions 771A and 771B of the conductive plate 771 are equal to each other, and given L13. The distance from the anode electrodes 720 and 730 to the cathode electrode 740 is a distance L14 that is shorter than the distance L13. In this case, the distance L14 is given by subtracting the length of the anode electrodes 720 and 730 in the longitudinal direction DR2 from the distance L13.

Note that each of the conductive plates 762 to 764 shown in FIG. 42 has the same shape and dimensions as those of the conductive plate 761 shown in FIG. 43. Each of the conductive plates 772 to 775 shown in FIG. 42 has the same shape and dimensions as those of the conductive plates 771 shown in FIG. 43.

Table 1 contains the length L of the conventional electric element 700, the length L-Anode of the anode electrodes 720 and 730, the length L-Cathode of the cathode electrode 740, the width W of the electric element 700, the clearance, the ratio L/W of the length L to the width W, the ratio of length of the cathode electrode 740 to total length L, and the ratio of clearance to total length L.

TABLE 1

| L (mm) | L-Anode (mm) | L-Cathode (mm) | W (mm) | Clearance (mm) | L/W | Ratio of L-Cathode to Total Length | Ratio of Clearance to Total Length |
|---|---|---|---|---|---|---|---|
| 1.60 | 0.25 | 0.40 | 0.80 | 0.35 | 2.00 | 0.25 | 0.44 |
| 3.20 | 0.30 | 1.10 | 1.25 | 0.75 | 2.56 | 0.34 | 0.47 |
| 2.00 | 0.30 | 0.60 | 1.25 | 0.40 | 1.60 | 0.30 | 0.40 |
| 4.50 | 0.40 | 1.50 | 1.60 | 1.10 | 2.81 | 0.33 | 0.49 |
| 1.60 | 0.25 | 0.40 | 0.80 | 0.35 | 2.00 | 0.25 | 0.44 |
| 1.60 | 0.30 | 0.40 | 0.80 | 0.30 | 2.00 | 0.25 | 0.38 |
| 2.00 | 0.30 | 0.60 | 1.25 | 0.40 | 1.60 | 0.30 | 0.40 |
| 2.00 | 0.30 | 1.00 | 1.25 | 0.20 | 1.60 | 0.50 | 0.20 |
| 1.60 | 0.15 | 0.80 | 0.80 | 0.25 | 2.00 | 0.50 | 0.31 |
| 1.60 | 0.25 | 0.40 | 0.80 | 0.35 | 2.00 | 0.25 | 0.44 |
| 2.00 | 0.30 | 0.60 | 1.25 | 0.40 | 1.60 | 0.30 | 0.40 |
| 3.20 | 0.30 | 1.10 | 1.25 | 0.75 | 2.56 | 0.34 | 0.47 |
| 4.50 | 0.40 | 1.50 | 1.60 | 1.10 | 2.81 | 0.33 | 0.49 |
| 5.70 | 0.00 | 1.70 | 5.00 | 2.00 | 1.14 | 0.30 | 0.70 |
| 2.00 | 0.30 | 0.60 | 1.25 | 0.40 | 1.60 | 0.30 | 0.40 |
| 2.00 | "..." | 0.40 | 1.25 | 0.80 | 1.60 | 0.20 | 0.80 |
| 2.00 | "..." | 0.40 | 1.25 | 0.80 | 1.60 | 0.20 | 0.80 |
| 2.00 | 0.30 | 0.40 | 1.25 | 0.50 | 1.60 | 0.20 | 0.50 |
| 3.20 | 0.45 | 0.60 | 2.50 | 0.85 | 1.28 | 0.19 | 0.53 |
| 4.50 | 0.45 | 1.00 | 3.20 | 1.30 | 1.41 | 0.22 | 0.58 |
| 3.20 | 0.45 | 0.60 | 1.80 | 0.85 | 1.78 | 0.19 | 0.53 |
| 4.50 | 0.45 | 1.00 | 1.80 | 1.30 | 2.50 | 0.22 | 0.58 |
| 2.00 | 0.40 | 0.40 | 1.25 | 0.40 | 1.60 | 0.20 | 0.40 |
| 2.00 | 0.40 | 0.40 | 1.25 | 0.40 | 1.60 | 0.20 | 0.40 |
| 2.00 | 0.40 | 0.40 | 1.25 | 0.40 | 1.60 | 0.20 | 0.40 |
| 2.00 | 0.40 | 0.40 | 1.25 | 0.40 | 1.60 | 0.20 | 0.40 |
| 2.00 | 0.30 | 0.40 | 1.25 | 0.50 | 1.60 | 0.20 | 0.50 |
| 1.60 | 0.15 | 0.80 | 0.80 | 0.25 | 2.00 | 0.50 | 0.31 |
| 2.00 | 0.30 | 0.60 | 1.25 | 0.40 | 1.60 | 0.30 | 0.40 |
| 1.60 | 0.20 | 0.50 | 0.80 | 0.35 | 2.00 | 0.31 | 0.44 |
| 2.00 | 0.30 | 0.60 | 1.25 | 0.40 | 1.60 | 0.30 | 0.40 |
| 2.00 | 0.30 | 0.60 | 1.25 | 0.40 | 1.60 | 0.30 | 0.40 |
| 3.20 | 0.40 | 1.10 | 1.25 | 0.65 | 2.56 | 0.34 | 0.41 |
| 3.20 | 0.40 | 1.10 | 1.25 | 0.65 | 2.56 | 0.34 | 0.41 |
| 3.20 | 0.40 | 1.10 | 1.60 | 0.65 | 2.00 | 0.34 | 0.41 |
| 4.50 | 0.50 | 1.40 | 1.60 | 1.05 | 2.81 | 0.31 | 0.47 |
| 4.50 | 0.50 | 1.40 | 1.60 | 1.05 | 2.81 | 0.31 | 0.47 |
| 4.50 | 2.00 | 2.00 | 1.60 | 0.40 | 2.81 | 0.44 | 0.18 |
| 4.50 | 0.30 | 2.80 | 1.60 | 0.55 | 2.81 | 0.62 | 0.24 |
| 1.60 | 0.25 | 0.40 | 0.60 | 0.35 | 2.67 | 0.25 | 0.22 |
| 2.00 | 0.30 | 0.60 | 0.80 | 0.40 | 2.50 | 0.30 | 0.20 |
| 1.60 | 0.25 | 0.40 | 0.60 | 0.35 | 2.67 | 0.25 | 0.22 |
| 2.00 | 0.30 | 0.60 | 0.80 | 0.40 | 2.50 | 0.30 | 0.20 |
| 3.20 | 0.40 | 1.10 | 1.00 | 0.65 | 3.20 | 0.34 | 0.20 |

TABLE 1-continued

| L (mm) | L-Anode (mm) | L-Cathode (mm) | W (mm) | Clearance (mm) | L/W | Ratio of L-Cathode to Total Length | Ratio of Clearance to Total Length |
|---|---|---|---|---|---|---|---|
| 2.00 | 0.30 | 0.60 | 0.80 | 0.40 | 2.50 | 0.30 | 0.20 |
| 3.20 | 0.40 | 1.10 | 1.00 | 0.65 | 3.20 | 0.34 | 0.20 |
| 1.60 | 0.20 | 0.40 | 0.80 | 0.40 | 2.00 | 0.25 | 0.25 |
| 2.00 | 0.30 | 0.40 | 1.25 | 0.50 | 1.60 | 0.20 | 0.25 |
| 2.00 | 0.10 | 0.40 | 1.25 | 0.70 | 1.60 | 0.20 | 0.35 |
| 3.20 | 0.10 | 0.10 | 1.60 | 1.45 | 2.00 | 0.03 | 0.45 |
| 1.60 | 0.20 | 0.40 | 0.80 | 0.40 | 2.00 | 0.25 | 0.25 |
| 2.00 | 0.30 | 0.40 | 1.25 | 0.50 | 1.60 | 0.20 | 0.25 |
| 3.20 | 0.40 | 1.00 | 1.60 | 0.70 | 2.00 | 0.31 | 0.22 |
| 4.50 | 0.40 | 1.00 | 3.20 | 1.35 | 1.41 | 0.22 | 0.30 |
| 3.20 | 0.40 | 1.00 | 1.60 | 0.70 | 2.00 | 0.31 | 0.22 |
| 3.20 | 0.40 | 1.00 | 1.60 | 0.70 | 2.00 | 0.31 | 0.22 |
| 4.50 | 0.40 | 1.00 | 3.20 | 1.35 | 1.41 | 0.22 | 0.30 |
| 3.20 | 0.40 | 1.00 | 1.60 | 0.70 | 2.00 | 0.31 | 0.22 |
| 2.00 | 0.30 | 0.40 | 1.25 | 0.50 | 1.60 | 0.20 | 0.25 |
| 1.60 | 0.20 | 0.40 | 0.80 | 0.40 | 2.00 | 0.25 | 0.25 |
| 2.00 | 0.30 | 0.40 | 1.25 | 0.50 | 1.60 | 0.20 | 0.25 |

Note that the clearance is the distance L14 shown in FIG. 43, which is the distance between the anode electrodes 720 and 730 and the cathode electrode 740. The ratio of clearance to total length L is given by subtracting the length L-Anode of the anode electrode 720, the length L-Anode of the anode electrode 730 and the length L-Cathode of the cathode electrode 740 from the total length L and then dividing the resulting value (=L14×2) by the total length L.

As is understood from Table 1, in the conventional electric element 700, the ratio of the clearance to the total length L is 0.18 or higher.

Table 2 contains the length L of the electric element 600 according to the present invention, the length L-Anode of the anode electrodes 30 and 40, the length L-Cathode of the cathode electrode 610, the width W of the electric element 600, the clearance, the ratio L/W of the length L to the width W, the ratio of length of the cathode electrode 610 to total length L, and the ratio of clearance to total length L.

TABLE 2

| L (mm) | L-Anode (mm) | L-Cathode (mm) | W (mm) | Clearance (mm) | L/W | Ratio of L-Cathode to Total Length | Ratio of Clearance to Total Length |
|---|---|---|---|---|---|---|---|
| 4.30 | 0.50 | 2.60 | 3.30 | 0.35 | 1.30 | 0.60 | 0.16 |
| 9.00 | 0.50 | 2.50 | 3.30 | 0.50 | 2.73 | 0.28 | 0.11 |
| 7.00 | 1.00 | 1.50 | 2.60 | 0.50 | 2.69 | 0.21 | 0.14 |

Note that in Table 2, the ratio of clearance to total length is given by subtracting the length L2 of the anode electrode 30, the length L2 of the anode electrode 40 and the length L10 of the cathode electrode 610 from the total length L1 and then dividing the resulting value (=L11×2) by the total length L1.

As is understood from Table 2, in the electric element 600 according to the present invention, the ratio of the clearance to the total length is lower than 0.18.

Therefore, assuming that the ratio of the clearance to the total length of the electric element 700, which is 0.18, is the standard value, the ratio of the clearance to the total length of the electric element 600 according to the present invention is lower than the standard value.

Figure 44:
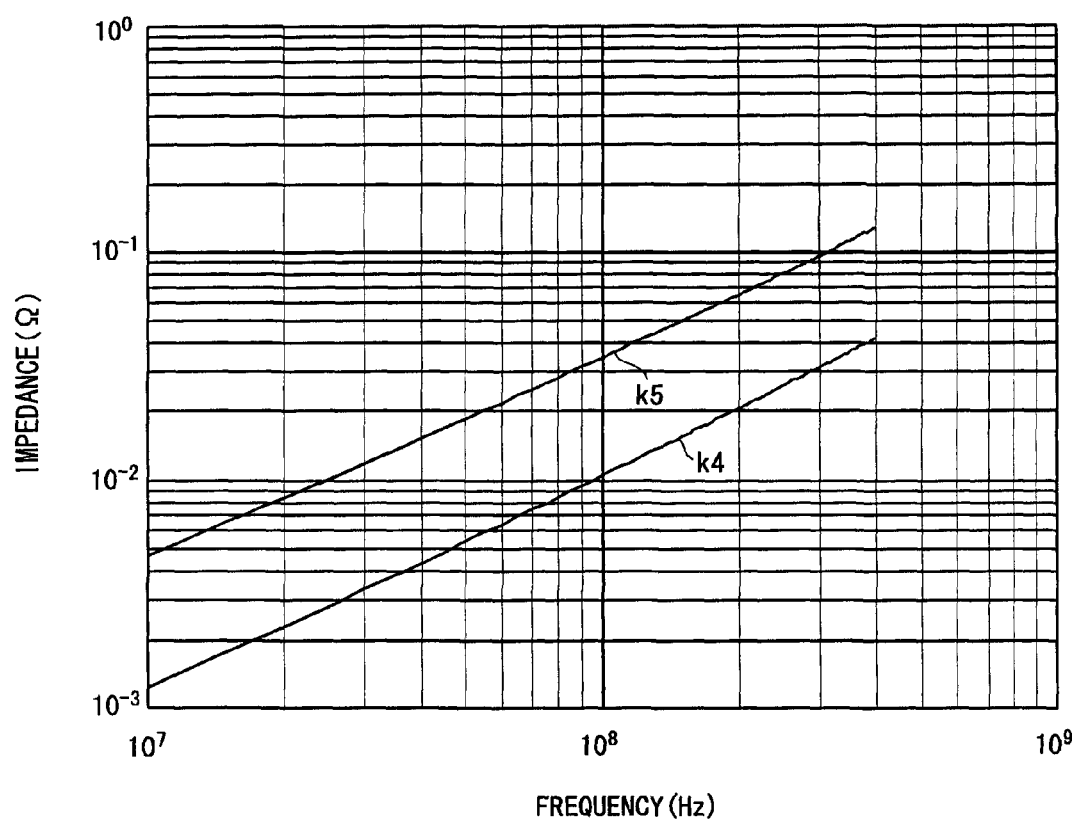
FIG. 44 illustrates the relationship between the impedance and the frequency of electric elements.

FIG. 44 illustrates the relationship between the impedance and the frequency of electric elements. In FIG. 44, the vertical axis represents the impedance, and the abscissa axis represents the frequency. Curve k4 illustrates the relationship between the impedance and the frequency of the electric element 600 according to the present invention. Curve k5 illustrates the relationship between the impedance and the frequency of the conventional electric element 700. Note that frequency is in the range of $10^7$ to $10^9$ Hz where the inductance of the electric elements is dominant to the impedance.

Assuming that electric elements A and B respectively have the impedance and the frequency whose relationship is represented by Curves k4 and k5, the ratio of clearance to total length of the electric element A is 0.17, and that of the electric element B is 0.43. The electric elements A and B have the same length and width in every side. The lengths of the cathode electrode of the electric elements A and B are respectively 2.8 mm and 1.6 mm, and the lengths of all of their anode electrodes are 0.5 mm.

In FIG. 44, at a frequency of $1 \times 10^7$ [Hz] or higher, the impedance is mainly determined by the inductance of the electric elements.

With reference to FIG. 44, at a frequency of $1 \times 10^7$ [Hz] or higher, the impedance (Curve k4) of the electric element 600 according to the present invention is lower than that (Curve k5) of the conventional electric element 700. Accordingly, the inductance of the electric element 600 according to the present invention is less than that of the conventional electric element 700.

As described above, in the electric element 600 according to the present invention, the ratio of the clearance to the total length is lower than that of the conventional electric element 700. Therefore, by setting the ratio of the clearance to the total length to a value smaller than the standard value (=0.18), the impedance (the inductance) becomes lower than that of the conventional electric element 700 at a frequency of $1 \times 10^7$ [Hz] or higher.

Now, the reason why the inductance of the electric element 600 becomes lower than that of the electric element 700, as result of a decrease in the ratio of the clearance to the total length, will be explained.

Figure 45:
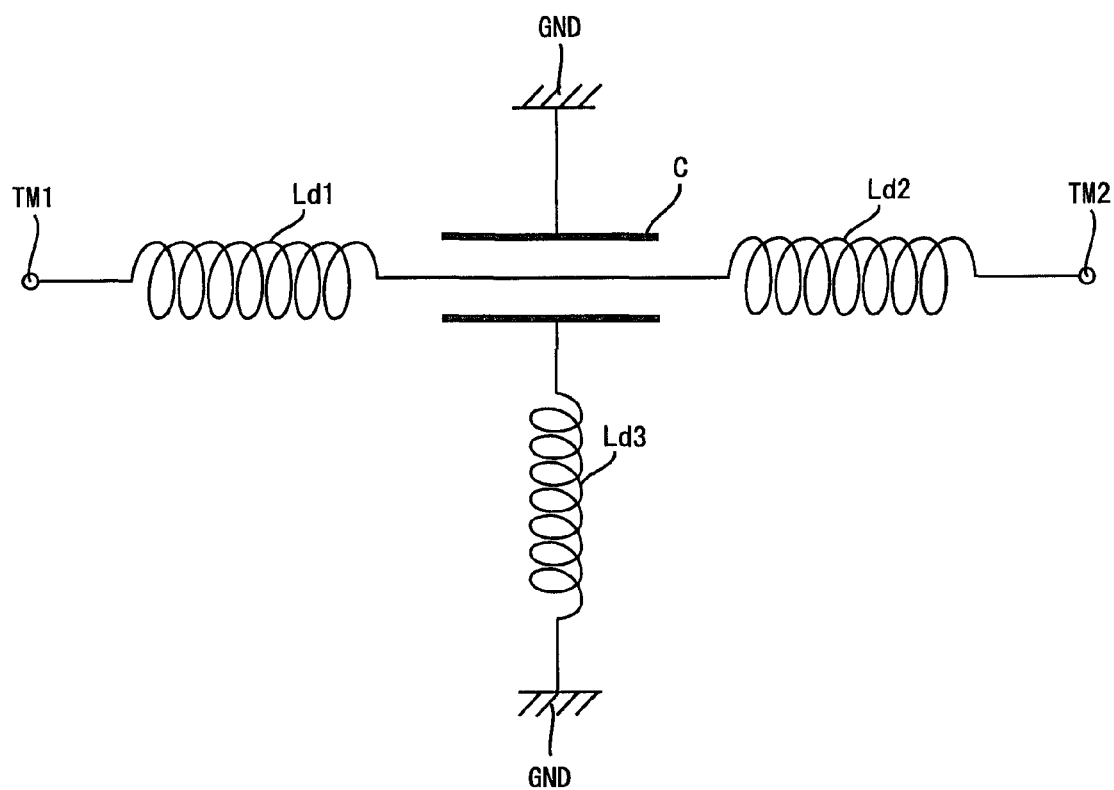
FIG. 45 illustrates the equivalent circuit of the electric elements.

FIG. 45 illustrates the equivalent circuit of the electric elements 600 and 700. With reference to FIG. 45, the equivalent circuit of the electric elements 600 and 700 includes inductances Ld1 and Ld2, capacitance C and inductance Ld3. The inductances Ld1 and Ld2 connected in series between terminals TM1 and TM2. One end of the capacitance C is directly connected to a ground potential GND, and the other end is connected to the ground potential GND via the inductance Ld3. The terminals TM1 and TM2 respectively correspond to the anode electrodes 30 (720) and 40 (730).

As illustrated in FIG. 40, in the electric element 600, the dielectric layer 2 and the conductive plates 11 and 61 constitute a capacitor. The conductive plate 11 is connected to the anode electrodes 30 and 40 with the extended portions 111 and 112. The conductive plate 61 is connected to the cathode electrode 610 with the extended portion 611. The lengths of the anode electrodes 30 and 40 are respectively equal to the length L2 of the extended portions 111 and 112, and the length of the cathode electrode 610 is equal to the length L10 of the extended portion 611.

As a result, in the electric element 600, the distance from the anode electrodes 30 and 40 to the cathode electrode 610 is equal to the distance L11 from the extended portions 111 and 112 of the conductive plate 11 to the extended portion 611 of the conductive plate 61.

On the other hand, in the electric element 700, the conductive plates 761 and 771 and the dielectric layer 752 constitute a capacitor. The conductive plate 761 is connected to the anode electrode 720 on an end face 761A in the longitudinal direction DR2 of the electric element 700, and to the anode electrode 730 on an end face 761B in the longitudinal direction DR2 of the electric element 700. More specifically, in the electric element 700, the conductive plate 761 is not connected to the electrodes 722 and 723 of the anode electrode 720 and the electrodes 732 and 733 of the anode electrode 730.

The extended portion 771A of the conductive plate 771 is connected to the cathode electrode 740 (741), and the extended portion 771B of the conductive plate 771 is connected to the cathode electrode 740 (742). Each of the extended portion 771A and 771B has the same length as that of the cathode electrode 740.

As a result, in the electric element 700, the distance L14 from the anode electrodes 720 and 730 to the cathode electrode 740 is different from the distance L13 from the extended portion (the end face 761A in the longitudinal direction DR1 of the conductive plate 761) of the conductive plate 761 to the extended portions 771A and 771B of the conductive plate 771. The distance L13 is longer than the distance L14.

With reference to FIG. 45, the inductance Ld3 of the electric element 600 is proportional to the distance L11 for which an AC current flows between the conductive plate 11 and the conductive plate 61. The inductance Ld3 of the electric element 700 is proportional to the distance L13 for which an AC current flows between the conductive plate 761 and the conductive plate 771.

As described above, the total length of the electric element 600 (the electric element A) is equal to that of the electric element 700 (the electric elements B and C). The length of the cathode electrode 610 of the electric element 600 (the electric element A) is longer than that of the cathode electrode 740 of the electric element 700 (the electric elements B and C), and therefore, the distance L11 is less than the distance L13.

The inductances Ld1 and Ld2 are proportional to the length of the conductive plates 11 and 761. The lengths of the conductive plates 11 and 761 are equal to each other, and therefore, the inductances Ld1 and Ld2 of the electric elements 600 and 700 are equal to each other.

On the other hand, as described above, the distance L11 is less than the distance L13, and therefore, the inductance Ld3 of the electric element 600 is less than that of the electric element 700. As a result, the total inductance of the electric element 600 is less than that of the electric element 700.

As described above, by setting the ratio of the clearance to the total length to a value smaller than the standard value, the inductance of the electric element 600 becomes less than that of the conventional electric element 700.

Figure 46:
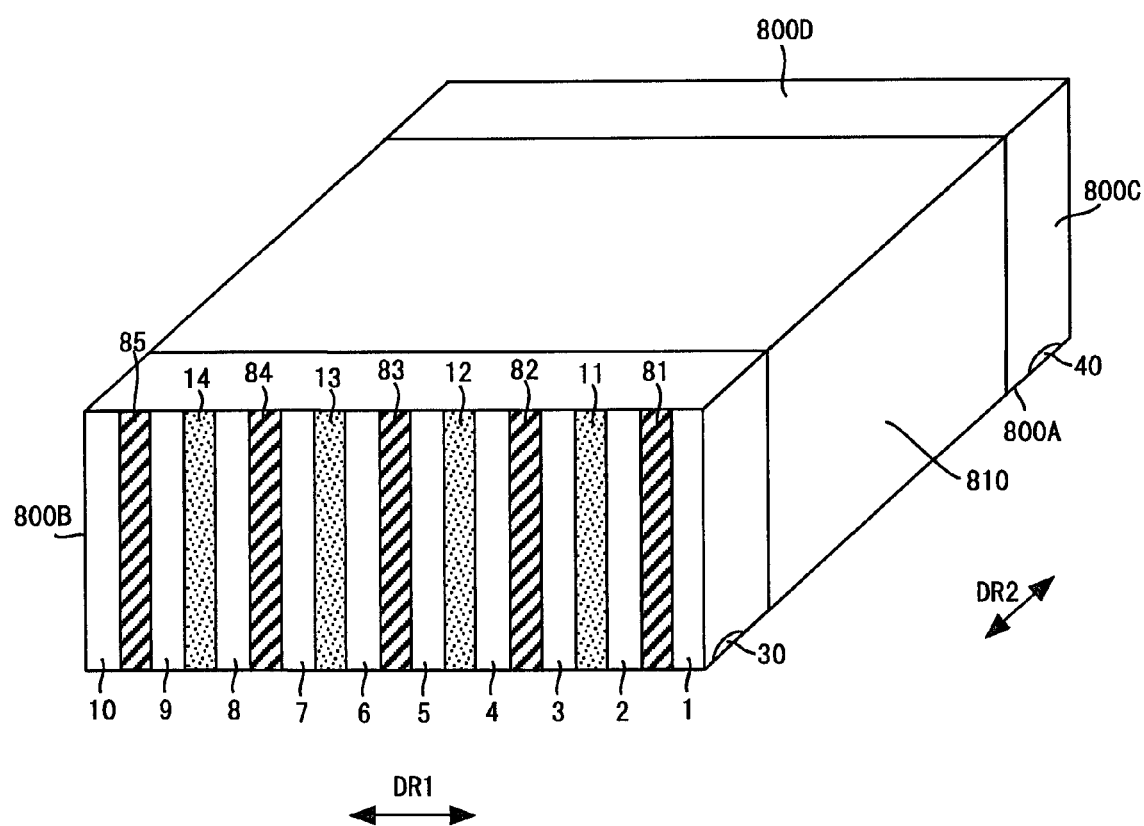
FIG. 46 is a perspective view illustrating the structure of another electric element according to Embodiment 4.

FIG. 46 is a perspective view illustrating the structure of another electric element according to Embodiment 4. The electric element according to Embodiment 4 may be an electric element 800 shown in FIG. 46. With reference to FIG. 46, the electric element 800 is identical with the electric element 600 shown in FIG. 37 except that the conductive plates 61 to 65 and the cathode electrode 610 of the electric element 600 are respectively replaced with conductive plates 81 to 85 and a cathode electrode 810.

The conductive plates 81 to 85 are formed of the same material as that of the conductive plates 21 to 25 and has the same thickness as that of the conductive plates 21 to 25. The conductive plates 81 to 85 are respectively disposed between the dielectric layers 1 and 2, between the dielectric layers 3 and 4, between the dielectric layers 5 and 6, between the dielectric layers 7 and 8, and between the dielectric layers 9 and 10. As a result, the conductive plates 11 to 14 and 81 to 85 are alternately laminated in the width direction DR1.

The cathode electrode 810 is formed, between the anode electrode 30 and the anode electrode 40, on the bottom surface 800A, the side surfaces 800B and 800C and the upper surface 800D of the electric element 800. More specifically, the cathode electrode 810 is formed so as to surround the electric element 800.

Figure 47:
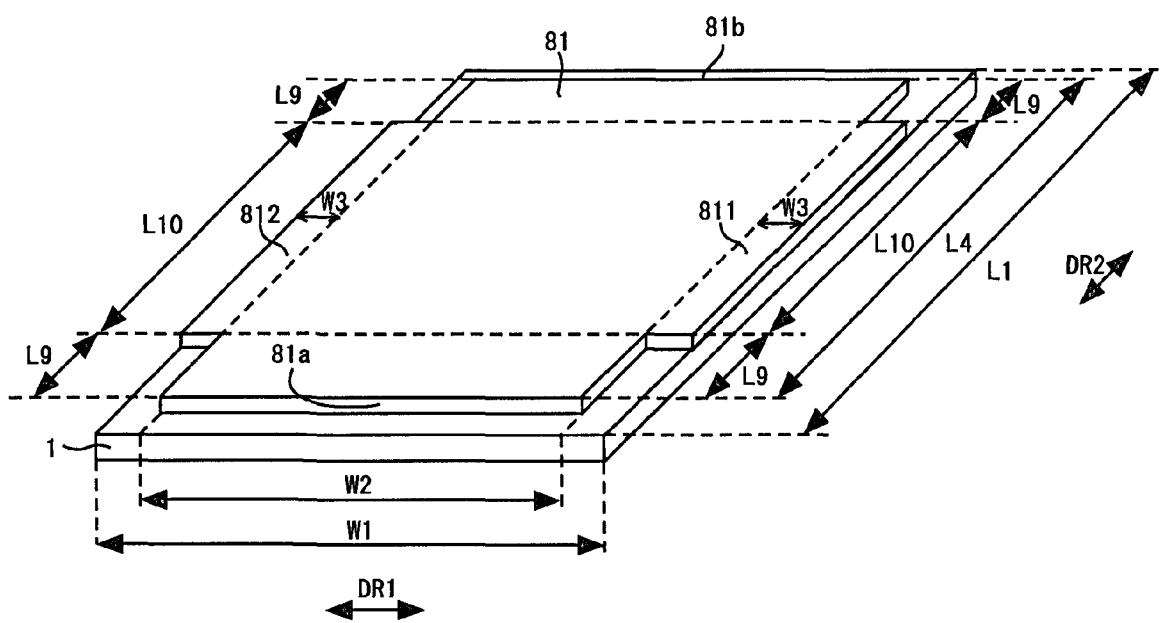
FIG. 47 illustrates the dimensions of the dielectric layer and the conductive plate shown in FIG. 46.

FIG. 47 illustrates the dimensions of the dielectric layer 1 and the conductive plate 81 shown in FIG. 46. With reference to FIG. 47, the conductive plate 81 is plate-like in shape and has the length L4 and the width W2. The conductive plate 81 includes extended portions 811 and 812.

The extended portion 811 is disposed on a position that is the distance-L9 away from the both ends 81a and 81b of the conductive plate 81 in the longitudinal direction DR2, on one end side of the conductive plate 81 in the width direction DR1. The extended portion 812 is disposed on a position that is the distance-L9 away from the both ends 81a and 81b of the conductive plate 81 in the longitudinal direction DR2, on the other end side of the conductive plate 81 in the width direction DR1. Each of the extended portions 811 and 812 has the length L10 and the width W3.

Figure 48:
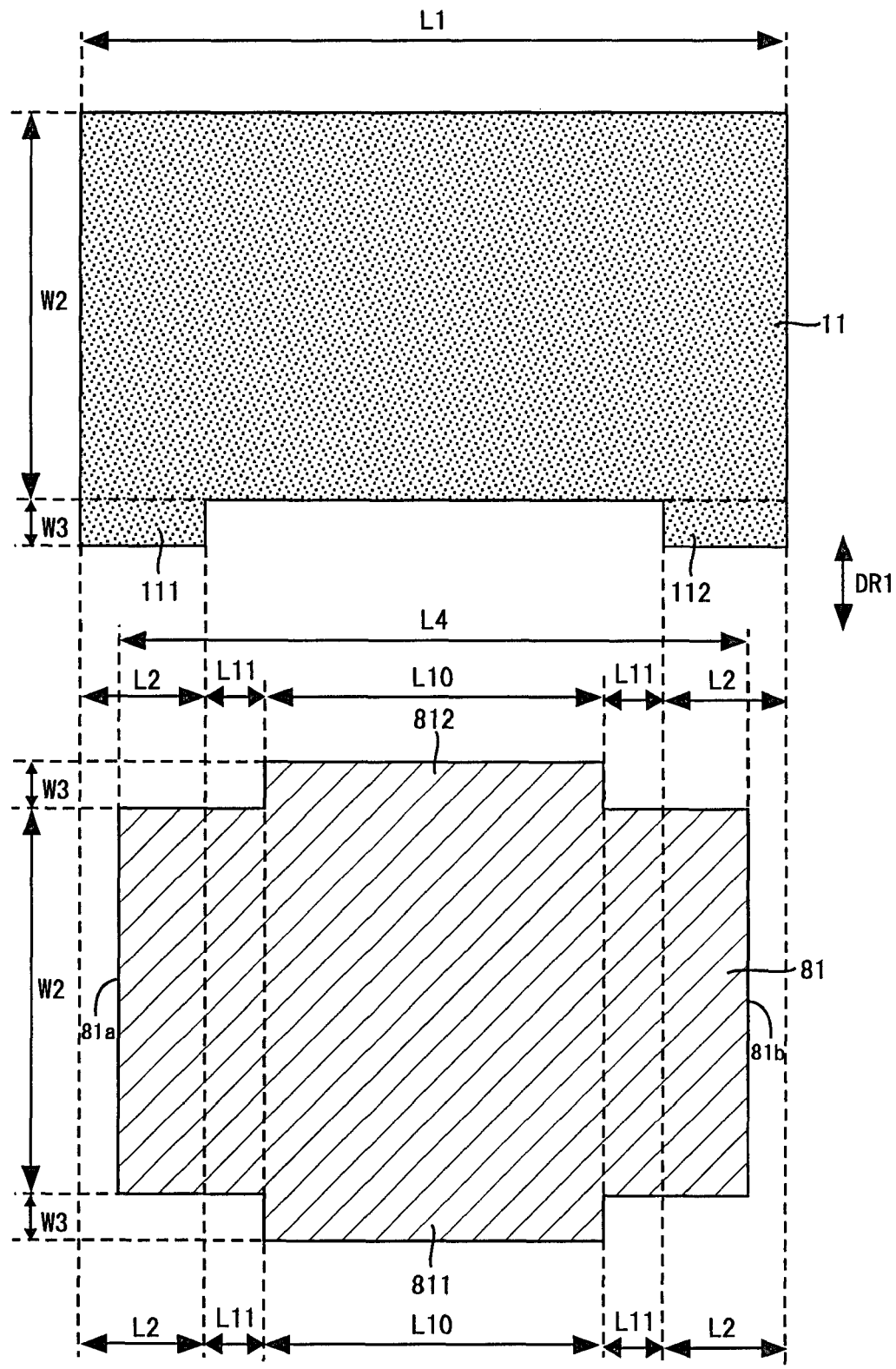
FIG. 48 is a plan view of the two adjacent conductive plates shown in FIG. 46.

FIG. 48 is a plan view of the two adjacent conductive plates 11 and 81 shown in FIG. 46. With reference to FIG. 48, the conductive plate 11 has the length L1 and includes the extended portions 111 and 112 that is extending out in the width direction DR1. The extended portions 111 and 112 of the conductive plate 11 has the length L2, and the conductive plate 81 has the length L4. The extended portions 811 and 812 of the conductive plate 81 is disposed on a position that is the distance-L9 away from the both ends 81a and 81b of the conductive plate 81, and therefore, the distance between the extended portions 111 and 112 of the conductive plate 11 and the extended portions 811 and 812 of the conductive plate 81 is the distance L11. In the electric element 800, the distance L11 constitutes the clearance, and ratio (=(2×L11)/L1) of the clearance to the total length is determined to be lower than the standard value (=0.18).

Note that each of the conductive plates 82 to 85 shown in FIG. 46 has the same shape and dimensions as those of the conductive plate 81 shown in FIG. 48.

Figure 49:
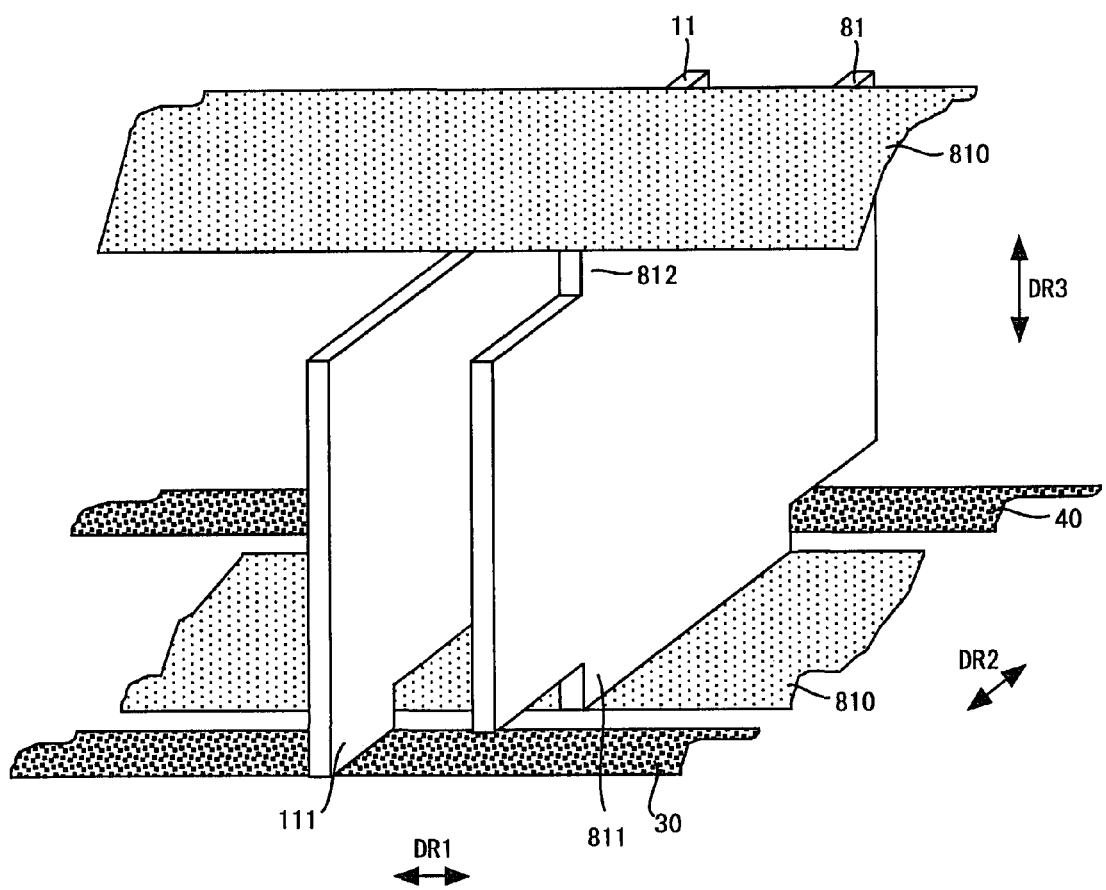
FIG. 49 is a perspective view illustrating the connection of the two conductive plates, and the anode electrodes and the cathode electrode, which constitute a capacitor in the electric element shown in FIG. 46.

FIG. 49 is a perspective view illustrating the connection of the two conductive plates 11 and 81, and the anode electrodes 30 and 40 and the cathode electrode 810, which constitute a capacitor in the electric element 800 shown in FIG. 46.

With reference to FIG. 49, the conductive plates 11 and 81 constitute a capacitor. In the electric element 800, the conductive plate 11 is connected to the anode electrodes 30 and 40 as that of the electric element 100 (refer to FIG. 5) is connected to the anode electrodes 30 and 40. The cathode electrode 810 is connected to the extended portions 811 and 812 of the conductive plate 81. As described above, in the electric element 800, the cathode electrode 810 is connected to the conductive plate 81 on its both ends in the perpendicular direction DR3.

As a result, an AC current flows to and from the cathode electrode 810 through the both ends in the perpendicular direction DR3 (=the width direction of the conductive plate 81) of the conductive plate 81, and therefore, the impedance between the conductive plate 81 and the cathode electrode 810 is lower than that of the electric element 600. Accordingly, the impedance of the electric element 800 is made lower than that of the electric element 600.

The rest is the same as the electric element 600.

Figure 50:
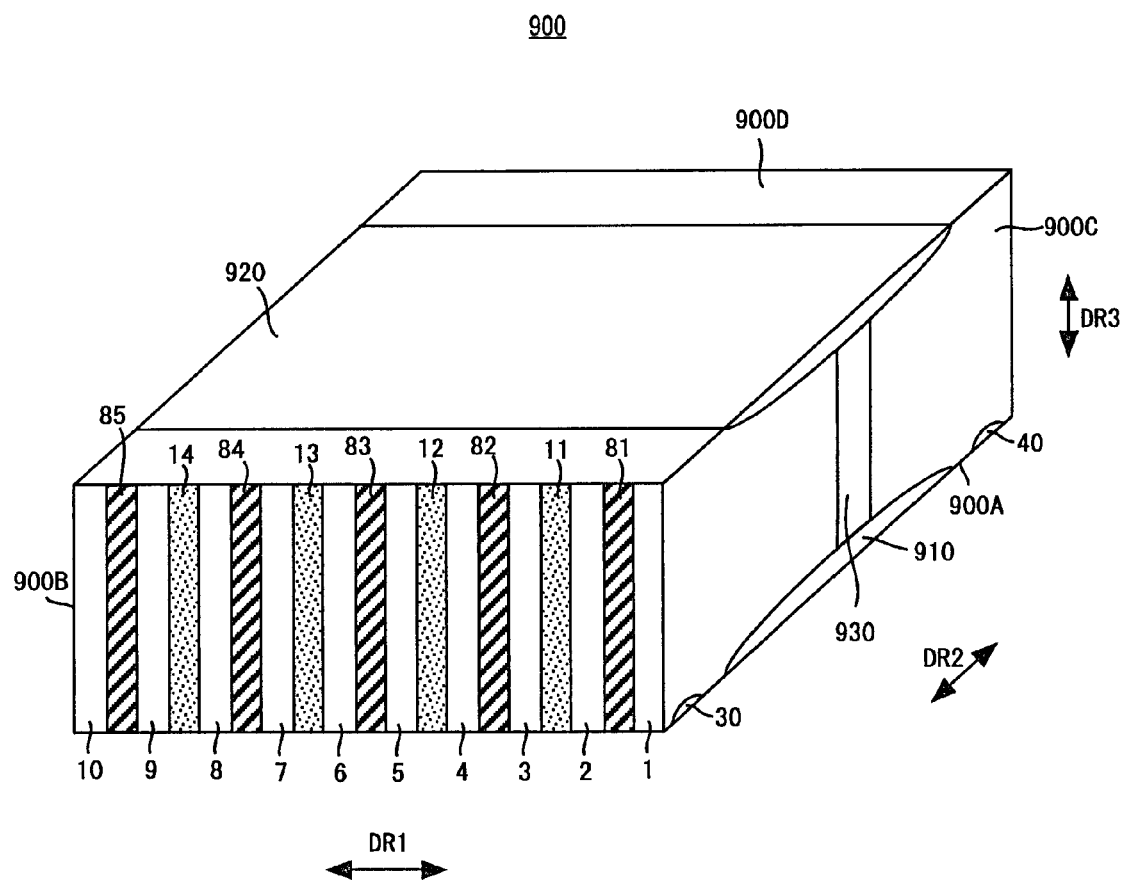
FIG. 50 is a perspective view illustrating the structure of another electric element according to Embodiment 4.

FIG. 50 is a perspective view illustrating the structure of another electric element according to Embodiment 4. The electric element according to Embodiment 4 may be an electric element 900 shown in FIG. 50. With reference to FIG. 50, the electric element 900 identical with the electric element 800 shown in FIG. 46 except that the cathode electrode 810 of the electric element 800 is replaced with cathode electrodes 910, 920 and 930.

The cathode electrode 910 is in the shape of the band and formed, between the anode electrode 30 and anode electrode 40, on part of the bottom surface 900A and the side surfaces 900B and 900C of the electric element 900. The cathode electrode 920 is in the shape of the band and formed of, between the anode electrode 30 and the anode electrode 40, on part of the upper surface 900D and the side surfaces 900B and 900C of the electric element 900. The cathode electrode 930 connects the cathode electrode 910 to the cathode electrode 920.

As described above, the electric element 900 comprises the cathode electrodes 910 and 920, which hold the electric element 900 therebetween in the perpendicular direction DR3; and the cathode electrode 930, which connects the cathode electrode 910 to the cathode electrode 920. Therefore, in the electric element 900, an AC current flows between the conductive plates 81 to 85 and the cathode electrodes 910, 920 and 930 through the both ends in the perpendicular direction DR3 (=the width direction of the conductive plates 81 to 85) of the conductive plates 81 to 85, and therefore, the impedance between the conductive plates 81 to 85 and the cathode electrodes 910, 920 and 930 is made lower than that of the electric element 600. Accordingly, the impedance of the electric element 900 is made lower than that of the electric element 600.

Note that if the conventional electric element 700 is laid on its side so that the conductive plates 761 to 764 and 771 to 775 are laminated in the width direction DR1, and if the two electrodes 741 and 742 of the cathode electrode 740 are connected to each other, the conventional electric element 700 becomes the electric element 900. Therefore, the electric element 900 according to Embodiment 4 includes the conventional electric element 700, if its two electrodes 741 and 742 are rearranged to have the ratio of the clearance to the total length lower than the standard value, if its two electrodes 741 and 742 are connected to each other, and if it is disposed so that the width direction of the conductive plates 761 and 772 is the perpendicular direction DR3. More specifically, the electric element 900 includes the electric element 700 used between the DC power supply 120 and the CPU 130, if its removed therefrom, if its two electrodes 741 and 742 are rearranged to have the ratio of the clearance to the total length lower than the standard value, and if the two electrodes 741 and 742 are connected to each other.

The rest is the same as the electric element 800.

Figure 51:
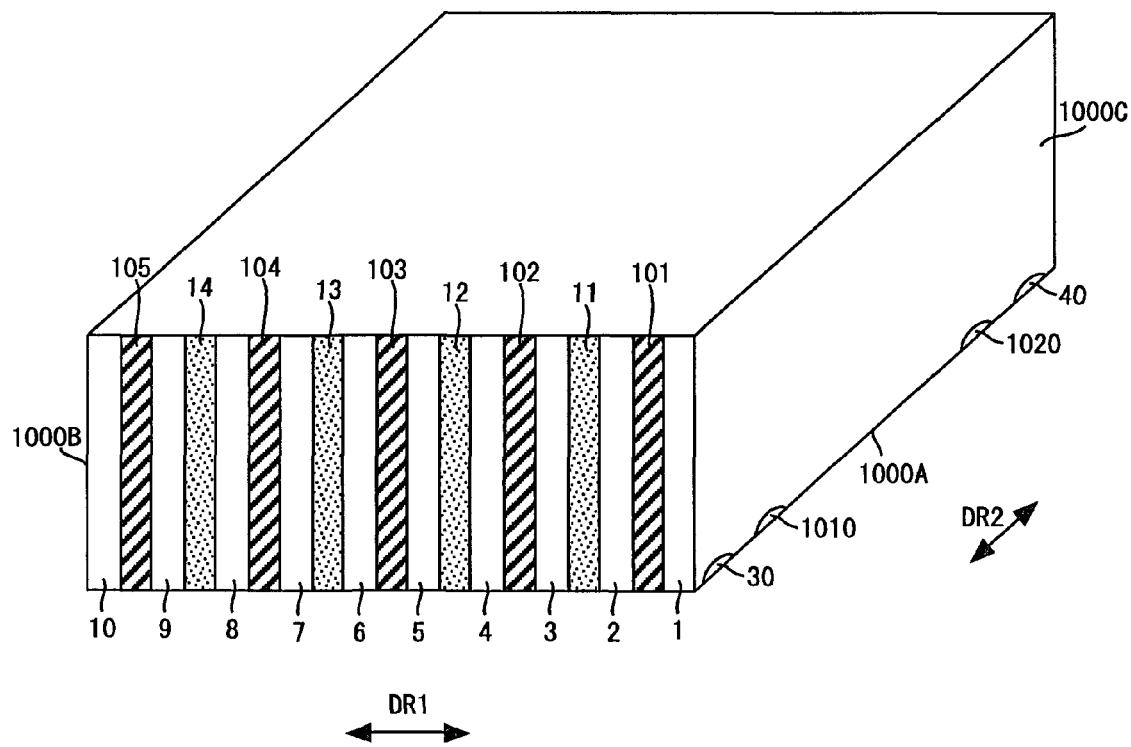
FIG. 51 is a perspective view illustrating the structure of another electric element according to Embodiment 4.

FIG. 51 is a perspective view illustrating the structure of another electric element according to Embodiment 4. The electric element according to Embodiment 4 may be an electric element 1000 shown in FIG. 51. With reference to FIG. 51, the electric element 1000 is identical with the electric element 100 shown in FIG. 1 except that the conductive plates 21 to 25 and the cathode electrodes 50 and 60 of the electric element 100 are respectively replaced with conductive plates 101 to 105 and cathode electrodes 1010 and 1020.

The conductive plates 101 to 105 are formed of the same material as that of the conductive plates 21 to 25 and have the same thickness as that of the conductive plates 21 to 25. The conductive plates 101 to 105 are respectively disposed between the dielectric layers 1 and 2, between the dielectric layers 3 and 4, between the dielectric layers 5 and 6, between the dielectric layers 7 and 8, and the dielectric layers 9 and 10. As a result, the conductive plates 11 to 14 and 101 to 105 are alternately disposed in the width direction DR1.

The cathode electrodes 1010 and 1020 are disposed, as the cathode electrodes 50 and 60 are disposed, and connected to the conductive plates 101 to 105.

Figure 52:
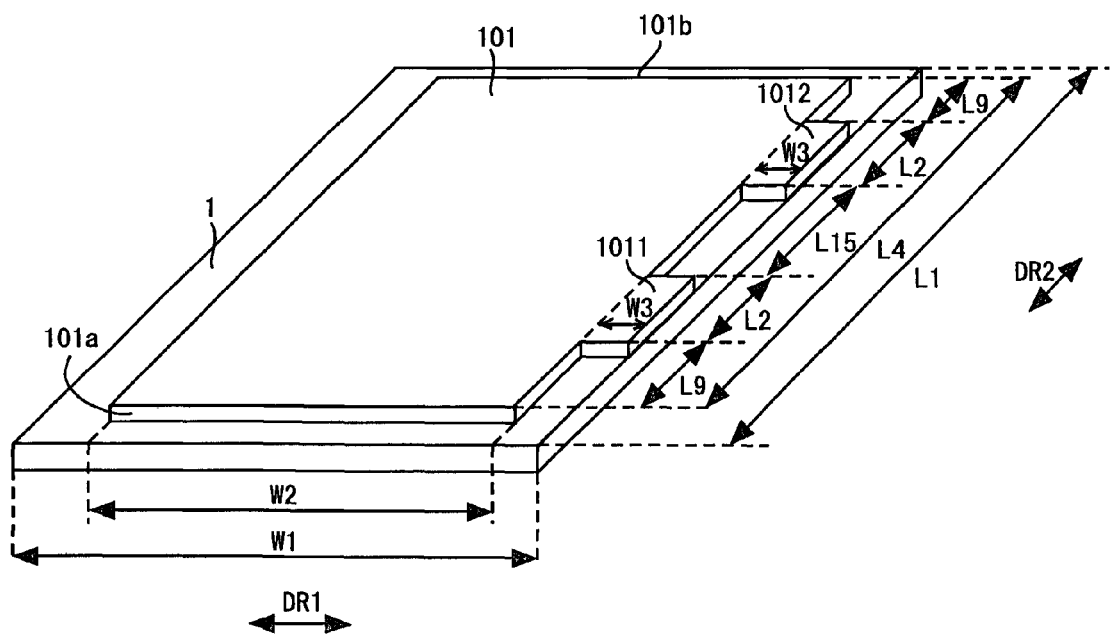
FIG. 52 is a perspective view illustrating the dimensions of the dielectric layer and the conductive plate shown in FIG. 51.

FIG. 52 is a perspective view illustrating the dimensions of the dielectric layer 1 and the conductive plate 101 shown in FIG. 51. With reference to FIG. 52, the conductive plate 101 is plate-like in shape and has the length L4 and the width W2. The conductive plate 101 includes extended portions 1011 and 1012. The extended portion 1011 is disposed on a position that is the distance-L9 away from one end 101a of the conductive plate 101 in the longitudinal direction DR2, on one end side of the conductive plate 101 in the width direction DR1. The extended portion 1012 is disposed on a position that is the distance-L9 away from the other end 101b of the conductive plate 101 in the longitudinal direction DR2, on the same side as the extended portion 1011 in width direction DR1. Each of the extended portions 1011 and 1012 has the length L2 and the width W3. As a result, the distance between the extended portion 1011 and the extended portion 1012 is L15.

Note that each of the conductive plates 102 to 105 has the same shape and dimensions as those of the conductive plate 101 shown in FIG. 52.

Figure 53:
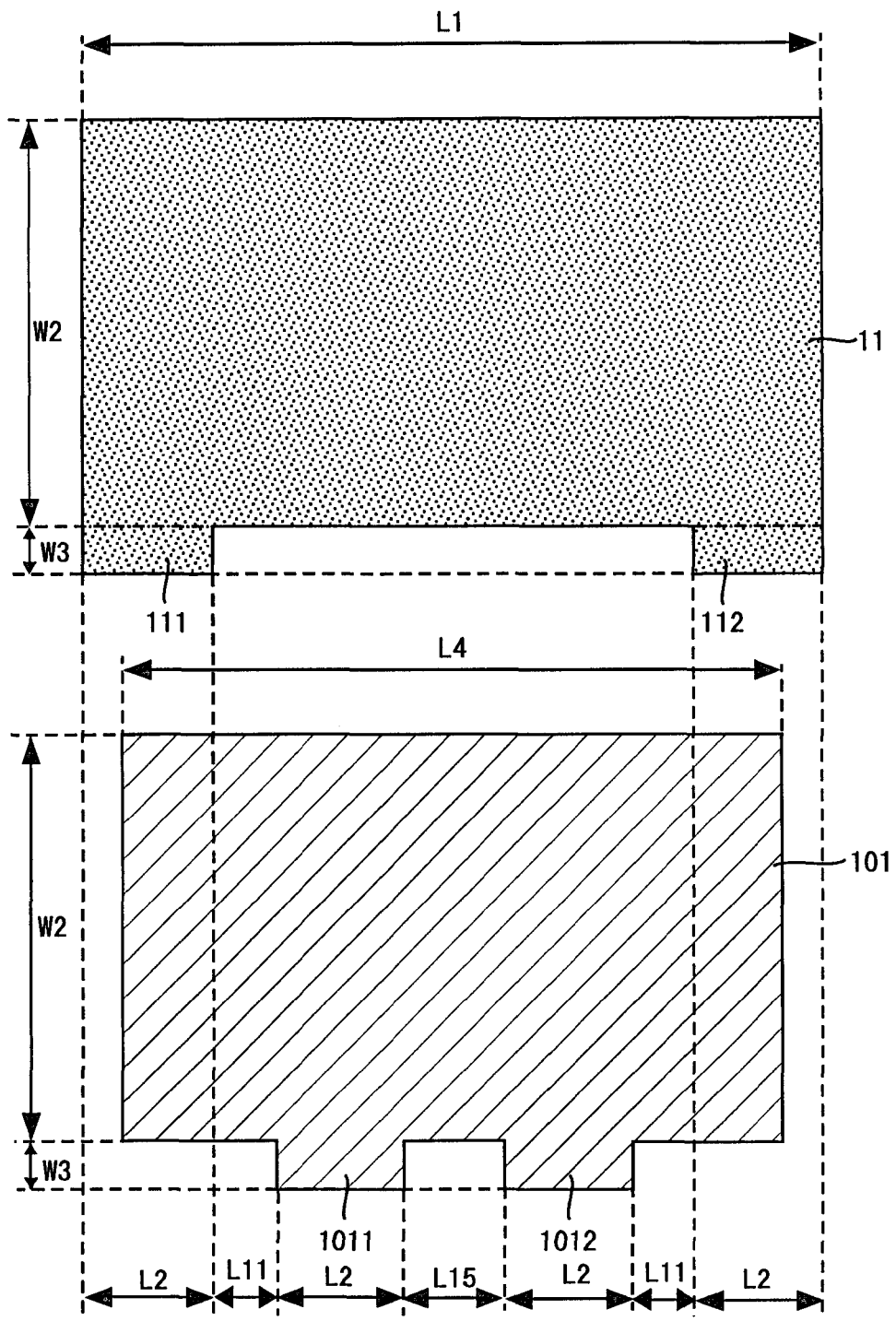
FIG. 53 is a plan view of the two adjacent conductive plates shown in FIG. 51.

FIG. 53 is a plan view of the two adjacent conductive plates 11 and 101 shown in FIG. 51. With reference to FIG. 53, since the conductive plates 11 and 101 have the shape and dimensions described above, the distance between the extended portion 111 of the conductive plate 11 and the extended portion 1011 of the conductive plate 101 and that between the extended portion 112 of the conductive plate 11 and the extended portion 1012 of the conductive plate 101 are determined to be L11. In the electric element 1000, the ratio of the clearance (=(2×L11)/L1) to the total length is also determined to be lower than the standard value (=0.18). Accordingly, the impedance of the electric element 1000 is made lower than that of the electric element 700.

The rest is the same as the electric element 100.

Figure 54:
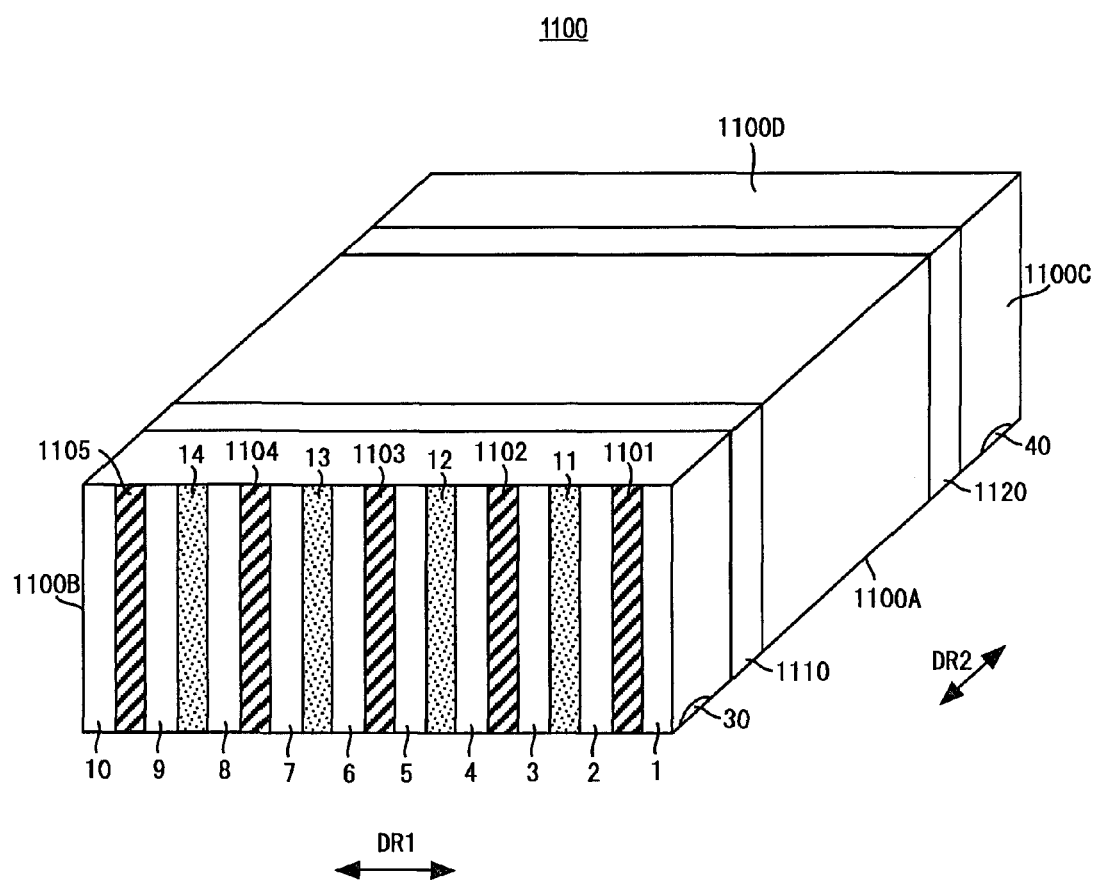
FIG. 54 is a perspective view illustrating the structure of another electric element according to Embodiment 4.

FIG. 54 is a perspective view illustrating the structure of another electric element according to Embodiment 4. The electric element according to Embodiment 4 may be an electric element 1100 shown in FIG. 54. With reference to FIG. 54, the electric element 1100 is identical with the electric element 1000 shown in FIG. 51 except that the conductive plates 101 to 105 and the cathode electrodes 1010 and 1020 of the electric element 1000 are respectively replaced with conductive plates 1101 to 1105 and cathode electrodes 1110 and 1120.

The conductive plate 1101 to 1105 are formed of the same material as that of the conductive plates 21 to 25 and have the same thickness as that of the conductive plates 21 to 25. The conductive plates 1101 to 1105 are respectively disposed between the dielectric layers 1 and 2, between the dielectric layers 3 and 4, between the dielectric layers 5 and 6, between the dielectric layers 7 and 8, and between the dielectric layers 9 and 10. As a result, the conductive plates 11 to 14 and 1101 to 1105 are alternately disposed in the width direction DR1.

The cathode electrode 1110 is disposed on the anode electrode 30 side in the longitudinal direction DR2. The cathode electrode 1110 is in the shape of the band and formed on the bottom surface 1100A, the side surfaces 1100B and 1100C and the upper surface 1100D of the electric element 1100. The cathode electrode 1120 is disposed on the anode electrode 40 side in the longitudinal direction DR2. The cathode electrode 1120 is in the shape of the band and formed on the bottom surface 1100A, the side surfaces 1100B and 1100C and the upper surface 1100D of the electric element 1100.

Figure 55:
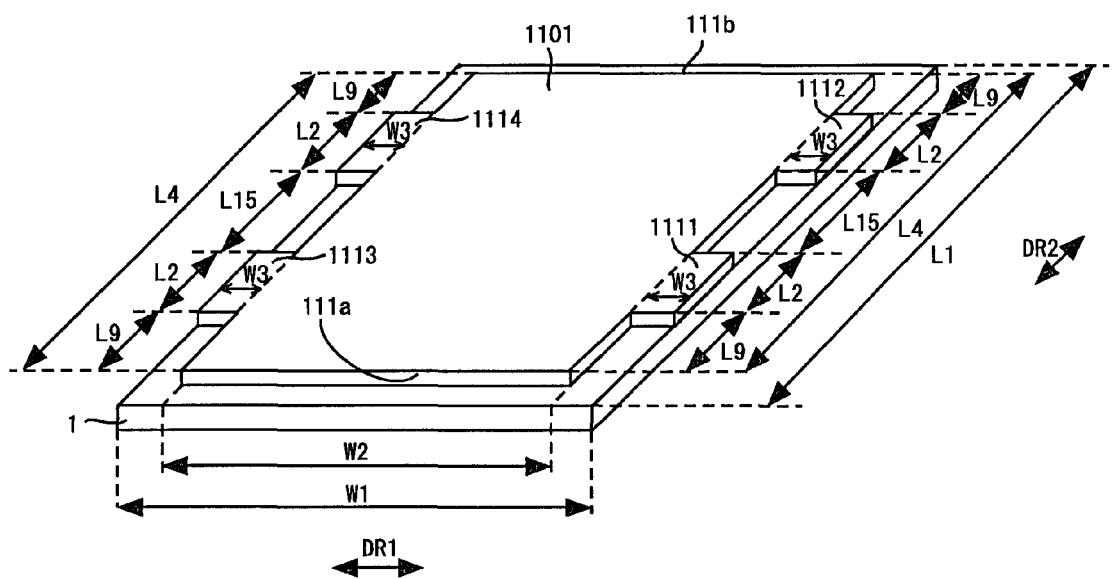
FIG. 55 illustrates the dimensions of the dielectric layer and the conductive plate shown in FIG. 54.

FIG. 55 illustrates the dimensions of the dielectric layer 1 and the conductive plate 1101 shown in FIG. 54. With reference to FIG. 55, the conductive plate 1101 is plate-like in shape and has the length L4 and the width W2. The conductive plate 1101 includes extended portions 1111 to 1114.

The extended portions 1111 and 1112 are disposed on one end side of the conductive plate 1101 in the width direction DR1 as the extended portions 1011 and 1012 (refer to FIG. 52) of the conductive plate 101 are disposed. The extended portions 1113 and 1114 are disposed on the other end side of the conductive plate 1101 in the width direction DR1, respectively facing the extended portions 1111 and 1112. Each of the extended portions 1111 to 1114 has the length L2 and the width W3. As a result, the distance between the extended portions 1111 and the extended portion 1112, and that between the extended portion 1113 and the extended portion 1114 are L15.

Note that each of the conductive plates 1102 to 1105 has the same shape and dimensions as those of the conductive plate 1101 shown in FIG. 55.

Figure 56:
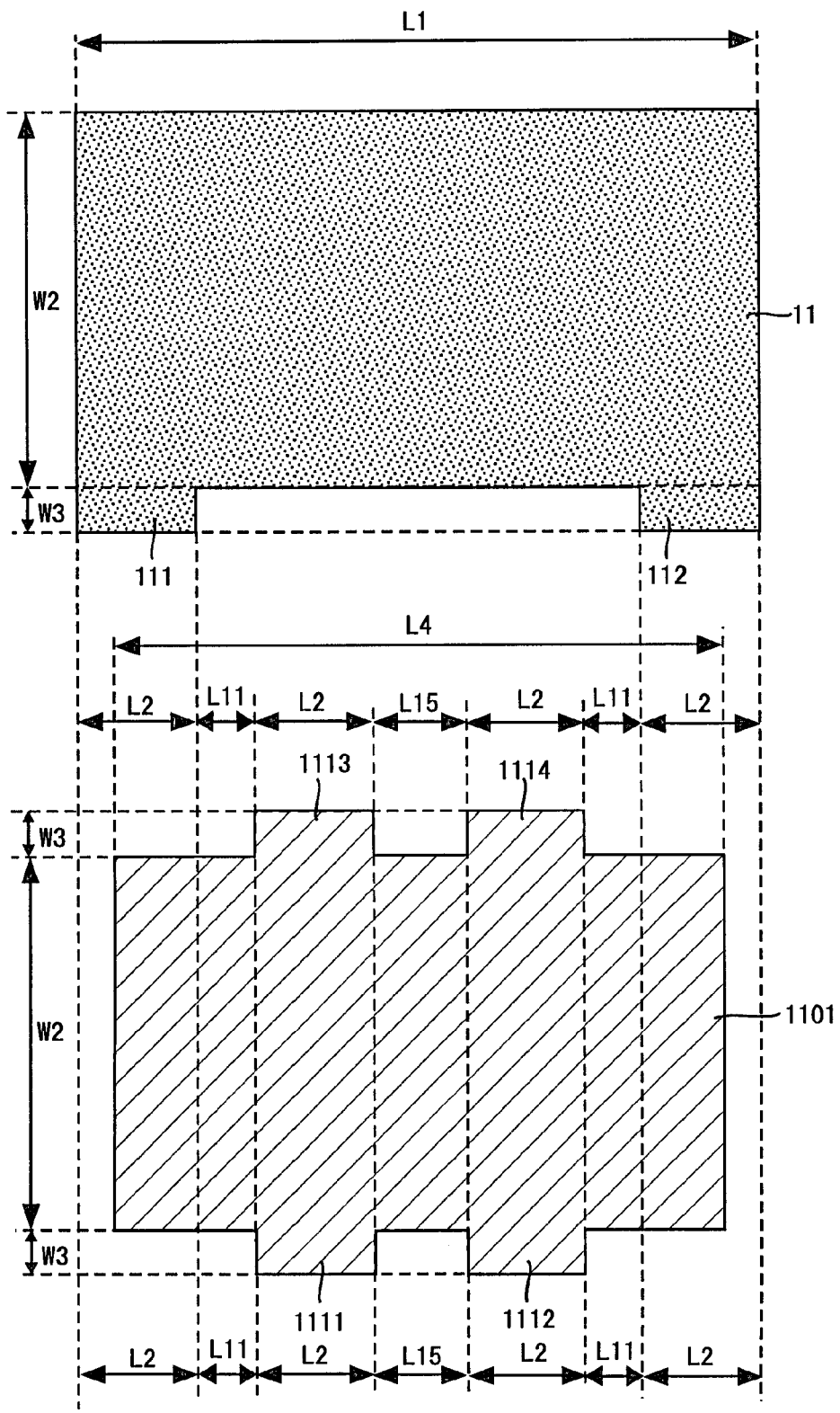
FIG. 56 is a plan view of the two adjacent conductive plates shown in FIG. 54.

FIG. 56 is a plan view of the two adjacent conductive plates 11 and 1101 shown in FIG. 54. With reference to FIG. 56, since the conductive plates 11 and 1101 have the shape and dimensions described above, the distance between the extended portion 111 of the conductive plate 11 and the extended portion 1111 of the conductive plate 1101 and that between the extended portion 112 of the conductive plate 11 and the extended portion 1112 of the conductive plate 1101 are the distance L11. In the electric element 1100, the ratio (=(2×L11)/L1) of the clearance to the total length is determined to be lower than the standard value (=0.18).

Figure 57:
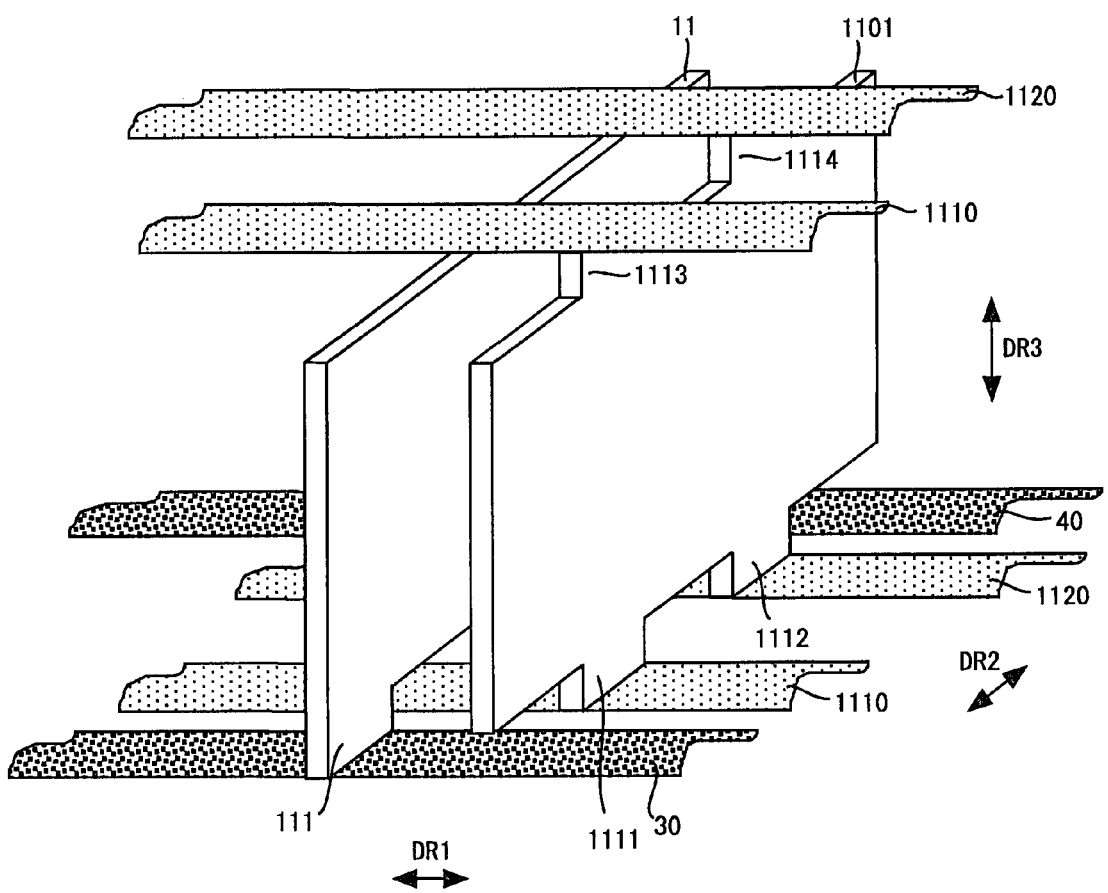
FIG. 57 illustrates the connection of the conductive plates, and the anode electrodes and the cathode electrodes, which constitute a capacitor in the electric element shown in FIG. 54.

FIG. 57 illustrates the connection of the conductive plates 11 and 1101, and the anode electrodes 30 and 40 and the cathode electrodes 1110 and 1120, which constitute a capacitor in the electric element 1100 shown in FIG. 54.

With reference to FIG. 57, the conductive plate 11 is connected to the anode electrodes 30 and 40 as described above. The conductive plate 1101 is connected to each of the cathode electrodes 1110 and 1120, with the extended portions 1111 and 1112, on one end side of the conductive plate 1101 in the perpendicular direction DR3, and to each of the cathode electrodes 1110 and 1120, with the extended portions 1113 and 1114, on the other end side of the conductive plate 1101 in the perpendicular direction DR3. More specifically, the conductive plate 1101 is connected to the cathode electrodes 1110 and 1120 on the both ends in the perpendicular direction DR3 (=the width direction of the conductive plate 1101).

As a result, the impedance encountered when an AC current flows across the conductive plate 1101 is made lower than that encountered when an AC current flows across the conductive plate 101. Therefore, the impedance of the electric element 1100 is made lower than that of the electric element 1000.

The rest is the same as the electric element 1000.

It is described above that the electric element according to Embodiment 4 has the ratio of the clearance to the total length lower than the standard value (=0.18). The present invention, however, is not limited to that: The electric element according to Embodiment 4 only has to comprises: the conductive plates 11 to 14 (the conductive plate 11B) including the extended portions 111 and 112 (or the extended portions 111 to 114) extending out in the perpendicular direction DR3 (=the width direction of the conductive plates 11 to 14); and the conductive plates 61 to 65 (the conductive plates 81 to 85, 101 to 105 and 1101 to 1105) including the extended portion 611 (or the extended portions 811 and 812, 1011 and 1012, or 1111 to 1114) extending out in the perpendicular direction DR3 (=the width direction of the conductive plates 61 to 65, 81 to 85, 101 to 105, and 1101 to 1105).

That is because, with the extended portions 111 and 112 (or the extended portions 111 to 114) and the extended portion 611 (or the extended portions 811 and 812, 1011 and 1012, or 1111 to 1114) extending out in the perpendicular direction DR3, the distance for which an AC current flows across two conductive plates of a capacitor is shorter than that of the conventional electric element 700 by the length of the extended portions 111 and 112 (or the extended portions 111 to 114), and therefore, the inductance Ld3 is less than that of the conventional electric element 700, which results in the total impedance lower than that of the electric element 700.

Note that, in Embodiment 4, the lengths of the extended portions 111 and 112 of the conductive plates 11 to 14 connected to the anode electrodes 30 and 40, and those of the extended portions 611, 811 and 812, 1011 and 1012, and 1111 to 1114 of the conductive plates 61 to 65, 81 to 85, 101 to 105, and 1101 to 1105 connected to the cathode electrodes 610 and 810, 910 and 920, 1010 and 1020, and 1110 and 1120 are determined arbitrarily. What is needed is that the distances between the extended portions 111 and 112 and the extended portions 611, 811 and 812, 1011 and 1012, and 1111 to 1114 are the above-described distance L11.

The rest is the same as Embodiments 1 and 2.

Embodiment 5

Figure 58:
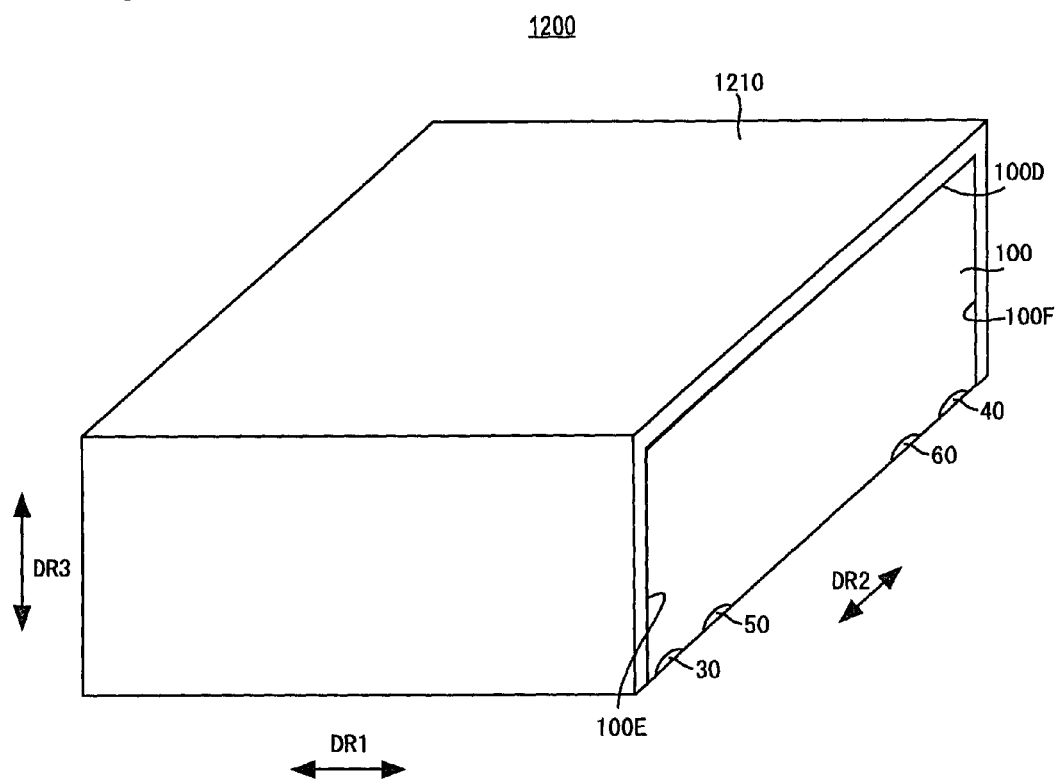
FIG. 58 is a perspective view illustrating the structure of an electric element according to Embodiment 5.

FIG. 58 is a perspective view illustrating the structure of an electric element according to Embodiment 5. With reference to FIG. 58, an electric element 1200 according to Embodiment 5 is identical with the electric element 100 shown in FIG. 1 except that a conductive plate 1210 is added to the electric element 100.

The conductive plate 1210 is disposed on the whole upper surface 100D, the whole side surface 100E on one end side in the longitudinal direction DR2, and on the whole side surface 100F on the other end side in the longitudinal direction DR2 of the electric element 100. As a result, the conductive plate 1210 is connected to the both ends of the conductive plates 11 to 14 of the electric element 100 and electrically insulated from the conductive plates 21 to 25. More specifically, the conductive plate 1210 is connected parallel to the conductive plates 11 to 14 between the anode electrodes 30 and 40.

The conductive plate 1210 is formed of Ni, for example, and has a thickness of 2 mm to 3 mm. More specifically, the conductive plate 1210 has a thickness thicker than that of the conductive plates 11 to 14 and 21 to 25 disposed in the electric element 100.

Accordingly, in the electric element 1200, a DC current flowed into the conductive plates 11 to 14 through the anode electrode 30 flows across, in the longitudinal direction DR2, the conductive plates 11 to 14 and the conductive plate 1210 connected parallel to the conductive plates 11 to 14, and then flows out of the anode electrode 40. In this case, since the conductive plate 1210 has the thickness thicker than that of the conductive plates 11 to 14, the DC current mainly flows across the conductive plate 1210.

As a result, the electric element 1200 is capable of supplying more DC current to the CPU 130 than the electric element 100. The electric element 1200 comprises the conductive plate 1210 disposed on surfaces (the upper surface 100D and the side surfaces 100E and 100F) of the electric element 100, and therefore, the conductive plate 1210 radiates heat generated by the electric element 100. Therefore, the temperature of the electric element 1200 is kept lower than that in the electric element 100.

Note that the electric element 1200 may comprise a conductive plate disposed on the whole upper surface 100D and part of the side surfaces 100E and 100F in the perpendicular direction DR3 of the electric element 100. More specifically, the electric element 1200 only has to comprise a conductive plate connected to the conductive plates 11 to 14 on part of the side surfaces 100E and 100F of the electric element 100.

The electric element 1200 is fabricated by disposing the conductive plate 1210 on the upper surface 100D and the side surfaces 100E and 100F of the electric element 100, after fabricating the electric element 100 by the methods described in Embodiment 1.

The rest is the same as the electric element 100.

Figure 59:
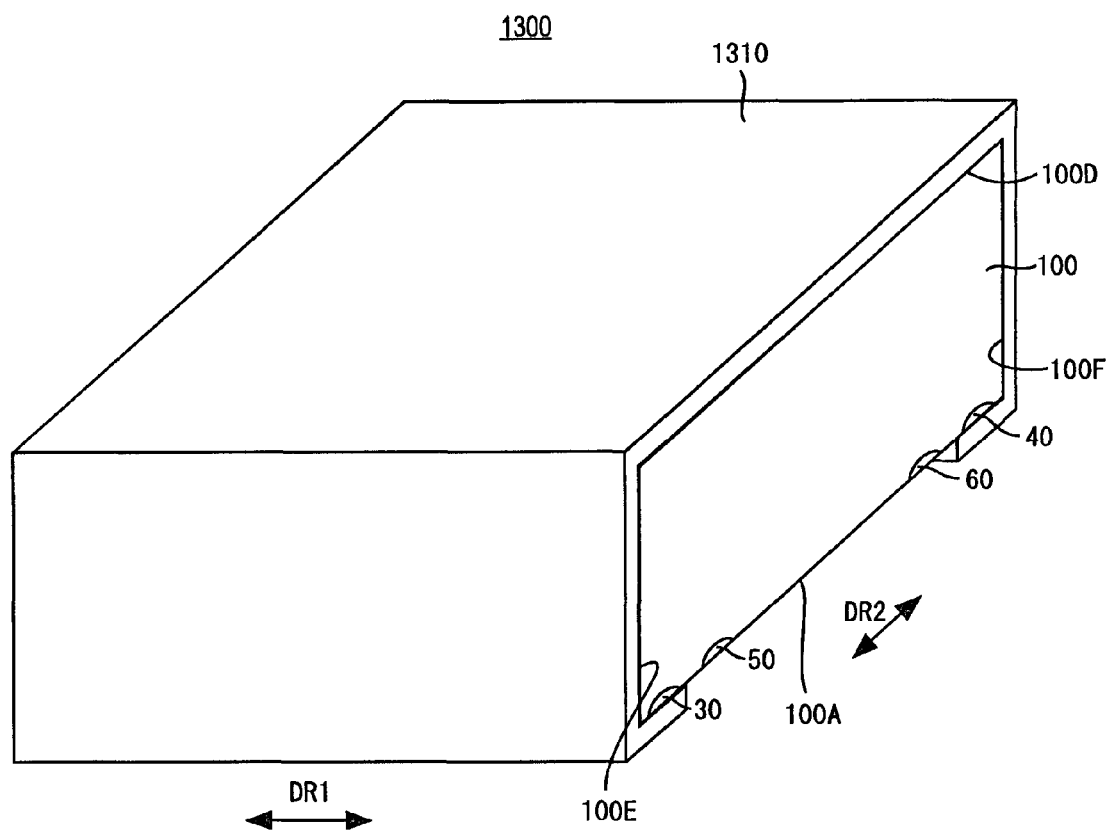
FIG. 59 is a perspective view illustrating the structure of another electric element according to Embodiment 5.

FIG. 59 is a perspective view illustrating the structure of another electric element according to Embodiment 5. The electric element according to Embodiment 5 may be an electric element 1300 shown in FIG. 59. With reference to FIG. 59, the electric element 1300 is identical with the electric element 1200 shown in FIG. 58 except that the conductive plate 1210 of the electric element 1200 is replaced with a conductive plate 1310.

The conductive plate 1310 is disposed on the whole upper surface 100D, the whole side surfaces 100E and 100F, and part of the bottom surface 100A of the electric element 100. The conductive plate 1310 is connected to the both ends of the conductive plates 11 to 14 in the longitudinal direction DR2 on the side surfaces 100E and 100F of the electric element 100, and to the extended portions 111 and 112 of the conductive plates 11 to 14 and the anode electrodes 30 and 40 on the bottom surface 100A. As a result, the conductive plate 1310 is connected parallel to the conductive plates 11 to 14 between the anode electrodes 30 and 40. The conductive plate 1310 is formed of the same material as that of the conductive plate 1210 and has the same thickness as that of the conductive plate 1210.

The conductive plate 1310 is directly connected to the anode electrodes 30 and 40, and therefore, the resistance between the anode electrodes 30 and 40 and the conductive plate 1310 is less than that between the anode electrodes 30 and 40 and the conductive plate 1201 of the electric element 1200. The contact area between the conductive plate 1310 and the electric element 100 is larger than that between the conductive plate 1210 and the electric element 100.

Accordingly, the electric element 1300 is capable of supplying more DC current to the CPU 130 than the electric element 1200, and the temperature of the electric element 100 is kept lower than that in the electric element 1200.

The rest is the same as the electric element 1200.

Figure 60:
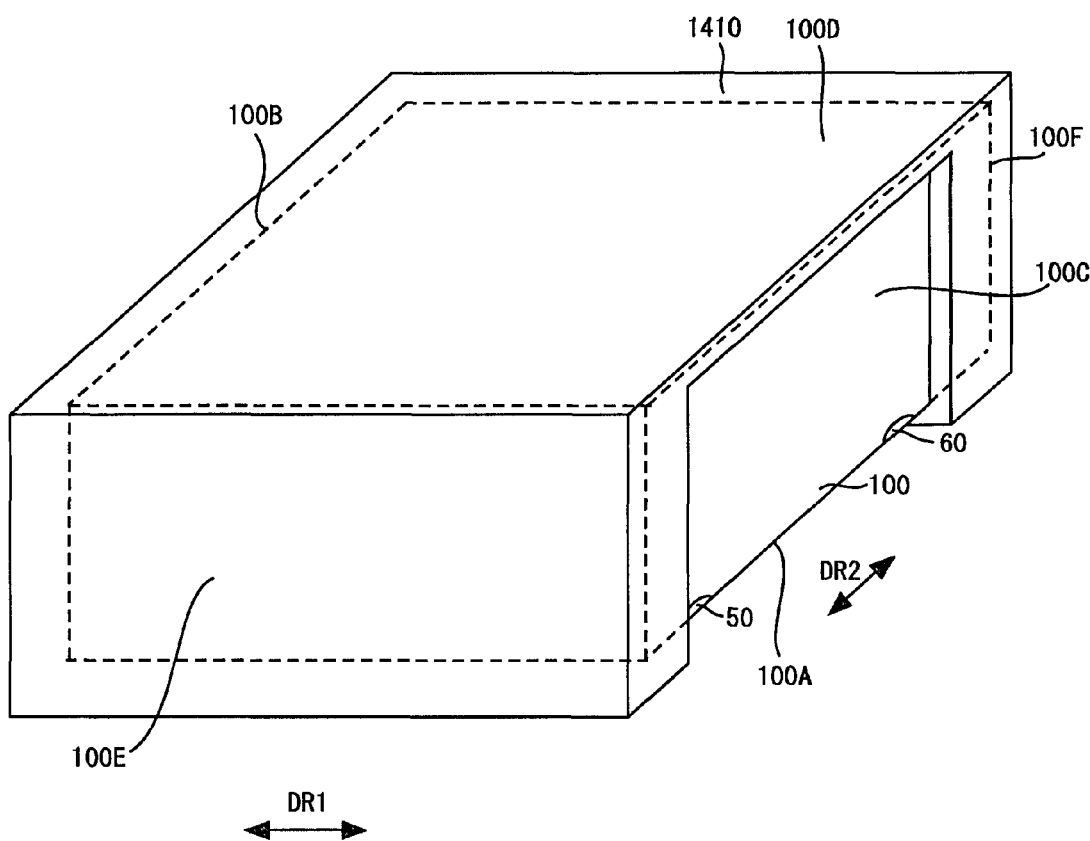
FIG. 60 is a perspective view illustrating the structure of another electric element according to Embodiment 5.

FIG. 60 is a perspective view illustrating the structure of another electric element according to Embodiment 5. The electric element according to Embodiment 5 may be an electric element 1400 shown in FIG. 60. With reference to FIG. 60, the electric element 1400 is identical with the electric element 1300 shown in FIG. 59 except that the conductive plate 1310 of the electric element 1300 is replaced with a conductive plate 1410.

The conductive plate 1410 is disposed on the whole upper surface 100D, the whole side surfaces 100E and 100F, and part of the side surfaces 100B and 100C and the bottom surface 100A of the electric element 100. The conductive plate 1410 is connected to the both ends of the conductive plates 11 to 14 on the side surfaces 100E and 100F of the electric element 100, and to the extended portions 111 and 112 of the conductive plates 11 to 14 and the anode electrodes 30 and 40 on the bottom surface 100A of the electric element 100. As a result, the conductive plate 1410 is connected parallel to the conductive plates 11 to 14 between the anode electrodes 30 and 40. The contact area between the conductive plate 1410 and the electric element 100 is larger than that between the conductive plate 1310 and the electric element 100 by the contact area between the conductive plate 1410 and the electric element 100 on the side surfaces 100B and 100C.

The conductive plate 1410 is formed of the same material as that of the conductive plate 1310 and has the same thickness as that of the conductive plate 1310.

The contact area between the conductive plate 1410 and the electric element 100 is larger than that between the conductive plate 1310 and the electric element 100, and therefore, the temperature of the electric element 1400 is kept lower than that in the electric element 1300. As a result, at the same temperature, the electric element 1400 is capable of supplying more DC current to the CPU 130 than the electric element 1300.

The rest is the same as the electric element 1300.

Figure 61:
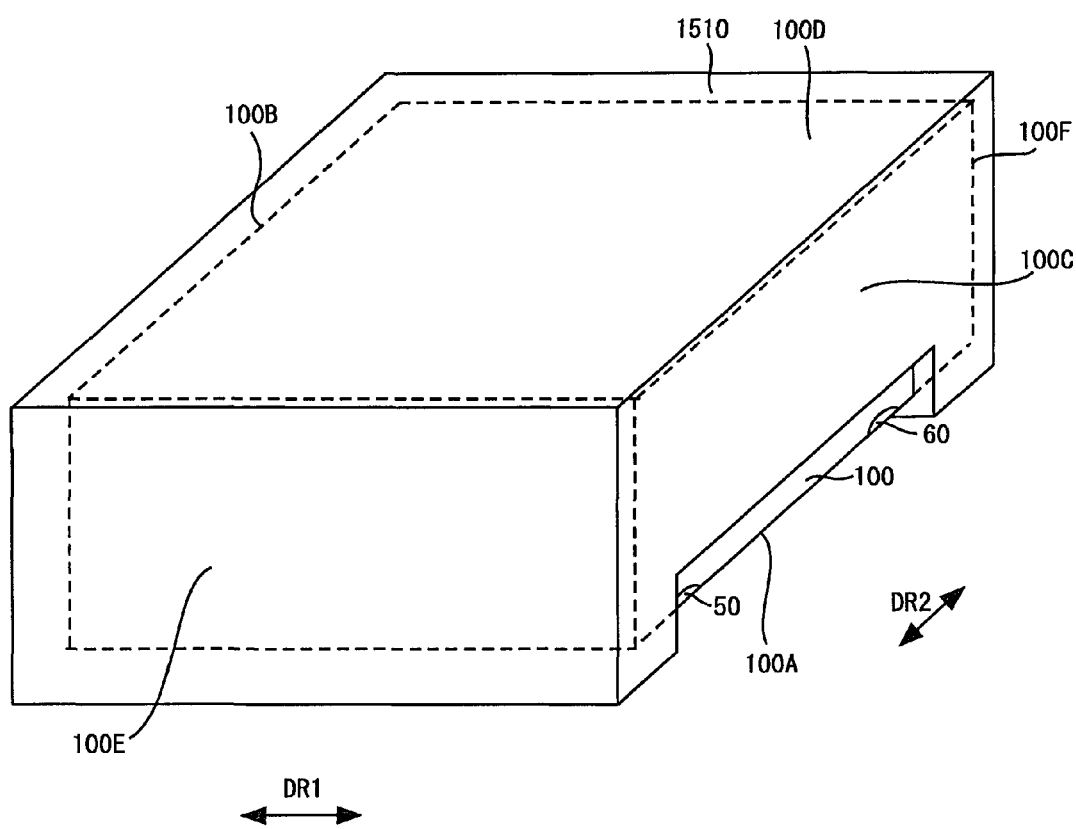
FIG. 61 is a perspective view illustrating the structure of another electric element according to Embodiment 5.

FIG. 61 is a perspective view illustrating the structure of another electric element according to Embodiment 5. The electric element according to Embodiment 5 may be an electric element 1500 shown in FIG. 61. With reference to FIG. 61, the electric element 1500 is identical with the electric element 1400 shown in FIG. 60 except that the conductive plate 1410 of the electric element 1400 is replaced with a conductive plate 1510.

The conductive plate 1510 is identical with the conductive plate 1410 except that the contact area on the side surfaces 100B and 100C of the electric element 100 is larger than that of the conductive plate 1410.

Accordingly, more DC current flows across the conductive plate 1510 from the anode electrode 30 side to the anode electrode 40 side than the conductive plate 1410. Therefore, the electric element 1500 is capable of supplying more DC current to the CPU 130 than the electric element 1400.

Heat generated by the electric element 100 is radiated through the conductive plate 1510, and therefore, the temperature of the electric element 1500 is kept lower than that in the electric element 1400.

The rest is the same as the electric element 1400.

Figure 62:
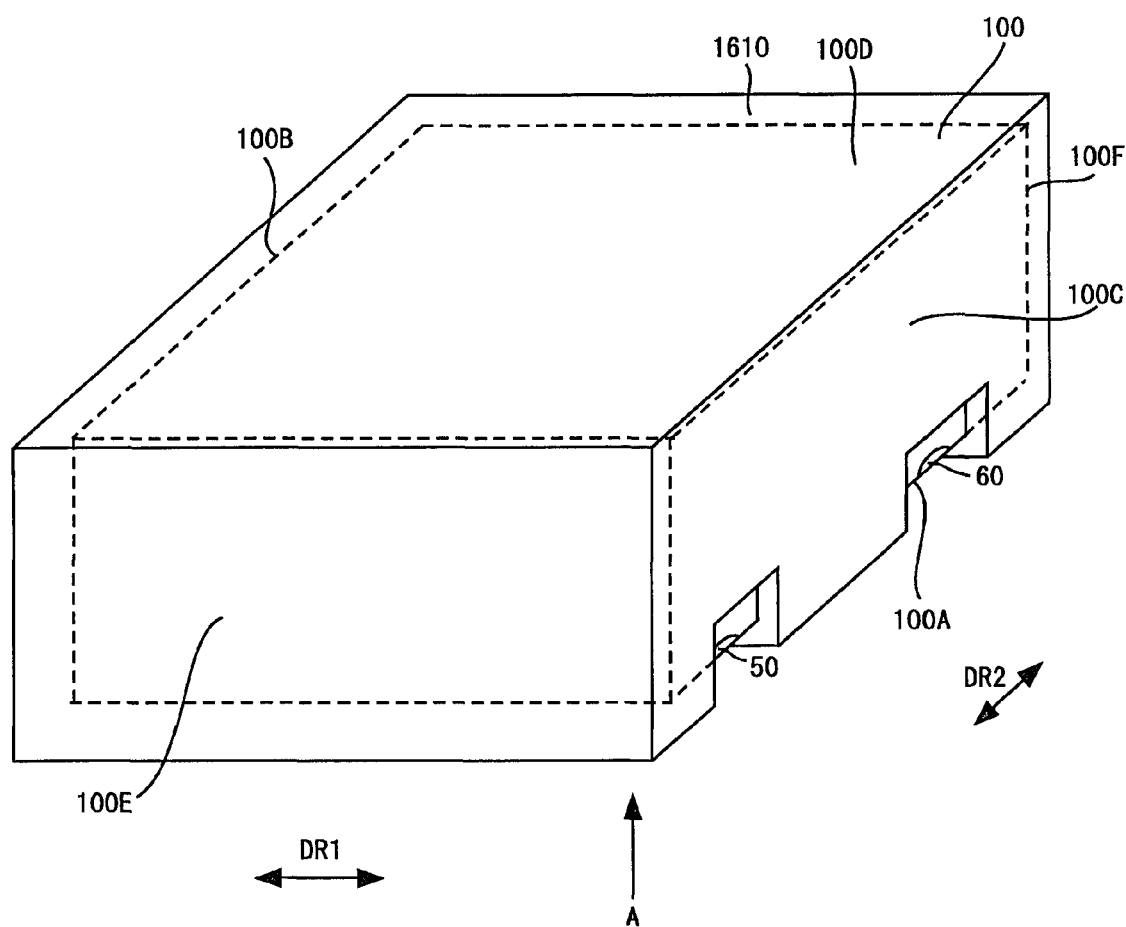
FIG. 62 is a perspective view illustrating the structure of another electric element according to Embodiment 5.

FIG. 62 is a perspective view illustrating the structure of another electric element according to Embodiment 5. The electric element according to Embodiment 5 may be an electric element 1600 shown in FIG. 62. With reference to FIG. 62, the electric element 1600 is identical with the electric element 1500 shown in FIG. 61 except that the conductive plate 1510 of the electric element 1500 is replaced with a conductive plate 1610.

The conductive plate 1610 is identical with the conductive plate 1510 except that a contact portion of the conductive plate 1610 and the electric element 100 between the cathode electrodes 50 and 60 is added to the conductive plate 1510.

Figure 63:
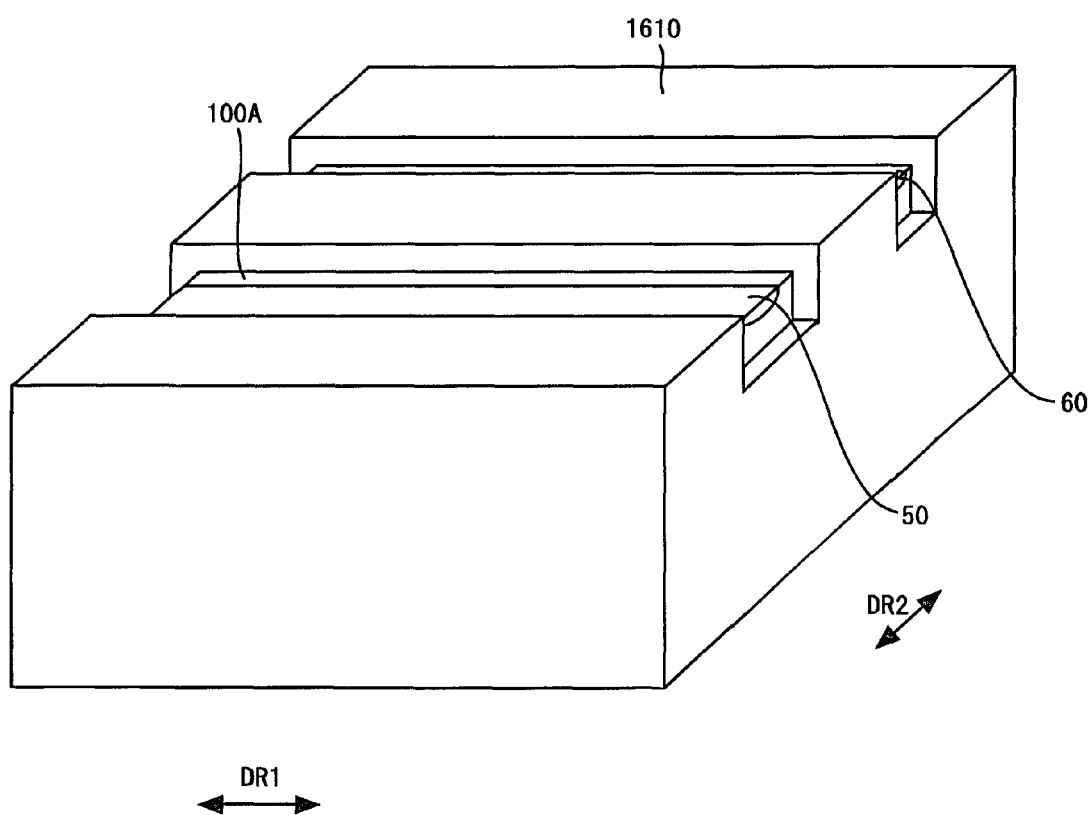
FIG. 63 is a perspective view of the electric element viewed along direction A shown in FIG. 62.

FIG. 63 is a perspective view of the electric element 1600 viewed along direction A shown in FIG. 62. With reference to FIG. 63, the conductive plate 1610 is formed to cover the bottom surface 100A of the electric element 100 except the cathode electrodes 50 and 60.

In this manner, the contact area between the conductive plate 1610 and the electric element 100 is made larger than that between the conductive plate 1510 and the electric element 100. As a result, the temperature of the electric element 1600 is kept lower than that in the electric element 1500.

The rest is the same as the electric element 1500.

Figure 64:
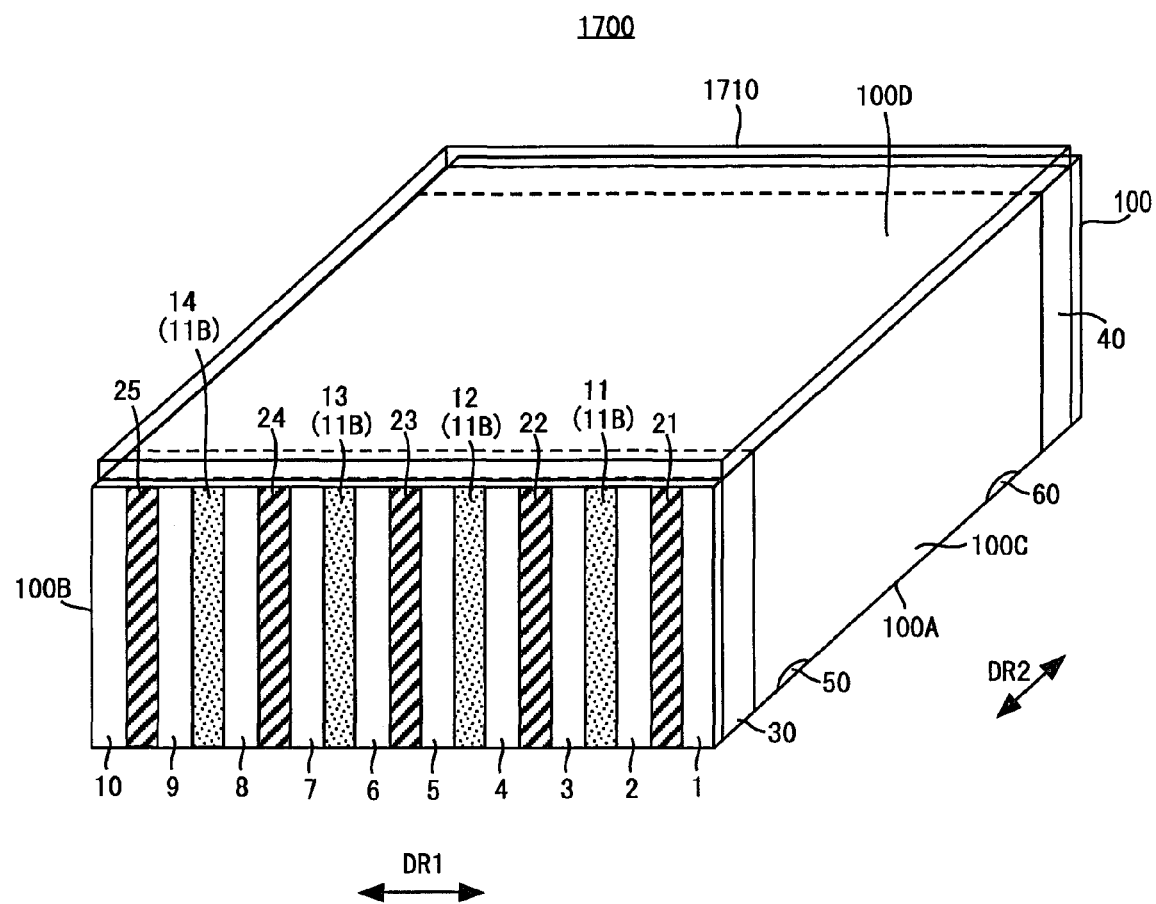
FIG. 64 is a perspective view illustrating the structure of another electric element according to Embodiment 5.
Figure 65:
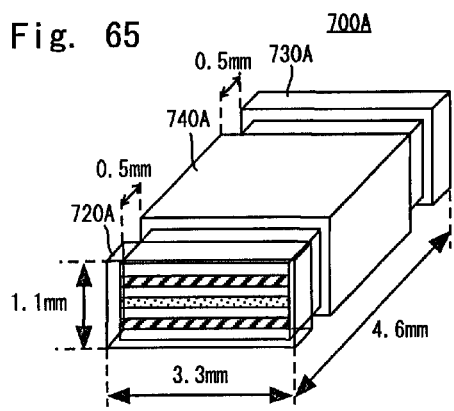
FIG. 65 is a first perspective view of the conventional electric element (refer to FIGS. 41 and 42) whose number of laminated dielectric layers and conductive plates (that is to say, the height of the electric element) is changed.
Figure 66:
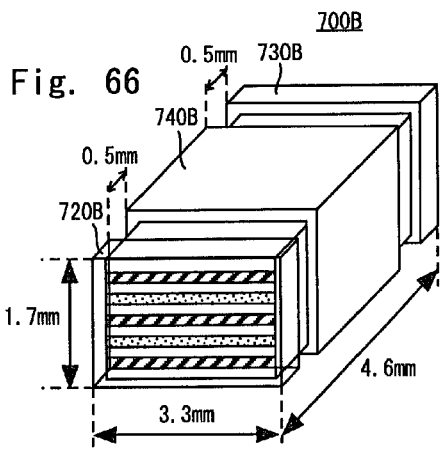
FIG. 66 is a second perspective view of the conventional electric element (refer to FIGS. 41 and 42) whose number of laminated dielectric layers and conductive plates (that is to say, the height of the electric element) is changed.
Figure 67:
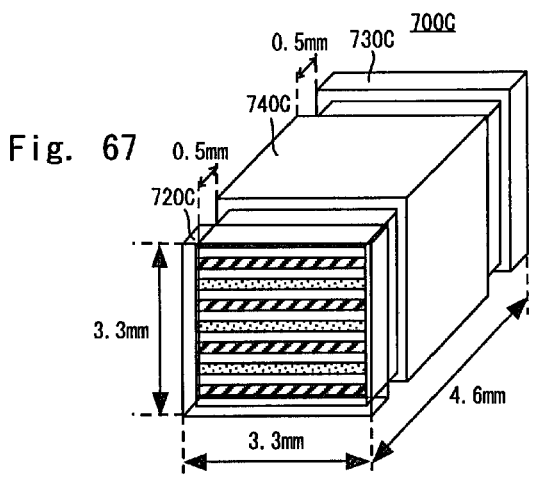
FIG. 67 is a third perspective view of the conventional electric element (refer to FIGS. 41 and 42) whose number of laminated dielectric layers and conductive plates (that is to say, the height of the electric element) is changed.
Figure 68:
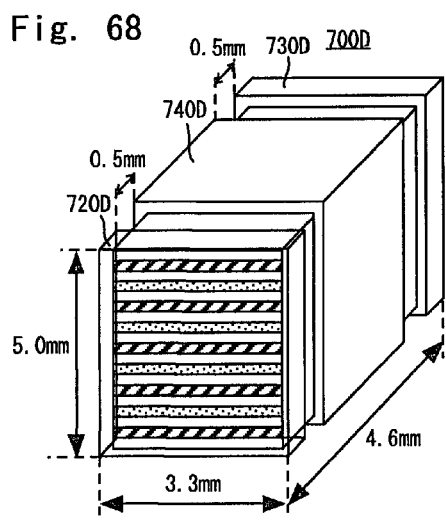
FIG. 68 is a fourth perspective view of the conventional electric element (refer to FIGS. 41 and 42) whose number of laminated dielectric layers and conductive plates (that is to say, the height of the electric element) is changed.
Figure 69:
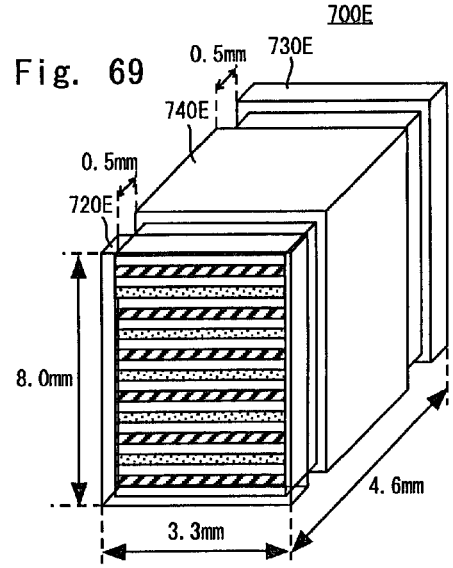
FIG. 69 is a fifth perspective view of the conventional electric element (refer to FIGS. 41 and 42) whose number of laminated dielectric layers and conductive plates (that is to say, the height of the electric element) is changed.
Figure 70:
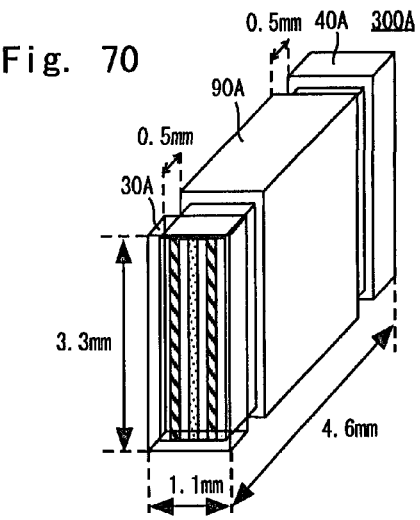
FIG. 70 is a first perspective view of the electric element (refer to FIG. 21) according to Embodiment 2 whose number of laminated dielectric layers and conductive plates (that is to say, the width of the electric element) is changed
Figure 71:
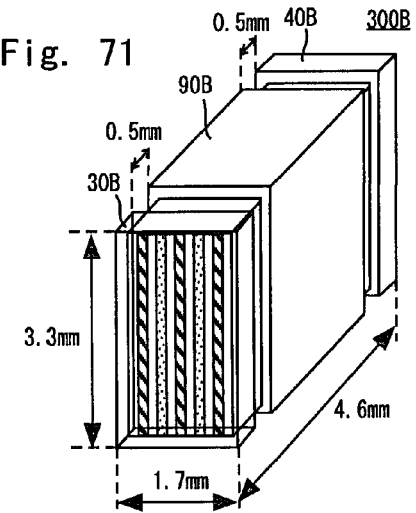
FIG. 71 is a second perspective view of the electric element (refer to FIG. 21) according to Embodiment 2 whose number of laminated dielectric layers and conductive plates (that is to say, the width of the electric element) is changed
Figure 72:
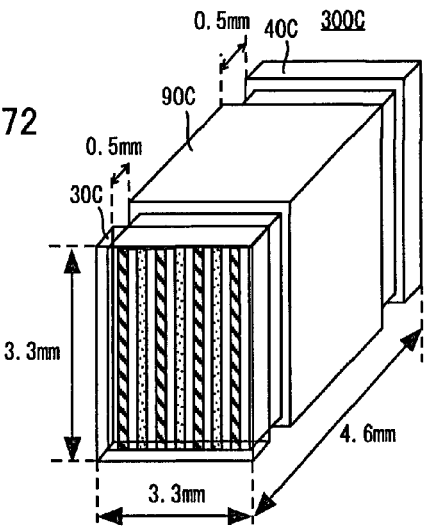
FIG. 72 is a third perspective view of the electric element (refer to FIG. 21) according to Embodiment 2 whose number of laminated dielectric layers and conductive plates (that is to say, the width of the electric element) is changed
Figure 73:
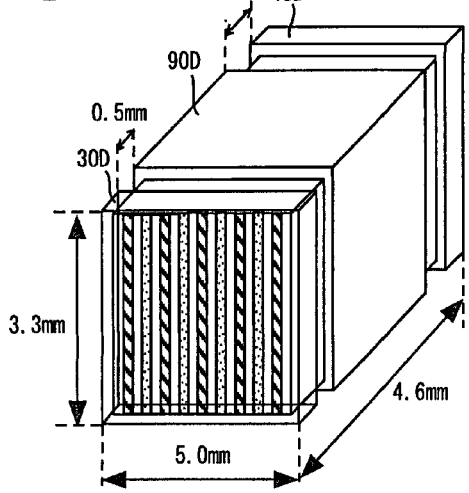
FIG. 73 is a fourth perspective view of the electric element (refer to FIG. 21) according to Embodiment 2 whose number of laminated dielectric layers and conductive plates (that is to say, the width of the electric element) is changed
Figure 74:
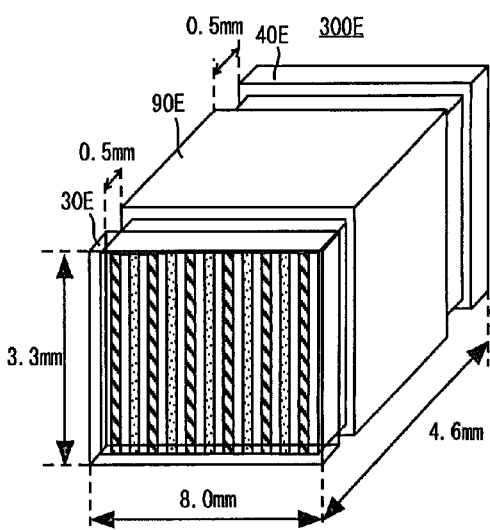
FIG. 74 is a fifth perspective view of the electric element (refer to FIG. 21) according to Embodiment 2 whose number of laminated dielectric layers and conductive plates (that is to say, the width of the electric element) is changed

FIG. 64 is a perspective view illustrating the structure of another electric element according to Embodiment 5. The electric element according to Embodiment 5 may be an electric element 1700 shown in FIG. 64. With reference to FIG. 64, the electric element 1700 is identical with the electric element 100 shown in FIG. 1 except that a conductive plate 1710 is added to the electric element 100.

Each of the conductive plates 11 to 14 of the electric element 1700 is formed of the conductive plate 11B shown in FIG. 14. The anode electrodes 30 and 40 are in the shape of the band and formed on the bottom surface 100A, the side surfaces 100B and 100C, and the upper surface 100D of the electric element 100.

The conductive plate 1710 is a flat plate in shape and disposed on the upper surface 100D of the electric element 100. In the longitudinal direction DR2, one end of the conductive plate 1710 is connected to the anode electrode 30, and the other end to the anode electrode 40. The conductive plate 1710 is formed of the same material as that of the conductive plate 1210 and has the same thickness as that of the conductive plate 1210.

In this manner, with the conductive plates 11 to 14 and 1710 connected parallel to each other between the anode electrodes 30 and 40, the electric element 1700 is capable of flowing a DC current from the anode electrode 30 side to the anode electrode 40 side, and therefore, is capable of supplying more DC current to the CPU 130 than in the electric element 100.

In addition, the conductive plate 1710 also functions as a heat radiator, and therefore, the temperature of the electric element 1700 is kept lower than that in the electric element 100.

The electric element 1700 is fabricated by disposing the conductive plate 1710 on the upper surface 100D of the electric element 100, after fabricating the electric element 100 by the methods described in Embodiment 1.

The rest is the same as the electric element 100.

Note that the electric element according to Embodiment 5 may be the electric elements 300, 350, 600, 800, 900, 1000, and 1100 further comprising any one of the conductive plates 1210, 1310, 1410, 1510, 1610, and 1710. When adding any one of the conductive plates 1210, 1310, 1410, 1510, 1610, and 1710 to the electric elements 350, 800, 900, and 1100, an insulator is disposed between any one of the conductive plates 1210, 1310, 1410, 1510, 1610, and 1710 and the cathode electrodes 360; 810; 910, 920 and 930; and 1110 and 1120.

As described above, the electric element according to the present invention comprises conductive plates, which are respectively connected to an anode electrode and a cathode electrode, laminated in the width direction DR1. The anode electrode is connected to each of the laminated plurality of conductive plates with the same resistance, and therefore, even if more conductive plates are laminated in the width direction DR1, the impedance encountered when a DC current flows through the two anode electrodes and the conductive plates connected therebetween never increases.

More specifically, in a conventional electric element, when the plurality of conductive plates are laminated perpendicular to the printed substrate, the impedance encountered when a DC current flows increases, as the number of laminated conductive plates increases. This is because the resistance between the anode electrode and the conductive plates becomes greater, as the conductive plates are disposed farther away from the printed substrate.

On the other hand, in the electric element according to the present invention, the plurality of conductive plates are laminated in the width direction, and the distances between the plurality of conductive plates and the anode electrode are equal to each other. Therefore, even if the number of laminated conductive plates increases, the resistance between the anode electrode and the conductive plates never increases. Accordingly, the impedance encountered when a DC current flows never increases, even if the number of laminated conductive plates increases.

In addition, since the impedance encountered when a DC current flows never increases, even if the number of laminated conductive plates increases, more DC current is supplied from the DC power supply to the CPU than the conventional electric element.

FIGS. 65 to 69 are first to fifth perspective views respectively illustrating the conventional electric element 700 (refer to FIGS. 41 and 42) whose number of laminated dielectric layers 751 to 760 and conductive plates 761 to 764 and 771 to 775 (that is to say, the height of the electric element 700) is changed.

With reference to FIGS. 65 to 69, the electric elements 700A to 700E have a width of 3.3 mm and a length of 4.6 mm. In the electric elements 700A to 700E, the distances from the anode electrodes 720A and 730A, 720B and 730B, 720C and 730C, 720D and 730D, and 720E and 730E to the cathode electrodes 740A to 740E is 0.5 mm. As a result, in the electric elements 700A to 700E, the ratio of the clearance to the total length is (0.5×2) mm/4.6 mm=0.217.

The electric elements 700A to 700E respectively have a height of 1.1 mm, 1.7 mm, 3.3 mm, 5.0 mm, and 8.0 mm. The height of the electric elements 700A to 700E is changed as a result of a change in the number of laminated dielectric layers 751 to 760 and conductive plates 761 to 764 and 771 to 775.

Accordingly, the height of the electric elements 700A to 700E is changed, while their width and length are fixed.

FIGS. 70 to 74 are first to fifth perspective views respectively illustrating the electric element 300 (refer to FIG. 21) according to Embodiment 2 whose number of laminated dielectric layers 1 to 10 and conductive plates 11 to 14 and 31 to 35 (that is to say, the width of the electric element 300) is changed.

With reference to FIGS. 70 to 74, the electric elements 300A to 300E have a height of 3.3 mm and a length of 4.6 mm. In the electric elements 300A to 300E, the distances from the anode electrodes 30A and 40A, 30B and 40B, 30C and 40C, 30D and 40D, and 30E and 40E to the cathode electrodes 90A to 90E is 0.5 mm. As a result, in the electric elements 300A to 300E, the ratio of the clearance to the total length is also (0.5×2) mm/4.6 mm=0.217.

The electric elements 300A to 300E respectively have a width of 1.1 mm, 1.7 mm, 3.3 mm, 5.0 mm, and 8.0 mm. In the electric elements 300A to 300E, the width is changed as a result of a change in the number of laminated dielectric layers 1 to 10 and conductive plates 11 to 14 and 31 to 35.

Accordingly, the width of the electric elements 300A to 300E is changed, while their height and length are fixed.

Figure 75:
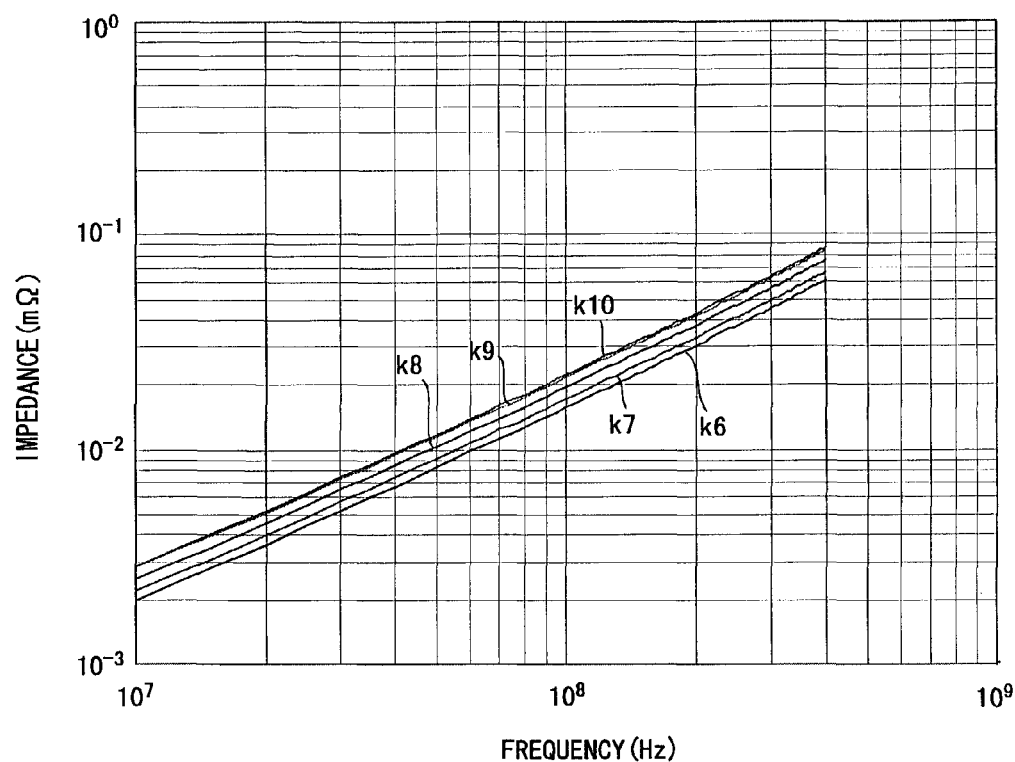
FIG. 75 illustrates the relationship between the impedance and the frequency of the electric elements respectively shown in FIGS. 65 to 69.
Figure 76:
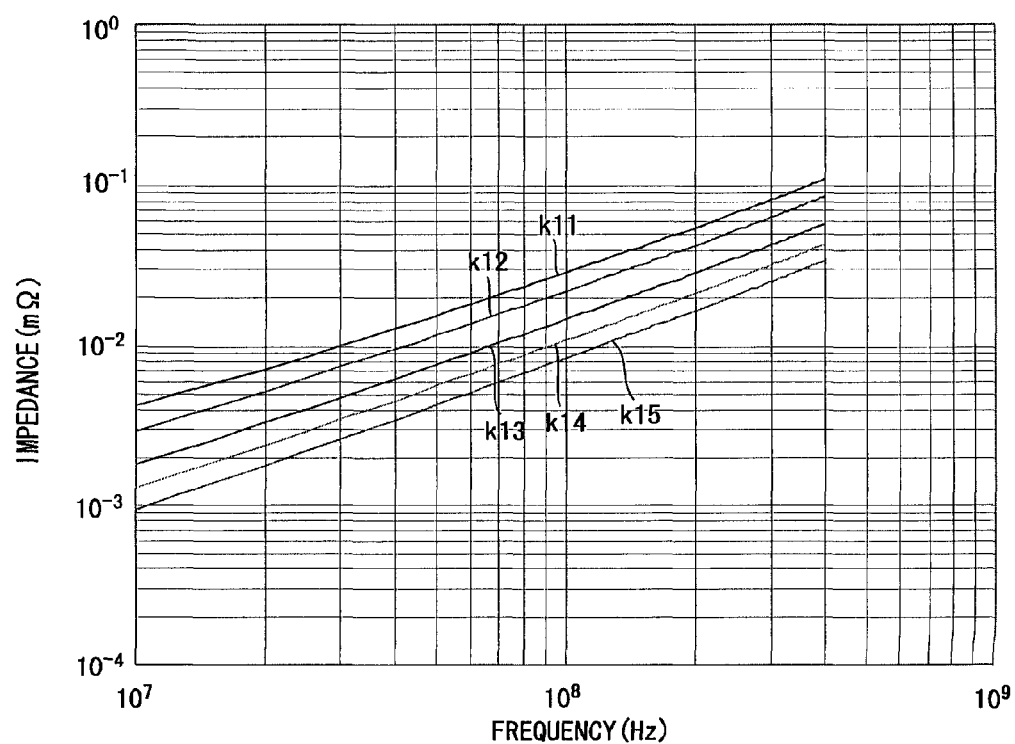
FIG. 76 illustrates the relationship between the impedance and the frequency of the electric elements respectively shown in FIGS. 70 to 74.

FIG. 75 illustrates the relationship between the impedance and the frequency of the electric elements 700A to 700E respectively shown in FIGS. 65 to 69. FIG. 76 illustrates the relationship between the impedance and the frequency of the electric elements 300A to 300E respectively shown in FIGS. 70 to 74.

In FIGS. 75 and 76, the vertical axes represent the impedance, and the abscissa axes represent the frequency. Note that the frequency is $10^7$ to $10^9$ (Hz) where the inductance of the electric elements 300A to 300E and 700A to 700E is dominant to their impedance.

In FIG. 75, Curves k6 to k10 respectively illustrate the relationship between the impedance and the frequency of the electric elements 700A to 700E. In FIG. 76, Curves k11 to k15 respectively illustrate the relationship between the impedance and the frequency of the electric elements 300A to 300E.

In the conventional electric element 700, the impedance increases as the number of laminated dielectric layers 751 to 760 and conductive plates 761 to 764 and 771 to 775 increases (refer to Curves k6 to k10).

On the other hands, in the electric element 300 according to Embodiment 2, the impedance decreases as the number of laminated dielectric layers 1 to 10 and conductive plates 11 to 14 and 31 to 35 increases (refer to Curves k11 to k15).

When the conventional electric element 700 is mounted on a printed substrate, if the number of laminated dielectric layers 751 to 760 and conductive plates 761 to 764 and 771 to 775 increases, the distance increases between the signal line on the printed substrate and the conductive plate disposed relatively high, and therefore, the resistance becomes relatively great between the signal line and the conductive plate disposed relatively high. As a result, the impedance of the conventional electric element 700 increases, as the number of laminated dielectric layers 751 to 760 and conductive plates 761 to 764 and 771 to 775 increases.

On the other hand, in the electric element 300 according to Embodiment 2, the distances between the signal line and the conductive plates 11 to 14 and 31 to 35 are equal to each other, and therefore, even if the number of laminated dielectric layers 1 to 10 and conductive plates 11 to 14 and 31 to 35 increases, the resistances from the signal line to the conductive plates 11 to 14 and 31 to 35 are substantially equal to each other. If the number of laminated dielectric layers 1 to 10 and conductive plates 11 to 14 and 31 to 35 increases, the capacitance and the impedance of the electric element 300 decreases. Therefore, the impedance of the electric element 300 decreases, as the number of laminated dielectric layers 1 to 10 and conductive plates 11 to 14 and 31 to 35 increases.

Figure 77:
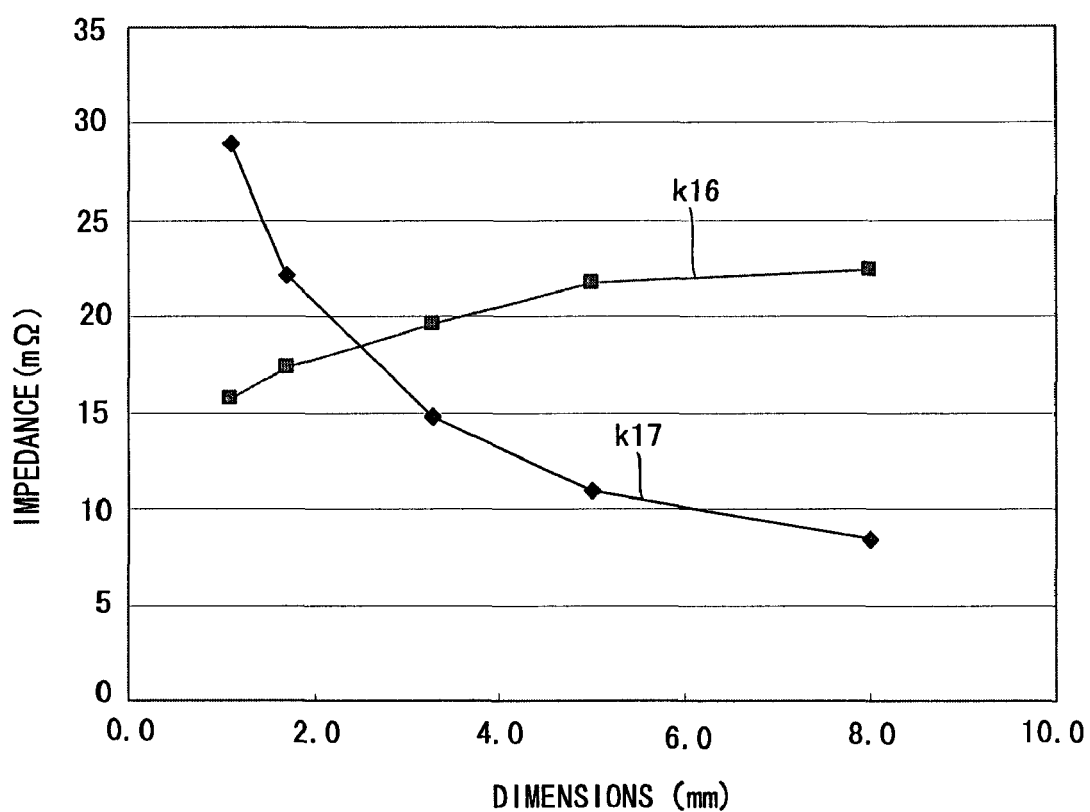
FIG. 77 illustrates the relationship between the impedance and the dimensions.

FIG. 77 illustrates the relationship between the impedance and the dimensions. In FIG. 77, the vertical axis represents the impedance, and the abscissa axis represents the dimensions. Curve k16 illustrates the relationship between the impedance and the dimension (the height of the electric elements 700) of the conventional electric element 700. Curve k17 illustrates the relationship between the impedance and the dimension (the width of the electric elements 300) of the electric element 300 according to Embodiment 2. Note that in FIG. 77, the impedance is measured at a frequency of $10^8$ Hz.

In the conventional electric element 700, the impedance increases (refer to Curve k16), as the height (=the dimension) of the electric element 700 increases. On the other hands, in the electric element 300 according to Embodiment 2, the impedance decreases (refer to Curve k17), as the width (=the dimension) of the electric element 300 increases.

Curve k16 intersects with Curve k17 at a dimension of about 2.5 mm: When the dimension is smaller than 2.5 mm, the impedance of the electric element 700 is lower than that of the electric element 300; and when the dimension is 2.5 mm or larger, the impedance of the electric element 300 is lower than that of the electric element 700.

This means that if the number of laminated dielectric layers and conductive plates is relatively small and the height of the electric element is shorter than its width, the impedance of the electric elements 700A and 700B whose conductive plates are disposed in the horizontal direction (=in the direction substantially parallel to the printed substrate) is lower than that of the electric elements 300A and 300B whose conductive plates are disposed in the perpendicular direction (=in the direction substantially perpendicular to the printed substrate); and that if the number of laminated dielectric layers and conductive plates is relatively large and the height of the electric element is 2.5 mm or higher, the impedance of the electric element 300C to 300E whose conductive plates are disposed in perpendicular direction (=in the direction substantially perpendicular to the printed substrate) is lower than that of the electric elements 700C to 700E whose conductive plates are disposed in horizontal direction (=in the direction substantially parallel to the printed substrate).

Figure 78:
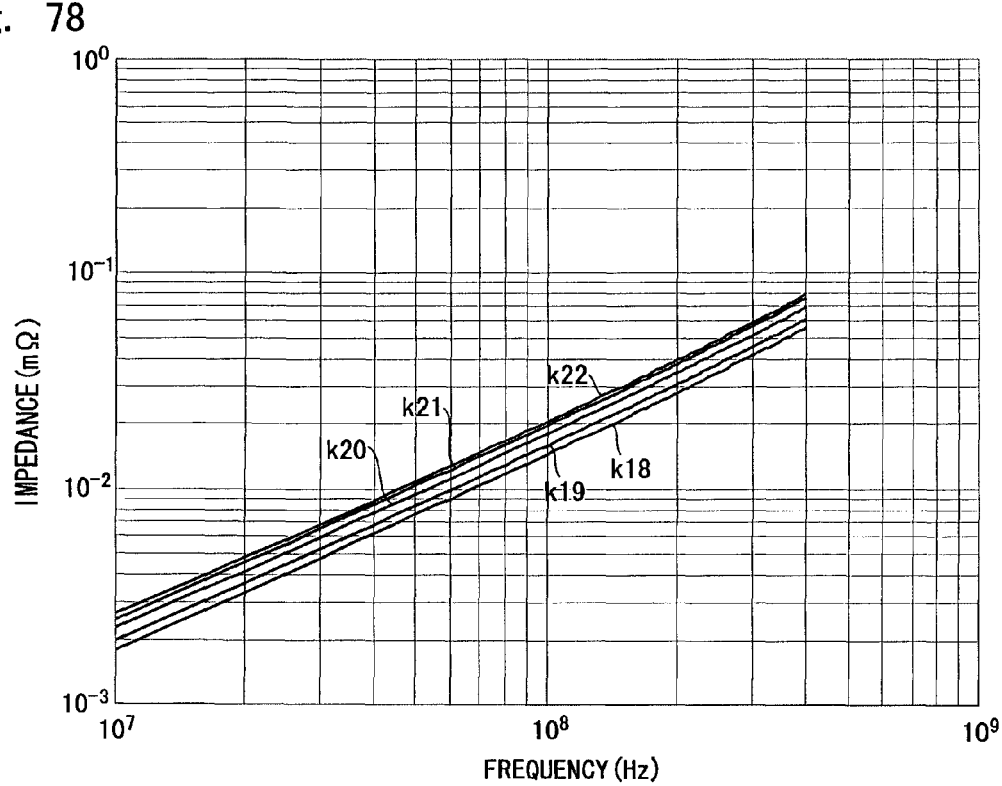
FIG. 78 illustrates the relationship between the impedance and the frequency of the electric elements respectively shown in FIGS. 65 to 69 whose distance from the anode electrodes to the cathode electrode is 0.5 mm.
Figure 79:
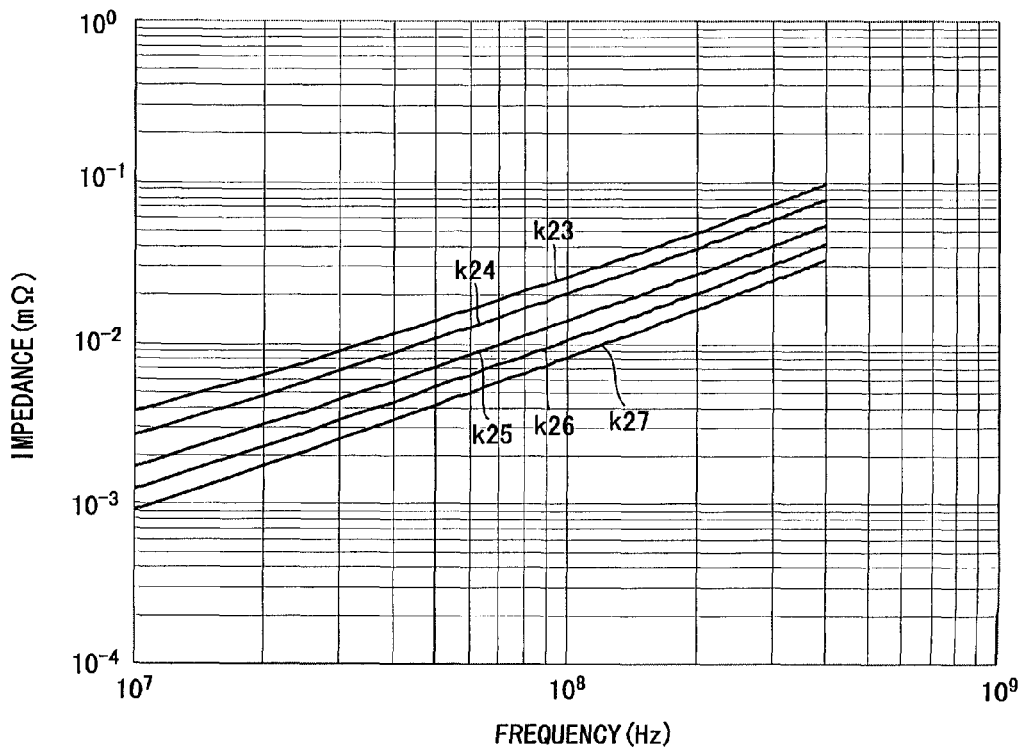
FIG. 79 illustrates the relationship between the impedance and the frequency of the electric elements respectively shown in FIGS. 70 to 74 whose distance from the anode electrodes to the cathode electrode is 0.5 mm.

FIG. 78 illustrates the relationship between the impedance and the frequency of the electric elements 700A to 700E respectively shown in FIGS. 65 to 69 whose distance from the anode electrodes 720A and 730A, 720B and 730B, 720C and 730C, 720D and 730D, and 720E and 730E to the cathode electrodes 740A, 740B, 740C, 740D, and 740E is 0.4 mm. FIG. 79 illustrates the relationship between the impedance and the frequency of the electric elements 300A to 300E respectively shown in FIGS. 70 to 74 whose distance from the anode electrodes 30A and 40A, 30B and 40B, 30C and 40C, 30D and 40D, and 30E and 40E to the cathode electrodes 90A, 90B, 90C, 90D, and 90E is 0.4 mm.

In FIGS. 78 and 79, the vertical axes represent the impedance, and the abscissa axes represent the frequency. Note that the frequency is $10^7$ to $10^9$ (Hz) where the inductance of the electric elements 300A to 300E and 700A to 700E is dominant to their impedance.

In FIG. 78, Curves k18 to k22 respectively illustrate the relationship between the impedance and the frequency of the electric elements 700A to 700E. In FIG. 79, Curves k23 to k27 respectively illustrate the relationship between the impedance and the frequency of the electric elements 300A to 300E.

When the distance is decreased to 0.4 mm between the anode electrode and the cathode electrode, the ratio of the clearance to the total length is 0.174.

Therefore, although the ratio of the clearance to the total length is 0.174, which is lower than the standard value (=0.18), the impedance of the conventional electric element 700 increases (refer to Curves k18 to k22), as the number of laminated dielectric layers 751 to 760 and conductive plates 761 to 764 and 771 to 775 increases, while the impedance of the electric element 300 according to Embodiment 2 decreases (refer to Curves k23 to k27), as the number of laminated dielectric layers 1 to 10 and conductive plates 11 to 14 and 31 to 35 increases.

Figure 80:
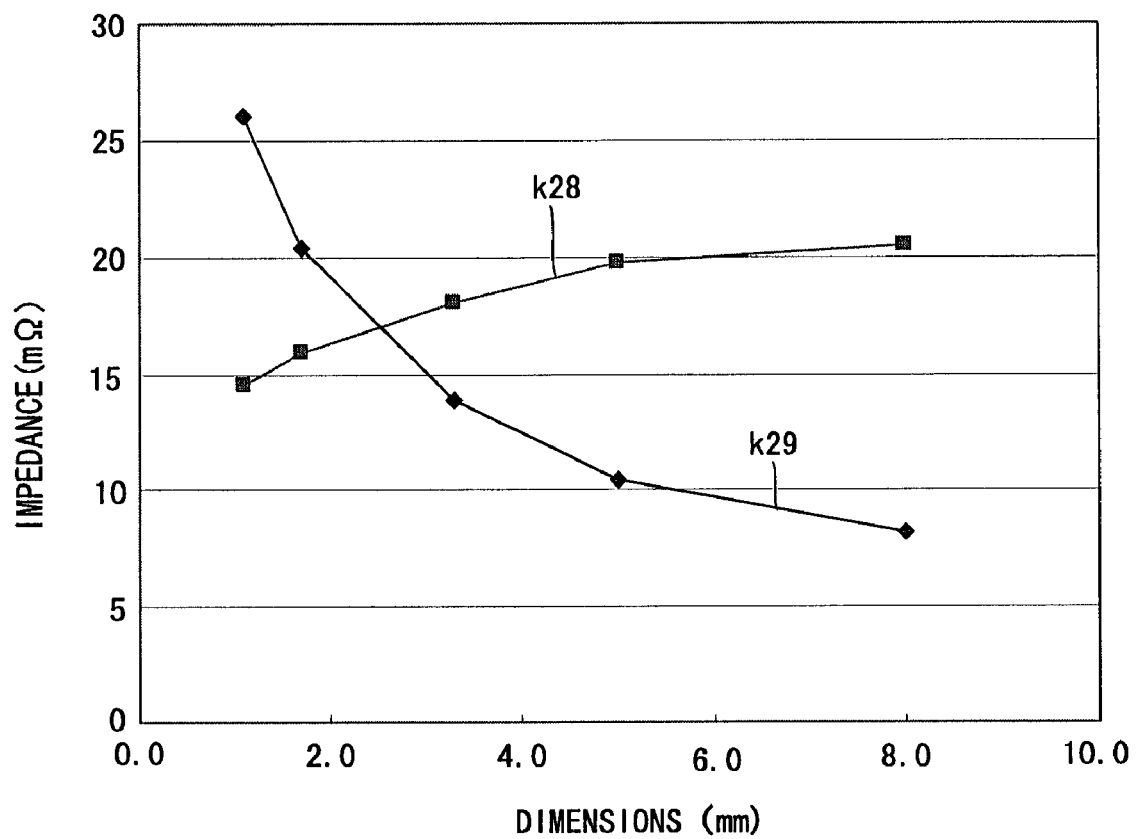
FIG. 80 illustrates another relationship between the impedance and the dimensions.
Figure 81:
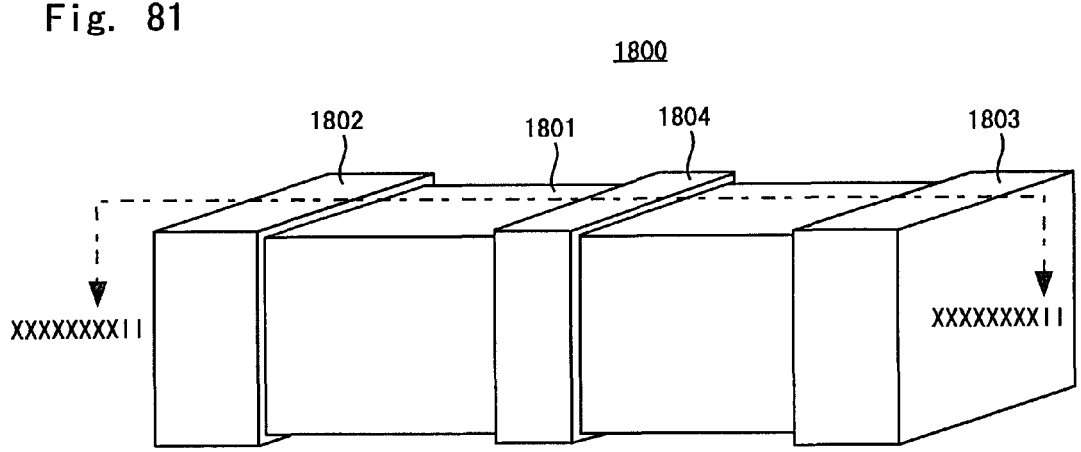
FIG. 81 is a perspective view of the conventional three terminal feed-through capacitor.
Figure 82:
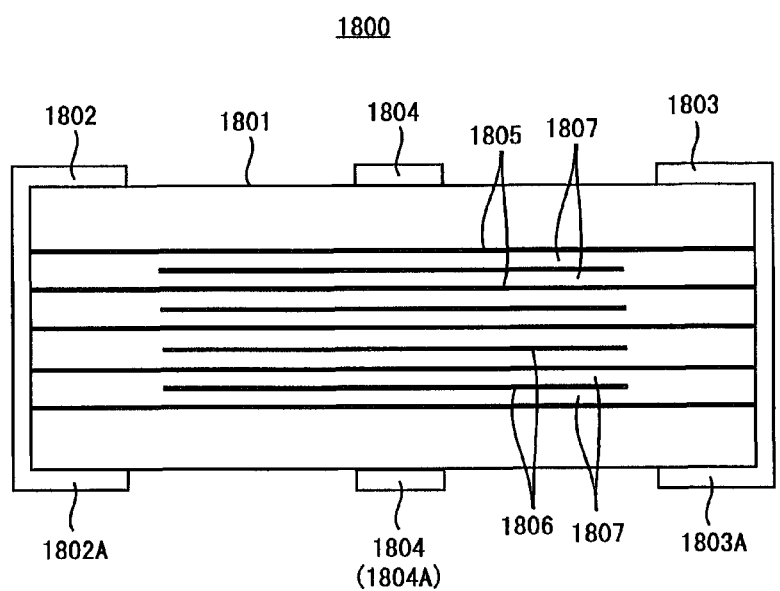
FIG. 82 is a cross-sectional view of the three terminal feed-through capacitor viewed along line XXXXXXXXII-XXXXXXXXII shown in FIG. 81.

FIG. 80 illustrates another relationship between the impedance and the dimensions. In FIG. 80, the vertical axis represents the impedance, and the abscissa axis represents the dimensions. Curve k28 illustrates relationship between the impedance and the dimension (the height of the electric element 700) of the conventional electric element 700 whose ratio of the clearance to the total length is 0.174. Curve k29 illustrates the relationship between the impedance and the dimension (the width of the electric element 300) of the electric element 300 according to Embodiment 2 whose ratio of the clearance to the total length is 0.174. Note that in FIG. 80, the impedance is also measured at a frequency of $10^8$ Hz.

The impedance of the conventional electric element 700 increases (refer to Curve k28), as the height (=the dimension) of the electric element 700 increases. On the other hand, the impedance of the electric element 300 according to Embodiment 2 decreases (refer to Curve k29), as the width (=the dimension) of the electric element 300 increases.

Curve k28 intersects with Curve k29 at a dimension of about 2.5 mm: When the dimension is smaller than 2.5 mm, the impedance of the electric element 700 is lower than that of the electric element 300; and when the dimension is 2.5 mm or larger, the impedance of the electric element 300 is lower than that of the electric element 700.

This means that, even when the ratio of the clearance to the total length is 0.174, which is lower than the standard value (=0.18), if the number of laminated dielectric layers and conductive plates is relatively small and the height of the electric element is shorter than its width, the impedance of the electric elements 700A and 700B whose conductive plates are disposed in the horizontal direction (=in the direction substantially parallel to the printed substrate) is lower than that of the electric elements 300A and 300B whose conductive plates are disposed in the perpendicular direction (=in the direction substantially perpendicular to the printed substrate); and that if the number of laminated dielectric layer and conductive plates is relatively large and the height of the electric element is 2.5 mm or higher, the impedance of the electric elements 300C to 300E whose conductive plates are disposed in the perpendicular direction (=in the direction substantially perpendicular to the printed substrate) is lower than that of the electric elements 700C to 700E whose conductive plates are disposed in the horizontal direction (=in the direction substantially parallel to the printed substrate).

As described above, despite the relationship between the ratio of the clearance to the total length and its standard value (=0.18), if the number of laminated dielectric layer and conductive plates is relatively large and the height of the electric element is a given value (2.5 mm) or higher, the impedance of the electric element decreases when the dielectric layers and conductive plates are disposed perpendicular to the printed substrate.

Accordingly, in general, the electric element (=whose dielectric layer and conductive plates are disposed perpendicular to the printed substrate) according to the present invention only has to have a cross section (that is perpendicular to the longitudinal direction of the electric element) with which the impedance (at a frequency where the inductance is dominant) encountered when the dielectric layer and the conductive plates are disposed perpendicular to the printed substrate is lower than that encountered when the dielectric layer and the conductive plates are disposed parallel to the printed substrate.

The conductive plates 761 to 764 and 771 to 775 of the conventional electric element 700 are mounted on the printed substrate substantially parallel to the printed substrate. The electric element according to the present invention, however, includes the conventional electric element 700, if it comprises so many laminated conductive plates 761 to 764 and 771 to 775 that the impedance decreases when they are disposed substantially perpendicular to the printed substrate, and if it is mounted, turned by 90-degrees, on the printed substrate.

Note that what is described above in Embodiments 1 to 5 is electric elements comprising the two cathode electrodes 50 and 60 or the one cathode electrode 90. The present invention, however, is not limited to that: What is needed is at least one cathode electrode. Therefore, the electric element according to the present invention only has to comprise two anode electrodes and j (j is a positive integer) cathode electrode.

In the present invention, the conductive plates 11 to 14 and 561 to 564 constitute the n first conductive plates. The conductive plates 21 to 25, 31 to 35, 41 to 45, 61 to 65, 81 to 85, 101 to 105, 571 to 575, and 1101 to 1105 constitute the m second conductive plates.

The anode electrode 30 and the anode electrode 520 constitute the first electrode. The anode electrode 40 and the anode electrode 530 constitute the second electrode. The cathode electrodes 50 and 60; the cathode electrode 90; the cathode electrode 360; the cathode electrodes 540 and 550; the cathode electrode 610; the cathode electrode 810; the cathode electrodes 910, 920 and 930; the cathode electrodes 1010 and 1020; and the cathode electrodes 1110 and 1120 constitute the j third electrode.

The cathode electrode 50, the cathode electrode 540, the cathode electrode 1010, and the cathode electrode 1110 constitute the first cathode electrode. The cathode electrode 60, the cathode electrode 550, the cathode electrode 1020, and the cathode electrode 1120 constitute the second cathode electrode.

The extended portion 111 constitutes the first extended portion. The extended portion 112 constitutes the second extended portion.

Further, the extended portion 111 constitutes the first connecting point. The extended portion 112 constitutes the second connecting point.

Further, the extended portion 211 constitutes the third extended portion. The extended portion 212 constitutes the fourth extended portion.

Further, the extended portion 211 constitutes the first part. The extended portion 212 constitutes the second part.

Further, the electric element 700 constitutes the standard electric element.

The conductive plates 1210, 1310, 1410, 1510, 1610, and 1710 constitute the third conductive plate.

The embodiments as have been described here are mere examples and should not be interpreted as restrictive. The scope of the present invention is determined by each of the claims, not by the written description of the embodiments, and embraces modifications within the meaning of, and equivalent to, the languages in the claims.

INDUSTRIAL APPLICABILITY

The present invention is applied to an electric element whose acceptable amount of DC current is easily determined.

The invention claimed is:
1. An electric element comprising:
n (n is a positive integer) first conductive plate;
m (m is a positive integer) second conductive plate alternately laminated with the n first conductive plate;
a first electrode connected to one end of the n first conductive plate;
a second electrode connected to the other end of the n first conductive plate; and
j (j is a positive integer) third electrode connected to the m second conductive plate, wherein:
the n first conductive plate and the m second conductive plate are laminated in the direction perpendicular to the normal direction of a substrate surface on which the electric element is disposed;
the n first conductive plate includes a first extended portion disposed on one end side of the first conductive plate in the longitudinal direction of the electric element and extending out in the normal direction of a substrate, and a second extended portion disposed on the other end side of the first conductive plate in the longitudinal direction of the electric element and extending out in the normal direction of the substrate;
the m second conductive plate includes a third extended portion disposed between the first extended portion and the second extended portion in the longitudinal direction of the electric element and extending out in the normal direction of the substrate;

the first extended portion, the second extended portion and the third extended portion are disposed on a same side of the first and second conductive plates in the normal direction of the substrate;

the first electrode is connected to the n first extended portion;

the second electrode is connected to the n second extended portion;

the j third electrode is connected to the m third extended portion;

the m third extended portion includes a fourth extended portion extending out in a first direction, in the normal direction of the substrate, from one end of the second conductive plate in the normal direction of the substrate, and a fifth extended portion extending out in a second direction opposite to the first direction, in the normal direction of the substrate, from the other end of the second conductive plate in the normal direction of the substrate;

a laminated stack of the n first conductive plate and the m second conductive plate is substantially rectangular parallelepiped in shape; and the j third electrode includes a fourth electrode connected to the m fourth extended portion on a bottom surface of the rectangular parallelepiped, a fifth electrode connected to the m fifth extended portion on an upper surface of the rectangular parallelepiped, and a sixth electrode orthogonally-crossed to the bottom surface and the upper surface of the rectangular parallelepiped, disposed on at least one of the side surfaces of the rectangular parallelepiped in the direction in which the n first conductive plate and the m second conductive plate are laminated, and connected to the fourth and fifth electrodes.

* * * * *